(12) United States Patent
Mohammed et al.

(10) Patent No.: US 9,288,337 B2
(45) Date of Patent: *Mar. 15, 2016

(54) METHOD FOR ENABLING A WIRELESS DEVICE FOR GEOGRAPHICALLY PREFERENTIAL SERVICES

(71) Applicant: Jasper Technologies, Inc., Santa Clara, CA (US)

(72) Inventors: Jahangir Mohammed, Saratoga, CA (US); Amit Gupta, Livermore, CA (US); Daniel Collins, McKinney, TX (US); Scott Barkley, San Mateo, CA (US); Jack McGwire, Sunnyvale, CA (US)

(73) Assignee: Jasper Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,038

(22) Filed: May 21, 2015

(65) Prior Publication Data

US 2015/0256684 A1    Sep. 10, 2015

Related U.S. Application Data

(63) Continuation of application No. 14/460,196, filed on Aug. 14, 2014, now Pat. No. 9,106,768, which is a continuation of application No. 14/213,396, filed on Mar. 14, 2014, now Pat. No. 8,867,575, which is a (Continued)

(51) Int. Cl.
*H04M 11/00* (2006.01)
*H04M 15/00* (2006.01)

(Continued)

(52) U.S. Cl.
CPC ........... *H04M 15/66* (2013.01); *H04L 63/0428* (2013.01); *H04L 63/0853* (2013.01);

(Continued)

(58) Field of Classification Search
CPC . H04L 63/0428; H04L 63/0853; H04W 4/24; H04W 48/18; H04W 8/06; H04W 8/183; H04W 12/06; H04W 4/00; H04M 2215/2026; H04M 2215/32
See application file for complete search history.

(56) References Cited

U.S. PATENT DOCUMENTS

| 5,335,340 A | 8/1994 | Strong |
| 5,353,340 A | 10/1994 | Kunz |

(Continued)

FOREIGN PATENT DOCUMENTS

| EP | 1229751 A1 | 8/2002 |
| EP | 1392077 A1 | 2/2004 |

(Continued)

OTHER PUBLICATIONS

3GPP TS 03.20 V9.0.0 (Jan. 2000) 3rd Generation Partnership Project: Digital Cellular Telecommunication System (Phase 2+) Security related network functions (Release 2000).

(Continued)

*Primary Examiner* — Mounir Moutaouakil
(74) *Attorney, Agent, or Firm* — Blakely Sokoloff Taylor & Zafman, LLP

(57) ABSTRACT

Disclosed is system comprising: a server platform operative to communicate with a wireless communication network; and data storage coupled to the server platform to store a plurality of business rules, wherein the server platform is operative to: generate a first provision instruction to provision a Policy and Charging Rules Function (PCRF) with a first rule set associated with a first set of business rules for wireless usage incurred by a mobile terminal operating in the wireless communication network; generate a first billing instruction based on the first set of business rules and a first data type determined by a packet gateway that inspects packet data communicated to or from the mobile terminal.

17 Claims, 45 Drawing Sheets

Related U.S. Application Data continuation-in-part of application No. 13/911,438, filed on Jun. 6, 2013, now Pat. No. 8,725,140, which is a continuation-in-part of application No. 13/413,516, filed on Mar. 6, 2012, now Pat. No. 8,478,238, which is a continuation-in-part of application No. 11/804,582, filed on May 18, 2007, now Pat. No. 8,745,184, which is a continuation-in-part of application No. 11/398,493, filed on Apr. 4, 2006, now Pat. No. 8,498,615, which is a continuation-in-part of application No. 11/119,401, filed on Apr. 29, 2005, now Pat. No. 8,346,214, said application No. 14/213,396 is a continuation-in-part of application No. 13/341,800, filed on Dec. 30, 2011, now Pat. No. 8,917,611, said application No. 14/213,396 is a continuation-in-part of application No. 12/652,694, filed on Jan. 5, 2010, now Pat. No. 8,325,614, which is a continuation-in-part of application No. 12/387,962, filed on May 7, 2009, now Pat. No. 8,391,161.

(60) Provisional application No. 61/794,198, filed on Mar. 15, 2013, provisional application No. 61/567,017, filed on Dec. 5, 2011, provisional application No. 61/501,131, filed on Jun. 24, 2011.

(51) Int. Cl.
*H04L 29/06* (2006.01)
*H04W 4/00* (2009.01)
*H04W 4/24* (2009.01)
*H04W 8/04* (2009.01)
*H04W 8/10* (2009.01)
*H04W 8/26* (2009.01)
*H04W 12/06* (2009.01)

(52) U.S. Cl.
CPC .............. *H04M15/58* (2013.01); *H04M 15/61* (2013.01); *H04M 15/62* (2013.01); *H04M 15/70* (2013.01); *H04M 15/715* (2013.01); *H04M 15/725* (2013.01); *H04M 15/80* (2013.01); *H04M 15/8038* (2013.01); *H04M 15/8083* (2013.01); *H04W 4/001* (2013.01); *H04W 4/003* (2013.01); *H04W 4/24* (2013.01); *H04W 8/04* (2013.01); *H04W 8/10* (2013.01); *H04M 2215/208* (2013.01); *H04M 2215/2026* (2013.01); *H04W 8/26* (2013.01); *H04W 12/06* (2013.01)

(56) References Cited

U.S. PATENT DOCUMENTS

| | | | |
|---|---|---|---|
| 5,379,423 A | 1/1995 | Mutoh et al. |
| 5,734,699 A | 3/1998 | Lu et al. |
| 5,854,982 A | 12/1998 | Chambers et al. |
| 5,915,226 A | 6/1999 | Martineau |
| 5,943,619 A | 8/1999 | Coyne et al. |
| 6,124,799 A | 9/2000 | Parker |
| 6,584,310 B1 | 6/2003 | Berenzweig |
| 6,684,072 B1 | 1/2004 | Anvekar et al. |
| 6,956,820 B2 | 10/2005 | Zhu et al. |
| 6,997,379 B2 | 2/2006 | Boyce et al. |
| 6,999,480 B2 | 2/2006 | Subrahmanyan et al. |
| 7,027,813 B2 | 4/2006 | Hicks et al. |
| 7,184,738 B2 | 2/2007 | Otaka et al. |
| 7,184,768 B2 | 2/2007 | Hind et al. |
| 7,190,969 B1 | 3/2007 | Oh et al. |
| 7,266,371 B1 | 9/2007 | Amin et al. |
| 7,274,933 B2 | 9/2007 | Zinn et al. |
| 7,366,510 B2 | 4/2008 | Gunaratnam et al. |
| 7,369,528 B2 | 5/2008 | Tian |
| 7,395,083 B2 | 7/2008 | Buckley |
| 7,483,694 B2 | 1/2009 | Varanda |
| 7,610,045 B2 | 10/2009 | Little et al. |
| 7,616,594 B2 | 11/2009 | Roberts et al. |
| 7,620,162 B2 | 11/2009 | Aaron et al. |
| 7,668,573 B2 | 2/2010 | Laroia et al. |
| 7,676,552 B2 | 3/2010 | Eilam et al. |
| 7,788,352 B2 | 8/2010 | Breuer et al. |
| 7,885,636 B2 | 2/2011 | Taglienti et al. |
| 7,987,449 B1 | 7/2011 | Marolia et al. |
| 8,018,955 B2 | 9/2011 | Agarwal et al. |
| 8,023,425 B2 | 9/2011 | Raleigh |
| 8,036,664 B2 | 10/2011 | Khetawat et al. |
| 8,099,078 B2 | 1/2012 | Lazaridis |
| 8,107,953 B2 | 1/2012 | Zimmerman et al. |
| 8,112,549 B2 | 2/2012 | Srinivasan et al. |
| 8,122,062 B2 | 2/2012 | Brendle et al. |
| 8,149,749 B2 | 4/2012 | Maeda et al. |
| 8,214,536 B2 | 7/2012 | Zhao |
| 8,229,812 B2 | 7/2012 | Raleigh |
| 8,229,815 B1 | 7/2012 | Kern |
| 8,250,207 B2 | 8/2012 | Raleigh |
| 8,264,687 B2 | 9/2012 | Lundquist et al. |
| 8,295,817 B2 | 10/2012 | Alfano et al. |
| 8,306,534 B2 | 11/2012 | Yach et al. |
| 8,346,225 B2 | 1/2013 | Raleigh |
| 8,351,898 B2 | 1/2013 | Raleigh |
| 8,355,337 B2 | 1/2013 | Raleigh |
| 8,391,834 B2 | 3/2013 | Raleigh |
| 8,411,604 B2 | 4/2013 | Reif |
| 8,531,972 B2 | 9/2013 | Poon et al. |
| 8,565,101 B2 | 10/2013 | Poon et al. |
| 8,730,820 B2 | 5/2014 | Poon et al. |
| 8,842,631 B2 | 9/2014 | Horn et al. |
| 8,965,332 B2 | 2/2015 | Mohammed et al. |
| 2002/0041576 A1 | 4/2002 | Chang et al. |
| 2002/0072359 A1 | 6/2002 | Moles et al. |
| 2002/0095483 A1 | 7/2002 | Lee et al. |
| 2002/0154632 A1 | 10/2002 | Wang et al. |
| 2002/0197991 A1 | 12/2002 | Anvekar et al. |
| 2003/0003775 A1 | 1/2003 | Chen |
| 2003/0022689 A1 | 1/2003 | McElwain et al. |
| 2003/0027581 A1 | 2/2003 | Jokinen et al. |
| 2003/0037755 A1 | 2/2003 | Nomura |
| 2003/0041131 A1 | 2/2003 | Westerinen et al. |
| 2003/0064723 A1 | 4/2003 | Thakker |
| 2003/0086425 A1 | 5/2003 | Bearden et al. |
| 2003/0157935 A1 | 8/2003 | Kauhanen |
| 2004/0043752 A1 | 3/2004 | Matsumura |
| 2004/0049394 A1 | 3/2004 | Burger et al. |
| 2004/0097230 A1 | 5/2004 | Natarajan et al. |
| 2004/0103171 A1 | 5/2004 | Mullis, II et al. |
| 2004/0113929 A1 | 6/2004 | Matsuzaki |
| 2004/0203744 A1 | 10/2004 | Hicks et al. |
| 2005/0020243 A1 | 1/2005 | Benco et al. |
| 2005/0037755 A1 | 2/2005 | Hind et al. |
| 2005/0060250 A1 | 3/2005 | Heller et al. |
| 2005/0079863 A1 | 4/2005 | Macaluso |
| 2005/0097595 A1 | 5/2005 | Lipsanen et al. |
| 2005/0113088 A1 | 5/2005 | Zinn et al. |
| 2005/0233733 A1 | 10/2005 | Roundtree et al. |
| 2005/0255880 A1 | 11/2005 | Inoue |
| 2005/0266825 A1 | 12/2005 | Clayton |
| 2006/0019647 A1 | 1/2006 | Muhonen et al. |
| 2006/0030315 A1 | 2/2006 | Smith et al. |
| 2006/0035631 A1 | 2/2006 | White et al. |
| 2006/0173976 A1 | 8/2006 | Vincent et al. |
| 2006/0195891 A1 | 8/2006 | Freyman et al. |
| 2006/0203739 A1 | 9/2006 | Padmanabhan et al. |
| 2006/0205434 A1 | 9/2006 | Tom et al. |
| 2007/0014243 A1 | 1/2007 | Meyer et al. |
| 2007/0026861 A1 | 2/2007 | Kuhn et al. |
| 2007/0083528 A1 | 4/2007 | Matthews et al. |
| 2007/0245238 A1 | 10/2007 | Fugitt et al. |
| 2007/0268361 A1 | 11/2007 | Ren |
| 2007/0268631 A1 | 11/2007 | Guo et al. |
| 2008/0003980 A1 | 1/2008 | Voss et al. |
| 2008/0040452 A1 | 2/2008 | Rao et al. |
| 2008/0076419 A1 | 3/2008 | Khetawat et al. |

(56) References Cited

U.S. PATENT DOCUMENTS

| | | |
|---|---|---|
| 2008/0084993 A1 | 4/2008 | Peddireddy et al. |
| 2008/0277482 A1 | 11/2008 | Parlange et al. |
| 2009/0002684 A1 | 1/2009 | Sanders |
| 2009/0002968 A1 | 1/2009 | Li et al. |
| 2009/0019857 A1 | 1/2009 | Tisdale et al. |
| 2009/0029684 A1 | 1/2009 | Rosenblatt et al. |
| 2009/0055736 A1 | 2/2009 | Yoon |
| 2009/0059829 A1 | 3/2009 | Bachmann et al. |
| 2009/0061839 A1 | 3/2009 | Zimmerman et al. |
| 2009/0061934 A1 | 3/2009 | Hauck et al. |
| 2009/0075646 A1 | 3/2009 | Lohlein et al. |
| 2009/0098867 A1 | 4/2009 | Varanda |
| 2009/0149175 A1 | 6/2009 | Lopresti et al. |
| 2009/0150218 A1 | 6/2009 | Brunner et al. |
| 2009/0168660 A1 | 7/2009 | Bhatia et al. |
| 2009/0191857 A1 | 7/2009 | Horn et al. |
| 2010/0010922 A1 | 1/2010 | Foottit et al. |
| 2010/0056114 A1 | 3/2010 | Roundtree et al. |
| 2010/0125495 A1 | 5/2010 | Smith et al. |
| 2010/0159902 A1 | 6/2010 | Roundtree et al. |
| 2010/0192062 A1 | 7/2010 | Anwar |
| 2010/0248690 A1 | 9/2010 | Biggs et al. |
| 2010/0273456 A1 | 10/2010 | Wolovitz et al. |
| 2010/0278056 A1 | 11/2010 | Meloche et al. |
| 2010/0332072 A1 | 12/2010 | Ishiko et al. |
| 2011/0208853 A1 | 8/2011 | Castro-Castro et al. |
| 2011/0234427 A1 | 9/2011 | Ingram et al. |
| 2011/0249618 A1 | 10/2011 | Shaw et al. |
| 2011/0270722 A1 | 11/2011 | Cai et al. |
| 2012/0004974 A1 | 1/2012 | Burger et al. |
| 2012/0028620 A1 | 2/2012 | Roundtree et al. |
| 2012/0101952 A1 | 4/2012 | Raleigh et al. |
| 2012/0231785 A1 | 9/2012 | Poon et al. |
| 2012/0327787 A1 | 12/2012 | Mohammed et al. |

FOREIGN PATENT DOCUMENTS

| | | |
|---|---|---|
| EP | 1672945 A1 | 6/2006 |
| EP | 1553729 B1 | 11/2006 |
| FR | 2970161 A1 | 8/2000 |
| FR | 2814029 A1 | 3/2002 |
| GB | 2389745 A1 | 12/2003 |
| WO | 0070900 A1 | 11/2000 |
| WO | 0137602 A1 | 5/2001 |
| WO | 0221872 A1 | 3/2002 |
| WO | 02067563 A1 | 8/2002 |
| WO | 2009025375 A1 | 2/2009 |
| WO | 2009092115 A2 | 7/2009 |
| WO | 2009133029 A1 | 11/2009 |

OTHER PUBLICATIONS

ETSI TS 100 922 V7.1.1 (Jul. 1999) Digital Cellular Telecommunication Systems (Phase 2+); Subscriber Identity Modules (SIM) (GSM 02.17 version 7.1.1 Release 1998).

Office action from a corresponding U.S. Appl. No. 14/226,269 dated Apr. 22, 2015.

European search report from related cased, EP application No. 14769820.3 dated Nov. 23, 2015.

Notice of Allowance from related case, U.S. Appl. No. 14/624,419 dated Sep. 17, 2015.

Non Final Office action from related case, U.S. Appl. No. 14/924,520 dated Dec. 9, 2015.

Notice of Allowance from related case, U.S. Appl. No. 13/840,234 dated Nov. 3, 2015.

Grgic T et al: Policy-based charging in IMS for multimedia services iwth negotiable QoS requirements, CAD Systems in Microelectronics, 2009 CADSM 2009. 10th International Conference—The Experience of Designing and Application of, IEEE, Piscataway, NJ, USA, Jun. 8, 2009, pp. 257-264, XP031514058.

3rd Generation Partnership Project; Technical Specification Group Services and System Aspects; Policy and charging control architecture (Release 12), 3GPP Standard; 3GPP TS 23.203, 3rd Generation Partnership Project (3GPP), Mobile Competence Centre; 650, Route des Lucioles; F-06921 Sophia-Antipolis Cedex; France, vol. SA WG2, No. V12.0.0, Mar. 5, 2013, pp. 1-183, XP050691808.

MY ACCOUNT FLOW

DIAGNOSTICS HELP FLOW

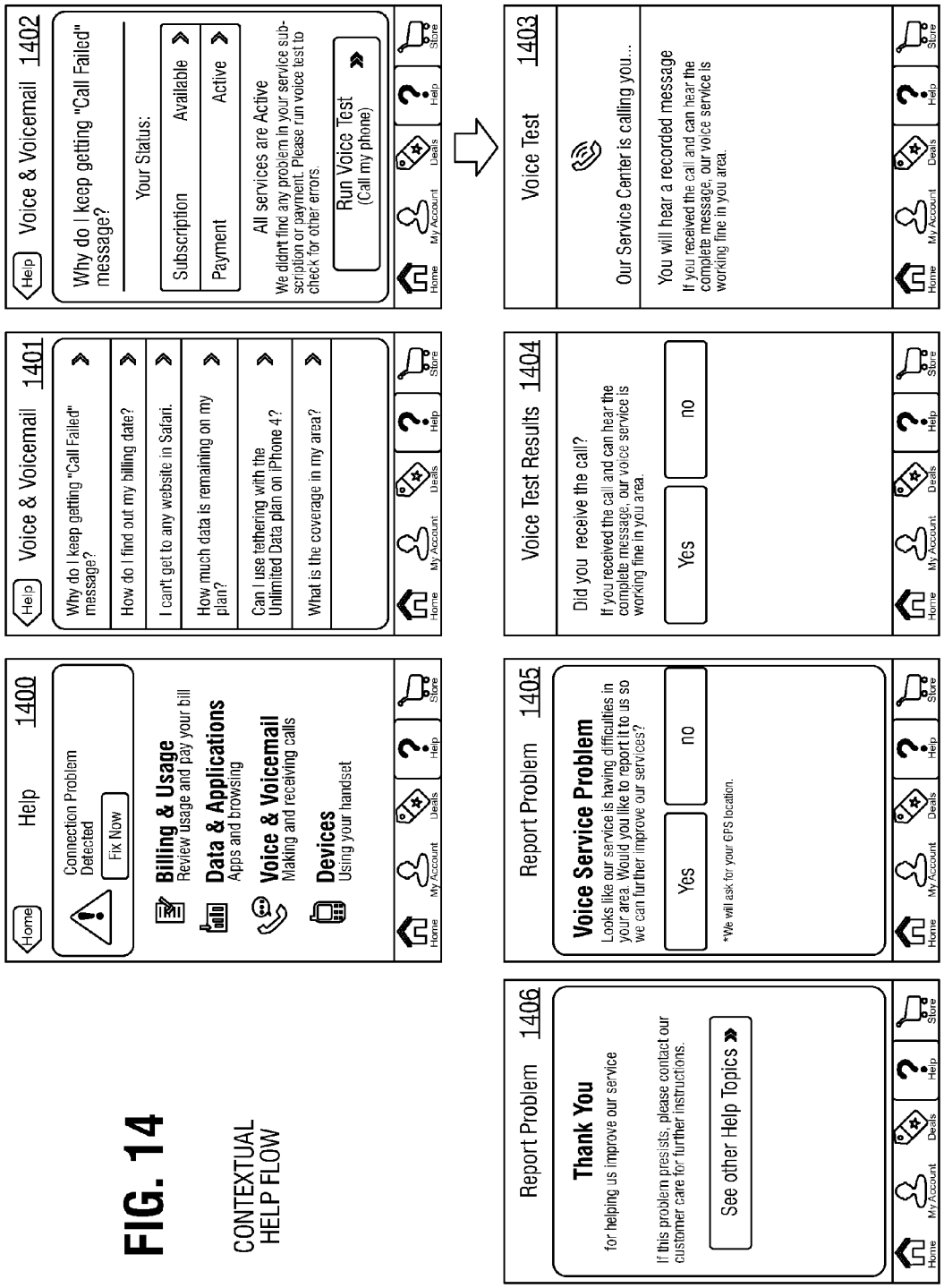

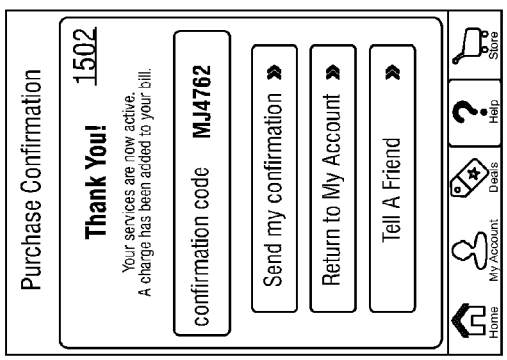
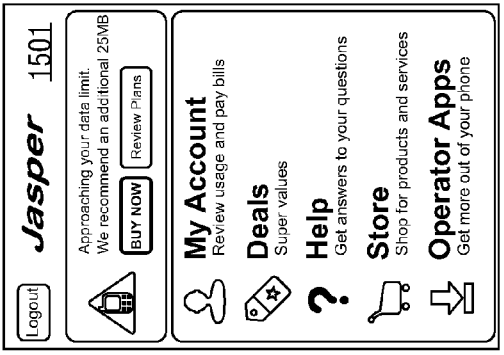
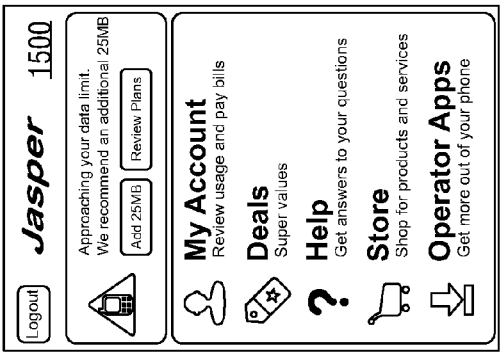
USAGE ALERT
FIG. 15A
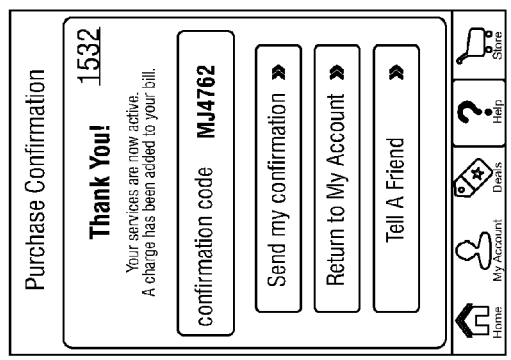
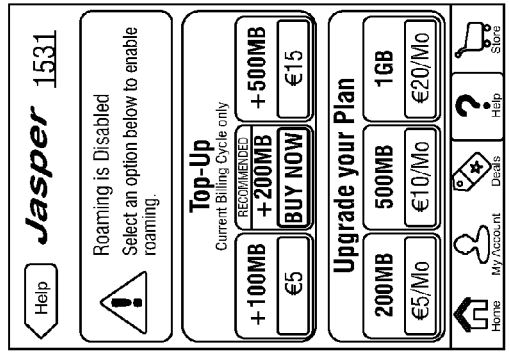
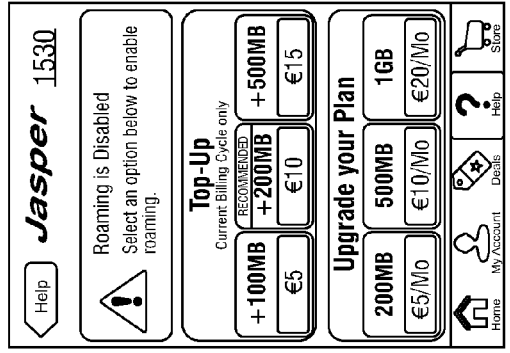
ROAMING ALERT
FIG. 15B

PUBLISHING OFFER/POLICY FROM CSP TO OPERATOR

PROVISIONING INTEGRATION

BILLING INTEGRATION

| STATE NAME |
|---|
| STATE DESCRIPTION |
| REQUIRED STATE FLAG |
| PREREQUISITE STATE |
| ALLOWED NEXT STATE(S) |
| EXCLUSIVITY RULE(S) |
| TRANSITION MODE(S) AVAILABLE TO MOVE TO A NEXT STATE |

FIG. 29

| CURRENT STATE |
|---|
| TRANSITION CONDITION |
| STATE TRANSITIONED TO |
| TRANSITION DESCRIPTION |

FIG. 30

IMSI RE-ALLOCATION

METHOD FOR ENABLING A WIRELESS DEVICE FOR GEOGRAPHICALLY PREFERENTIAL SERVICES

CROSS-REFERENCE TO RELATED APPLICATIONS

This application is based upon and claims the benefit of priority for U.S. patent application Ser. No. 14/460,196 filed on Aug. 14, 2014 which claims priority of U.S. patent application Ser. No. 14/213,396 filed Mar. 14, 2014 and issued as U.S. Pat. No. 8,867,575 on Oct. 21, 2014, which claims the benefit of priority of U.S. Provisional Patent Application No. 61/794,198 filed on Mar. 15, 2013, the entire contents of which are incorporated herein by reference. U.S. patent application Ser. No. 14/213,396 is a continuation-in-part of U.S. patent application Ser. No. 13/911,438 filed on Jun. 6, 2013 and issued as U.S. Pat. No. 8,725,140 on May 13, 2014, which is a continuation-in-part of U.S. patent application Ser. No. 13/413,516 filed on Mar. 6, 2012 and issued as U.S. Pat. No. 8,478,238 on Jul. 2, 2013, which is based upon and claims the benefit of priority for prior Provisional Patent Application No. 61/567,017 filed on Dec. 5, 2011. U.S. patent application Ser. No. 13/413,516 is a continuation-in-part of co-pending U.S. patent application Ser. No. 11/804,582 filed May 18, 2007 and issued as U.S. Pat. No. 8,745,184 on Jun. 3, 2014, a continuation-in-part of co-pending U.S. patent application Ser. No. 11/398,493 filed Apr. 4, 2006 and issued as U.S. Pat. No. 8,498,615 on Jul. 30, 2013, which is a continuation-in-part of U.S. patent application Ser. No. 11/119,401 filed Apr. 29, 2005 and issued as U.S. Pat. No. 8,346,214 on Jan. 1, 2013. U.S. patent application Ser. No. 14/213,396 is also a continuation-in-part of U.S. patent application Ser. No. 13/341,800 filed Dec. 30, 2011 and issued as U.S. Pat. No. 8,917,611 on Feb. 23, 2014, which claims the benefit of U.S. Provisional Patent Application No. 61/501,131 filed on Jun. 24, 2011. U.S. patent application Ser. No. 14/213,396 is also a continuation-in-part of U.S. patent application Ser. No. 12/652,694 filed Jan. 5, 2010 and issued as U.S. Pat. No. 8,325,614 on Dec. 4, 2012, which is a continuation in part of U.S. patent application Ser. No. 12/387,962 filed May 7, 2009 and issued as U.S. Pat. No. 8,391,161 on Mar. 5, 2013, the entire contents of which are incorporated herein by reference.

FIELD OF THE INVENTION

Embodiments of the invention relate to services provided to consumers and operators of wireless networks.

BACKGROUND

The continued evolution of wireless network technology allows consumers today to communicate with each other by voice, data and text messaging through highly sophisticated network architectures. A consumer can make a phone call, download data and send text messages using a single wireless communication device, such as a feature phone, smartphone, tablet, or Blackberry, etc. Typically, a consumer enters a network operator or third party retail store/storefront, selects a wireless device such as a smartphone, activates the smartphone, purchases a service plan from a network operator. For example, in order to activate the smartphone, a salesperson in the storefront may have to install an inactive SIM card into the smartphone, and then coordinate with the network operator to activate the SIM card in accordance with the parameters associated with the chosen service plan. All the while, the consumer is expending time, energy, and expense while the network operator is incurring overhead costs associated with providing the storefront and employing the sales force in order to provide the customer service required for the sales and activation of the smartphone. Subsequently, should the consumer allow his service plan to lapse and become inactivate, for whatever reason, and then decide to re-institute his/her service, this entire scenario must be repeated, incurring additional time and expense on the part of both the consumer and network operator. Thus, the conventional operator's system for managing usage, offers, pricing and policy is inflexible and cannot easily adapt to the consumers' needs.

Depending on technology, a wireless device may or may not require a Subscriber Identity Module (SIM). Technologies such as IS95 CDMA and variants thereof do not require a SIM. Devices that use such standards consider the wireless service subscription to be associated with the device itself. Other wireless technologies, such as those based on GSM and UMTS, use a SIM. The SIM is inserted into the wireless device. The SIM contains the identity of the subscriber and other subscription related information. Therefore, the subscription and the device are separate. It is possible to move a SIM from one device to another and the subscription moves with it. Service usage is associated with the SIM. Therefore, it is possible to make a call with a given device and SIM, then move the SIM to a second device and make a second call. Both calls will be associated with the same subscriber and with the same phone number and will be billed to the same customer.

Initially, the SIM was a credit-card sized card that could easily be moved from device to device. However, for many years, SIMs have been much smaller (approx 1 cm×2 cm or less) and have been inserted in a wireless device in a manner that is not convenient to remove (e.g. behind the device battery). More recently, SIMs may take the form of a soldered-on chip that is not removable at all.

Moreover, recent developments have dictated that the subscription information or subscriber-specific information is not all stored on the SIM. For example, in GSM-based technologies such as UMTS and LTE, the use of data services must be associated with a subscribed service called an access point name (APN). A given user can use data services only if the user requests an APN that is stored against the subscriber's profile in the network. But the APN is not defined on the SIM. The APN is specified on the device. There are many other items of subscriber-specific data that reside on the device rather than the SIM, including for example, contact lists, email configurations, text message configurations and Virtual Private Network (VPN) settings.

Therefore, the SIM no longer contains all the subscription information to enable a user to access all provided services, and the SIM is no longer easily portable between devices. Effectively, the SIM and device are firmly linked and it is only the combination that fully identifies a subscriber and his/her subscribed services.

When a user wishes to change to a new device, it is necessary to transfer subscription information from the old device/SIM combination to the new device/SIM combination. In some cases today, the user will move the old SIM to the new device. In such a case, the device must be configured with non-SIM-stored subscription information (e.g. APN). In some other cases today, the user may be provided with a new SIM as well as a new device. In those cases, the network operator makes changes in the network to assign the new SIM to the subscriber (e.g. the subscriber phone number is assigned to the new SIM). Other personal information stored on the old SIM may be lost or must be manually transferred from one SIM to the other. In addition, the device must be configured correctly—e.g. with the appropriate APN.

It should be noted that, besides the purchase of a new device, there are many situations where a user may wish to use a different device with a given subscription, or use a given device with different subscriptions.

For example, if USER A has a device that is out of battery power, he may wish to borrow a device from USER B and easily configure USER B's device to provide the services subscribed by USER A.

There are cases where a given user may have different subscriptions and may want a single device to be configured to act in accordance with one subscription or another on demand. For example, imagine a business traveler that has wireless service subscriptions in different countries so that he can use one wireless service provider in one country and another wireless service provider in a second country, and avoid roaming charges. Today, such travelers typically have either two devices and two SIMs, or one device with two SIMs and will change the SIM in the device as needed.

BRIEF DESCRIPTION OF THE DRAWINGS

The present invention is illustrated by way of example and not limitation in the figures of the accompanying drawings, in which like references indicate similar elements and in which:

FIG. 14 is an embodiment of a display screen of a CDA that shows a "Contextual Help" feature.

FIG. 15A is an embodiment of a display screen of a CDA that shows a "Usage Alert" feature.

FIG. 15B is an embodiment of a display screen of a CSP device application that shows a "Roaming Alert" feature.

FIG. 29 is a block diagram illustrating an embodiment of a state definition.

FIG. 30 illustrates an embodiment of a state transition rule definition.

DETAILED DESCRIPTION

Figure 1:
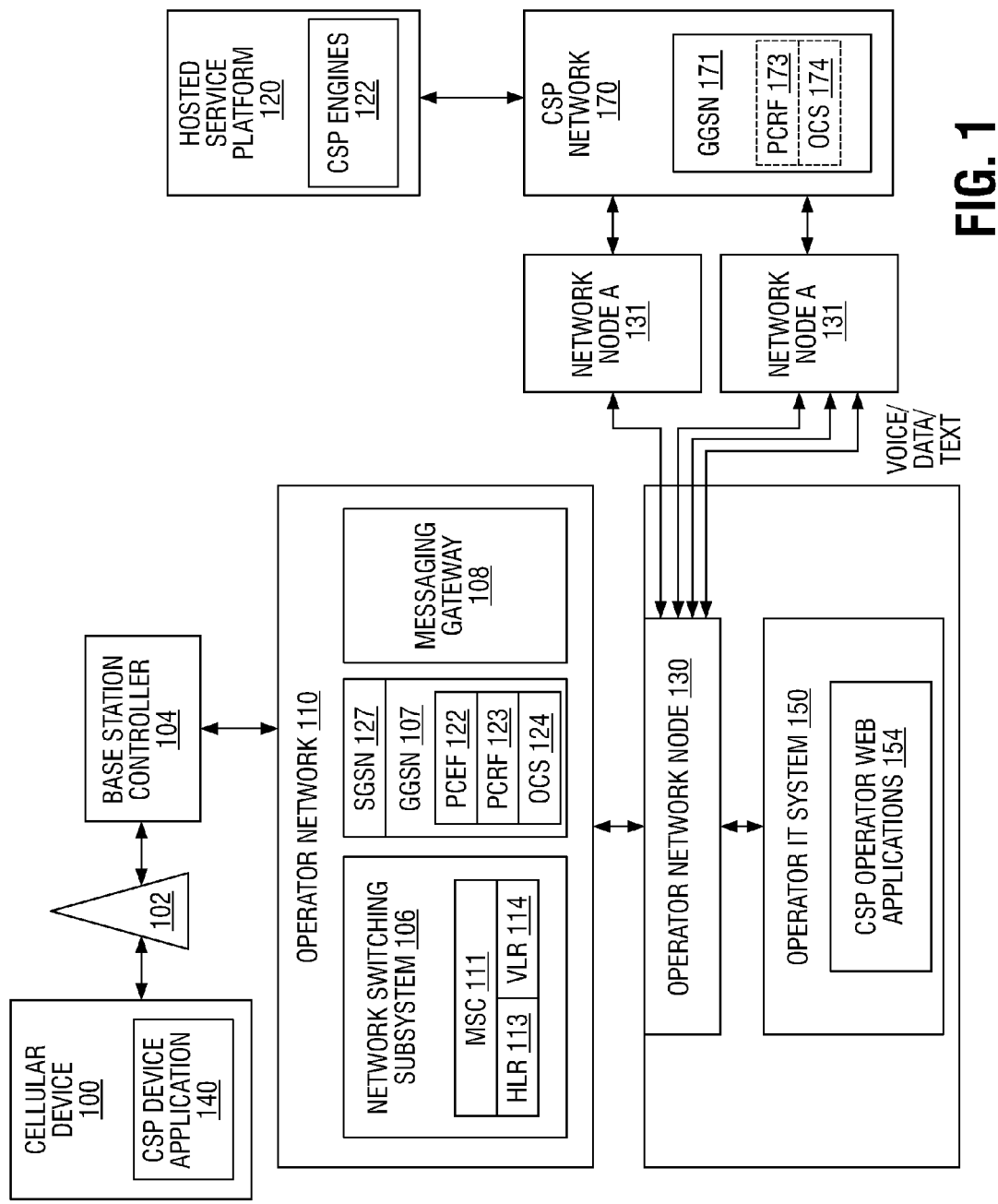
FIG. 1 is a diagram of one embodiment of network architecture in which a Core Service Platform (CSP) system may operate.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Wireless communications services are provided to subscribers by a Mobile Network Operator (MNO). In most cases, the wireless network operator owns and operates the wireless network infrastructure, including cell sites, switches, routers, transmission equipment, subscriber databases, provisioning systems and charging systems. In some cases, however, service is provided by a Mobile Virtual Network Operator (MVNO). A typical MVNO does not provide cell sites and transmission equipment and may provide only a subset of other functions such as subset of databases, charging systems and provisioning systems. For those functions that an MVNO does not provide directly, the MVNO gains access to corresponding functions provided by a traditional (not virtual) Mobile Network Operator. In the case of both a MNO and MVNO, the operator will have access to a provisioning and charging system. The provisioning system updates subscriber databases and other network systems in accordance with services and features to be assigned to a subscriber. The charging system charges the customer for those services and features in accordance with the customer's subscribed tariff.

When a subscriber wishes to avail of services, those services are provisioned through the Operator's provisioning system. In the case where a subscriber wishes to use a specific device and SIM, the operator's provisioning system provisions the SIM data against the subscriber record in the subscriber database, and also provisions the device with the subscriber's profile, including operator-specific and subscriber-specific settings, as needed. Provisioning these operator-specific and subscriber-specific settings may be done through an Over-The-Air (OTA) Channel to the device. These settings may include devices settings for data access (e.g. APN), specific operator short codes for premium SMS services, voice mail numbers, customer care number, contact address book, subscriber profile for email access, iTunes® profile, customized browser settings, ringtone settings, etc. A subscriber can already have his subscriber profile including these settings stored on his device. When the subscriber acquires a new device, borrows a device (e.g., when his own device has a dead battery), or otherwise switch from one existing subscription to another existing subscription, the provisioning system described herein can retrieve these settings from a database and provision these settings to the subscriber's device (e.g., new or borrowed device).

Embodiments of the invention allow a user to enter secure information into a device and have that device act in accordance with one subscription or another as needed, all without the need for swapping SIMs or other device manipulation. Embodiments of the invention allow a user to enter secure information into a device and for that device to assume all necessary subscription information to provide all subscribed services, all without the need for swapping SIMs or other device manipulation. According to embodiments of the invention, a given user can use any device and SIM and have that device and SIM combination be provisioned to provide all of that subscriber's services. The subscriber may enter a specific code to the device, which indicates that the device and its embedded SIM are to be provisioned to provide all of the services that the subscriber has subscribed to. The specific code includes an identifier for the subscriber, such as a telephone number, account number, social security number or other subscriber identifier.

Figure 15C:
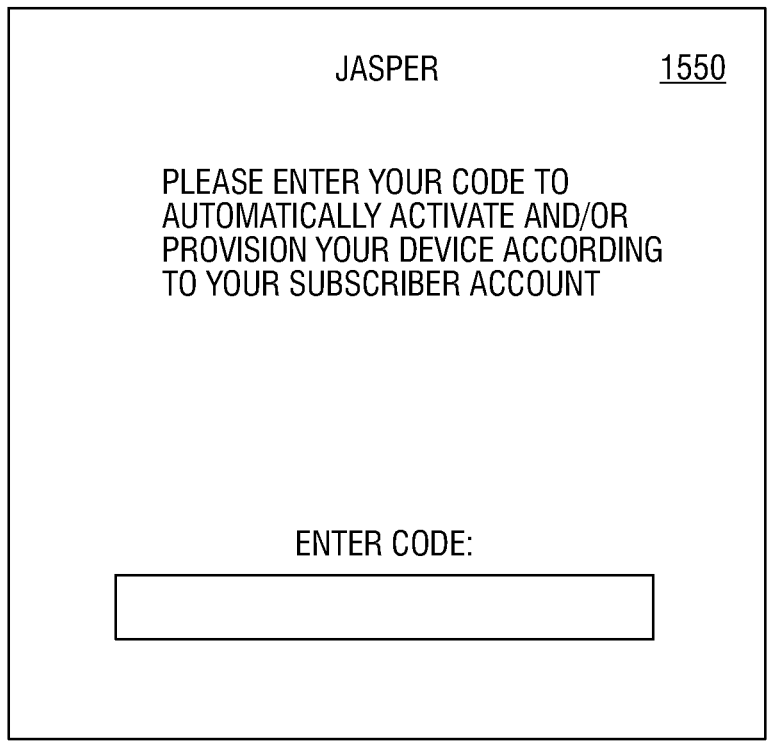
FIG. 15C is an embodiment of a display screen of a device that allows a subscriber to enter a code.

An example of a device display screen 1550 that allows a subscriber to enter a code is shown in FIG. 15C. The specific code may include parameters associated with the usage of the device and SIM by the subscriber. For example, the code may limit the user to the usage of the device and SIM for only a specific period of time, after which the device and SIM revert to their previous provisioned state. In another embodiment, the specific code may limit the usage of the SIM and device to only a specific location or geographic area. For example, a user may be able to use a device and SIM with his own subscription and services only within a Mobile Network Operator retail outlet in a try-before-you buy scenario.

In alternative embodiments, rather than such usage parameters being entered jointly with the code that identifies the subscriber, the parameters may be entered separately and/or individually. For example, the user may select the parameters from a menu of options on a graphical user interface (GUI) of a mobile device.

The specific code may also include security credentials that can be used to verify that the subscriber in question is allowed to use the device and SIM in question. In one embodiment, the security credentials may be provided by the Mobile Network Operator, for example, in the case where a user has purchased the phone. In another embodiment, the security credentials may be provided by an existing user of the device and SIM (e.g. in the case where USER A lends a device and SIM to USER B). The security credentials, if any, may be provided by any other authorized entity, such as an enterprise communications manager. The security credentials may be entered jointly with the subscriber identifier or may be entered separately In one embodiment, the display screen of FIG. 15C appears on the device when a soft key or a function of a device application (e.g., the Core Services Platform Device Application (CDA) to be described below) is activated. In one embodiment, when a user (i.e., a borrower) borrows the device from a subscriber (i.e., a lender), a "lending phone function" provided by the device allows the user to input his code, where the code is linked to the user's subscriber profile stored in a database. In a scenario where the user has his own device (e.g., with a dead battery) and subscription, his subscriber profile can be resident on this own device. The "lending phone function" may be activated only with the subscriber's permission (i.e., a lender); e.g., and when the user (i.e., a borrower) enters a valid passcode. The device then sends the code and the International Mobile Subscriber Identity (IMSI) stored on the borrowed device to a provisioning system, such as the Core Services Platform (CSP) and/or the global platform for the SIMs to be described below. The provisioning system uses the IMSI from the lender's phone and the code to retrieve the user's subscriber profile (including the operator-specific and the user-specific settings) from the CSP databases and the home location register (HLR), provisions the user's subscriber profile (including the operator-specific and the user-specific settings) to the borrowed device, and suspends the subscriber's service.

In an alternative embodiment, when the user enters his code into the device, the device sends the code to the CSP along with a request for a new IMSI. The CSP then locates the user's subscriber profile in CSP databases and the HLR, sends the IMSI to the device via an OTA channel, and provisions the user's subscriber profile (including the operator-specific and the user-specific settings) to the device.

In one scenario, a pool of mobile devices may be shared by a team of users that work for a company; e.g., a sales and management team of 20 people that travel worldwide. In an effort to reduce costs and be more efficient, the company may have only 5 top-of-the-line mobile devices that are distributed as a loaner on an as needed basis. Each member of the team is given a personal code. When team members check out the devices for business purposes, they can input their personal codes to have the devices personalized to each one of them with their subscriber profiles. The company can also subscribe to a Mobile Broadband (MBB) platform so that the usage of team members is segregated and tracked per SIM and the company is able to account for the activities of each team member. As described previously in the above alternative embodiment, when a team member enters his code into the device, the device sends the code to the CSP along with a request for an IMSI. The CSP then locates the member's subscriber profile in the CSP databases and the HLR, and provisions an IMSI and the member's subscriber profile (including the operator-specific and the user-specific settings) to the device. As the team member travels around the world, the provisioning system can re-IMSI the mobile device (that is, provision a different IMSI) for the best rate plans to minimize roaming charges.

The scenarios described above can be analogously applied to a new mobile device acquired by a subscriber who has a previous device and SIM combination. When the subscriber acquires a new mobile device, the provisioning system may remove the subscriber's services from the previous device and SIM combination such that the subscriber may use only one device and SIM combination at a time. Alternatively, the provisioning system may provision subscriber databases and service platforms to allow for the subscriber to use either device and SIM combination, including both at the same time. For example, a subscriber who has a previous device and SIM acquires a new device. The new device has been provisioned a new IMSI. When the subscriber enters his code into the new device, the new device sends the code and the new IMSI to the CSP. The CSP then retrieves the subscriber's profile (including the operator-specific and the user-specific settings) from the CSP databases and the HLR using the new IMSI and the code, and provisions the retrieved information to the new device.

In one embodiment, the CSP retrieves or maintains the subscriber profiles in the CSP databases. For example, the CSP may offer a promotion to a subscriber to upgrade to a new phone/tablet and sends a promotional code. In anticipation, or as a matter of course, the CSP retrieves or maintains this subscriber profile (which is also resident on the subscriber's current device) in the CSP databases. Then upon receipt of the code and the IMSI from the new device, the CSP provisions network elements and sends the subscriber profile over the air to the new device.

The specific code, associated security credentials, and other information described above may be passed from the device via a specific channel to the provisioning system of the network operator. The provisioning channel may use any of a number of transport mechanisms, including GPRS, UMTS, LTE, SMS, USSD, circuit-switched data or DTMF. The provisioning system verifies the subscriber identity, the subscriber credentials and the services and features to be provisioned. The provisioning system then provisions the approved services against the subscriber, SIM and device in question. The provisioning system does this through updating subscriber databases, service platforms and by updating the SIM and/or the device through OTA provisioning. The OTA provisioning may be performed through any of a number of channels including SMS, USSD, GPRS, UMTS, HSPA, LTE.

In the event that the subscriber is to be allowed to use the device and SIM combination for a limited period of time, the provisioning system may start a timer associated with the provisioning of services against the device and SIM combination. When that timer expires, the provisioning system may remove the subscriber's services from the device and SIM combination. The provisioning system may send an alert to the subscriber in advance of removing the subscriber's services. The subscriber may receive the alert via the GUI on the device. The device may employ a specialized on-device application to enable such functionality. For example, the device may employ a Core Services Platform Device Application (CDA) as further described in detail below. The provisioning system may offer the subscriber the opportunity to extend the subscriber's services against the device and SIM combination. For example, the subscriber may have been given the device and SIM on a trial basis and may be given the opportunity to purchase the device and SIM upon expiry of the trial, or subscribe to a specific contract term at the end of the trial.

In the event of the expiry of any temporary usage period for the subscriber to use the device and SIM combination, then the provisioning system may re-provision the device and SIM combination to its provisioned state that existed prior to the start of the temporary usage period.

Embodiments of the invention describe a system and method that may include receiving a code provided by a user through a GUI of the wireless device to be used for activating services on the wireless device. An activation message including the user-provided code may then be transmitted over a management or provisioning channel available to inactive, unprovisioned, or previously provisioned inactive wireless devices for delivery to a provisioning server for use in activating or re-activating services on the wireless device.

In one or more embodiments, the services requested to be activated include services for a new unprovisioned wireless device or an existing out-of-service previously provisioned wireless device. In one or more embodiments, the services requested to be activated may also include the addition or purchasing of services including data package upgrades, voice plan upgrades, and any additional service upgrades for wireless devices that have already been activated.

In a typical consumer interaction with a conventional network operator/carrier infrastructure, a consumer enters a network operator or third party retail storefront, interacts with a salesperson, and selects a wireless device such as a smartphone for activation and purchase. Next, the salesperson must activate the smartphone by inserting an inactive SIM card into the smartphone, and then coordinate with the network operator to activate the SIM card in accordance with the parameters associated with a chosen service plan.

In order to provision the device, the retail representative/salesperson takes the consumer to a terminal. The salesperson logs into the store's activation program. The salesperson asks the consumer for personal information, e.g. name, address, phone number, date of birth, etc. and enters that information into the terminal. The salesperson asks for financial information and enters that information into the activation system and performs a credit check. The store's activation program performs a credit check and provides a score back to the salesperson. Based upon this score, the salesperson tells the Customer what type of postpaid plans they can select from, how much discount they can get on the smartphone or tells them they cannot select a postpaid phone and offers then a prepaid plan. The salesperson reviews the available offers and services with the consumer and confirms the offer they want. The salesperson enters offer information into the store's activation system. The store activation system provides the salesperson details on the selected offers and services. The salesperson explains the payment terms to the Customer. The salesperson asks for payment information for the offers selected and enters this payment information into the store's activation system. The salesperson asks the consumer if they want to pay for the phone or add it to their monthly bill. If the former, the salesperson collects and processes payment for the phone. The salesperson coordinates with the network operator to activate the SIM card in accordance with the parameters associated with a chosen service plan. Upon successful payment, the salesperson provides the consumer (now a Customer) with the purchased phone and activated SIM card. The salesperson places the activated SIM card into the phone and gives it to the Customer. The Customer takes the phone and leaves the store with an activated handset.

An embodiment of the invention describes an improved consumer experience wherein the consumer may self-activate and provision a wireless or mobile device such as a smartphone or a tablet by him or herself. This self-activation or automatic activation and provisioning is made possible by the use of a combination of an activation ready SIM card and a Customer System embodied as a network server in communication with the carrier network. An activation ready SIM card allows the wireless/mobile device to have a limited connectivity with the Customer System and/or carrier network for the purpose of provisioning the device to allow carrier network connectivity for combinations of voice, data, and text messaging. Once provisioned, the SIM transitions from an activation ready state to an activated state that allows the combinations of voice, data, and text messaging connectivity according to a selected service plan.

In one embodiment, the consumer can perform the self-activation or automatic activation and provisioning by utilizing a GUI in combination with a mobile device application. In one embodiment mobile device application is referred to as CDA. In one embodiment, the consumer may first attempt to utilize voice, data, and/or text messaging services in his/her newly acquired mobile device and subsequently receive a prompt via the device GUI to initiate an activation sequence. The activation sequence may simply comprise inputting a code into the GUI.

In one embodiment, the consumer can acquire the mobile device with a pre-installed activation ready SIM card from a storefront and perform the activation and provisioning him/herself or with the assistance of a salesperson. In an alternative embodiment, the consumer can be shipped the mobile device with a pre-installed activation ready SIM card via postal or standard delivery service and perform the activation and provisioning himself without the assistance of a salesperson.

In one embodiment, a Core Services Platform (CSP) may be used as an alternative to the Customer System. In an alternative embodiment, a Mobile Broadband (MBB) server may be used as an alternative to the Customer System. In yet another embodiment, an Enterprise Services Platform (ESP) may be used as an alternative to the Customer System.

In addition to provisioning the wireless device, it is also necessary to provision elements in the wireless communications network which are responsible for effecting mobile communications services and applications (e.g., billing plan, voice mail, call forwarding, email, information services, etc.). These elements include servers and other network devices maintained by the wireless carrier. The CSP, MBB, or ESP will interface with the wireless communications network to provision elements in the wireless communications network.

FIG. 1 is a block diagram illustrating an embodiment of a network system. In the embodiment shown, a cellular device 100 communicates with an operator network 110 through a base station 102 and a base station controller 104. Cellular device 100 can be a cellular telephone, a smartphone with data transfer and messaging capability, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. Cellular device 100 communicates with operator network 110 using wireless protocols, such as Bluetooth, IEEE 802.11-based wireless protocols (such as Wi-Fi), and the like. Cellular device 100 is used by a consumer (equivalently, a subscriber or a user). Operator network 110 is a wireless cellular network that includes a voice network (e.g., a global system for mobile communications (GSM) network), a data network (e.g., a general packet radio service (GPRS) network), and a messaging network (e.g., a short message service (SMS) network). It is understood that operator network 110 can include voice, data and messaging networks that are different from the GSM network, GPRS network and SMS network. In the embodiment shown, the voice network is represented by a network switching subsystem 106, the data network is represented by a Serving GPRS Support Node (SGSN) 127, a Gateway GPRS Support Node (GGSN) 107, and the messaging network is represented by a messaging gateway 108. It is understood that operator network 110 includes various other network components, which are omitted herein for simplicity of illustration. Operator network 110 allows a user of cellular device 100 to engage in voice, data and messaging communications with devices coupled to operator network 110 through external networks (not shown).

In one embodiment, base station 102 includes a radio transmitter and receiver for communicating with cellular devices (e.g., cellular device 100), and a communications system for communicating with base station controller 104. Base station controller 104 controls base station 102 and enables communication with operator network 110. In various embodiments, base station controller 104 can control any number of base stations.

Network switching subsystem 106 controls voice network switching, maintains a register of cellular device locations, and connects operator network 110 with an external voice network, such as a public switched telephone network, a private voice telephony network, or any other appropriate voice telephony network. In one embodiment, network switching subsystem 106 includes a mobile switching center (MSC) 111, a home location register (HLR) 113, and a visitor location register (VLR) 114. MSC 111 controls, sets up and releases a voice connection using signaling protocols such as signaling system No. 7 (SS7). In some embodiments, MSC 111 additionally tracks the time of a voice connection for the purposes of charging cellular devices, decrementing available usage, tracking monetary balance, monitoring battery status, and other purposes. In one embodiment, operator network 110 may include any number of MSCs. Each of these MSCs serves cellular devices within a network area, which may include one or more base stations and one or more base station controllers. Some of the cellular devices may be registered to use this network area as their "home network," and some of the other cellular devices may be registered to use other network areas as their home networks. HLR 113 maintains a list of cellular devices whose home network is served by MSC 111. VLR 114 maintains a list of cellular devices that have roamed into the area served by MSC 111. When a cellular device leaves its home network (e.g., the network area served by MSC 111), the VLR ("target VLR") of the network ("target network") to which the device has roamed communicates with HLR 113 in the home network of the device. When HLR 113 has confirmed to the target VLR that it can allow the device to use the target network, the device is added to the target VLR, and the MSC in the target network sets up the communication for the roaming cellular device.

SGSN 127 and GGSN 102 are two of the main components in the core data network of operator network 110. SGSN 127 is responsible for the delivery of data packets from and to the cellular devices within its geographical service area. The tasks of SGSN 127 include packet routing and transfer, mobility management (attach/detach and location management), logical link management, authentication and charging functions. GGSN 107 controls data communications switching and connects operator network 110 with an external data network, such as a local area network, a wide area network, a wired network, a wireless network, the Internet, a fiber network, a storage area network, or any other appropriate networks. In some embodiments, GGSN 107 is one of the core components in the core data network of operator network 110. Although not shown in FIG. 1, the core data network of operator network 110 may also include various other network switching components. GGSN 107 serves as an interface between operator network 110 and external data networks, and translates data packets into the appropriate formats for the devices on each side. In the embodiment shown, GGSN 107 also performs policy and charging enforcement and control via the functionalities of: Policy and Charging Enforcement Function (PCEF) 122, Policy and Charging Rules Function (PCRF) 123 and Online Charging System (OCS) 124. PCRF 123 performs policy control and flow-based charging control. To that end, PCRF 123 authorizes Quality of Service (QoS) resources and operations, e.g., service redirection and other policy-based actions. Ultimately, PCRF 123 resembles a collection controller in that it collects the subscriber's subscription data and allows PCEF 122 to enforce the policies and the charging. OCS 124 facilitates the online charging process by collecting charging information about network resource usage concurrently with that resource usage. OCS 124 also approves authorization for the network resource usage prior to the actual commencement of that usage. The approval may be limited in terms of data volume or in terms of duration. PCEF 122 performs policy enforcement, service data flow detection, and flow-based charging functionalities. The policy control indicated by the PCRF 123 is enforced by PCEF 122. To that end, the PCEF 122 will permit the service data flow to pass through PCEF 122 only if there is a corresponding active Policy and Charging Control (PCC) rule and if OCS 124 has authorized credit for the charging key used for online charging. Ultimately, PCEF 122 ensures that service is provided with the appropriate QoS and that the subscriber is charged in accordance with the charging rate set for the subscriber.

Messaging gateway 108 provides short messages transit between cellular devices and other communication devices. Messaging gateway 108 can be a Short Message Service Center (SMSC), a multi-media messaging center (MMSC), or a network node coupled to the SMSC or MMSC. Messaging gateway 108 delivers text messages through operator network 110 to/from external networks via standard protocols such as Short Message Peer-to-Peer Protocol (SMPP) or Universal Computer Protocol (UCP).

In some embodiments, operator network 110 is coupled to a hosted service platform 120 via a Core Service Platform (CSP) network 170 and a number of network nodes. Hosted service platform 120 serves as a service management platform for wireless communication devices such as cellular device 100. Hosted service platform 120 may include multiple data centers in multiple geographical locations with each data center including multiple server computers. Hosted service platform 120 includes a number of CSP engines 122 that provide a suite of functions to automate both the sales and support processes towards wireless users. Hosted service platform and CSP network 170, as well as software hosted thereon, form a CSP system. An overview of the CSP system will be described below in connection with FIGS. 5 and 6.

CSP network 170 provides connections between the data centers in the hosted service platform 120 and operator network 110. In one embodiment, CSP network 170 includes a GGSN 171 that implements PCRF 173 and OCS 174. Depending on the agreements between the operator/owner of operator network 110 and operator/owner of CSP network 170, both sets of (PCRF 123, OCS 124) and (PCRF 173, OCS 174) can be active at the same time or at different stages of service deployment. In some alternative embodiments, CSP network 170 does not implement PCRF 173 and OCS 174. Instead, host service platform 120 collects subscription data, policy and charging information from operator network 110.

The network nodes between operator network 110 and CSP network 170 are represented in FIG. 1 as operator network node 130, network node A 131 and network node B 132. These network nodes (130, 131 and 132) can include switches, routers, bridges, and other network components. There can be any number of network nodes between operator network 110 and CSP network 170. In the embodiment shown, operator network node 130 communicates with network node A 131 via an integrated connection, while it communicates with network node B 132 via three separate connections for voice, data and text messaging.

In some embodiments, an operator IT system 150 is coupled to operator network 110 via operator network node 130. Operator IT system 150 receives subscribers' data and usage from operator network 110, and provides the functions of Customer Relationship Management (CRM)/care, provisioning/order entry, billing/mediation (or payments), and reporting/data warehouse (DWH) (or business intelligence). Operator IT system 150 also provides a user interface (such as a desktop interface or a Web interface) for a system administrator to monitor and manage these functions. In one embodiment, operator IT system 150 includes a control center that hosts CSP operator Web applications 154. CSP operator Web applications 154 allow an operator to manage its marketing campaign, offers (equivalently, rate plans), pricing, billing and customer care in an integrated environment. Functionality of CSP operator Web applications 154 will be described later in further detail with reference to FIG. 16.

In some embodiments, cellular device 100 stores and runs CSP device application (CDA) 140. CDA 140 displays alerts and notifications to consumers in response to the consumers' current usage and condition, provides customized contextual offers in real time, and allows consumers to select and purchase wireless products and services from their devices. Moreover, using CDA 140, consumers can diagnose and solve their own service questions and problems directly from their wireless device. For example, CDA 140 can query multiple sources, including cellular device 100 itself, to perform a diagnosis. Functionality of CDA 140 will be described later in further detail with an example shown in FIGS. 10-15.

Figure 2:
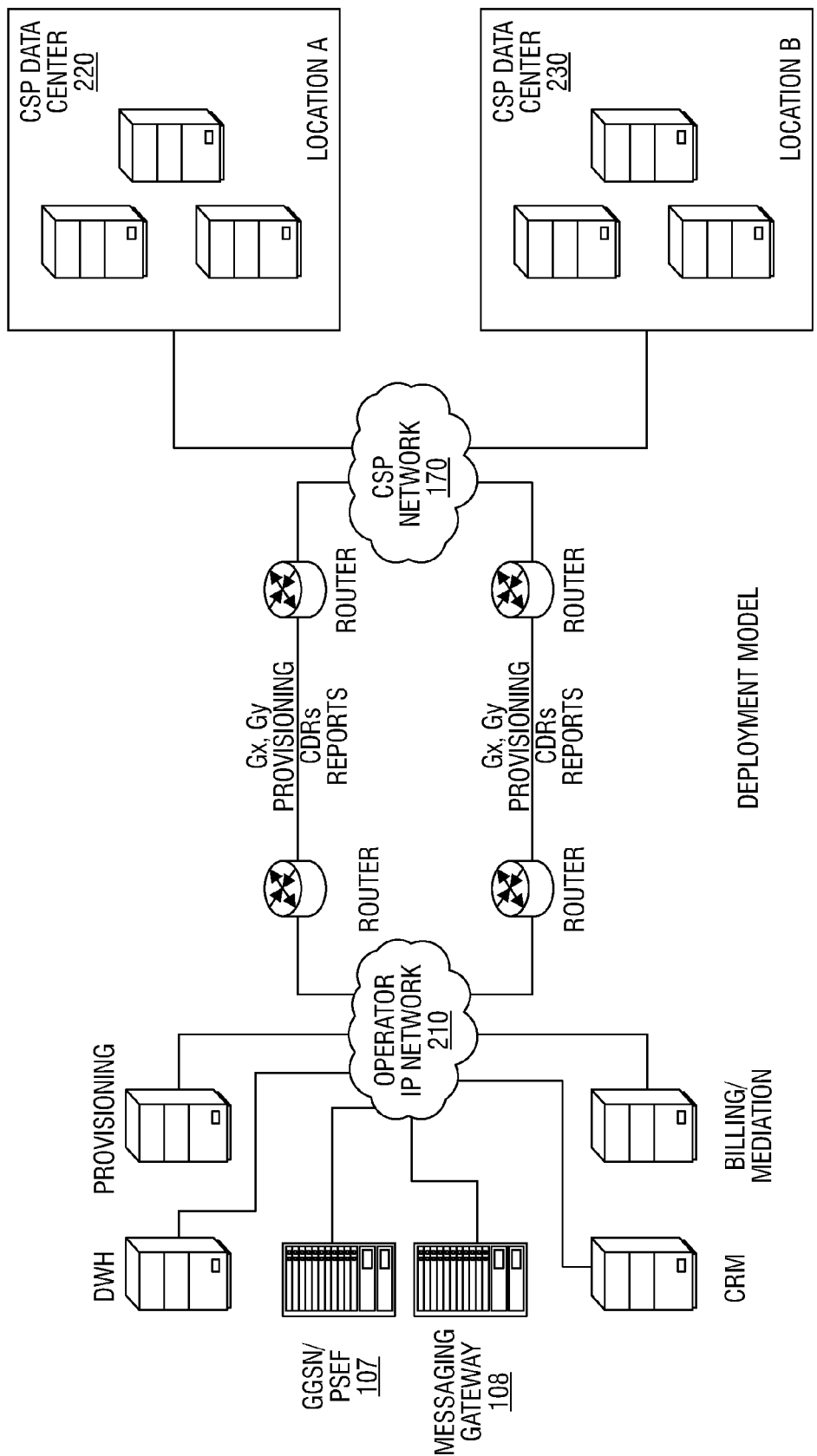
FIG. 2 is a diagram of one embodiment of a deployment model for a CSP system.

FIG. 2 is a diagram illustrating an embodiment of a deployment model for the CSP data centers. The CSP data centers can be a cloud-based computing system. In the embodiment shown, two data centers (220 and 230) are coupled to operator Internet Protocol (IP) network 210 via CSP network 170 and a number of network nodes (e.g., routers). Data centers 220 and 230 are part of hosted service platform 120 of FIG. 1. Data centers 220 and 230 can be deployed at different locations and each center includes multiple server computers. Some of the server computers can serve as Web servers providing resources that can be accessed by the operator and subscribers. Data centers 220 and 230 can be synchronized in real time, and either data center can carry the full service demand. In one embodiment, dynamic IP routing is established (e.g., Border Gateway Protocol (BGP)) between operator IP network 210 and data centers 220 and 230, such that failure of one path will allow for automatic routing via the alternative path.

It is understood that hosted service platform 120 of FIG. 1 can include any number of data centers in any geographical locations. Operator IP network 210 can be part of the data network of operator network 110 of FIG. 1. In the embodiment shown, operator IP network 210 interconnects GGSN 107, messaging gateway 108 and the systems of CRM, provisioning/order entry, billing/mediation, and data warehouse (DWH) in operator IT system 150 of FIG. 1. In one embodiment, operator IP network 210 and CSP network 170 exchange provisioning/order entry data, charging data records (CDRs), reports via standard $3^{rd}$ Generation Partnership Product (3GPP) interfaces (Gx, Gy).

Figure 3:
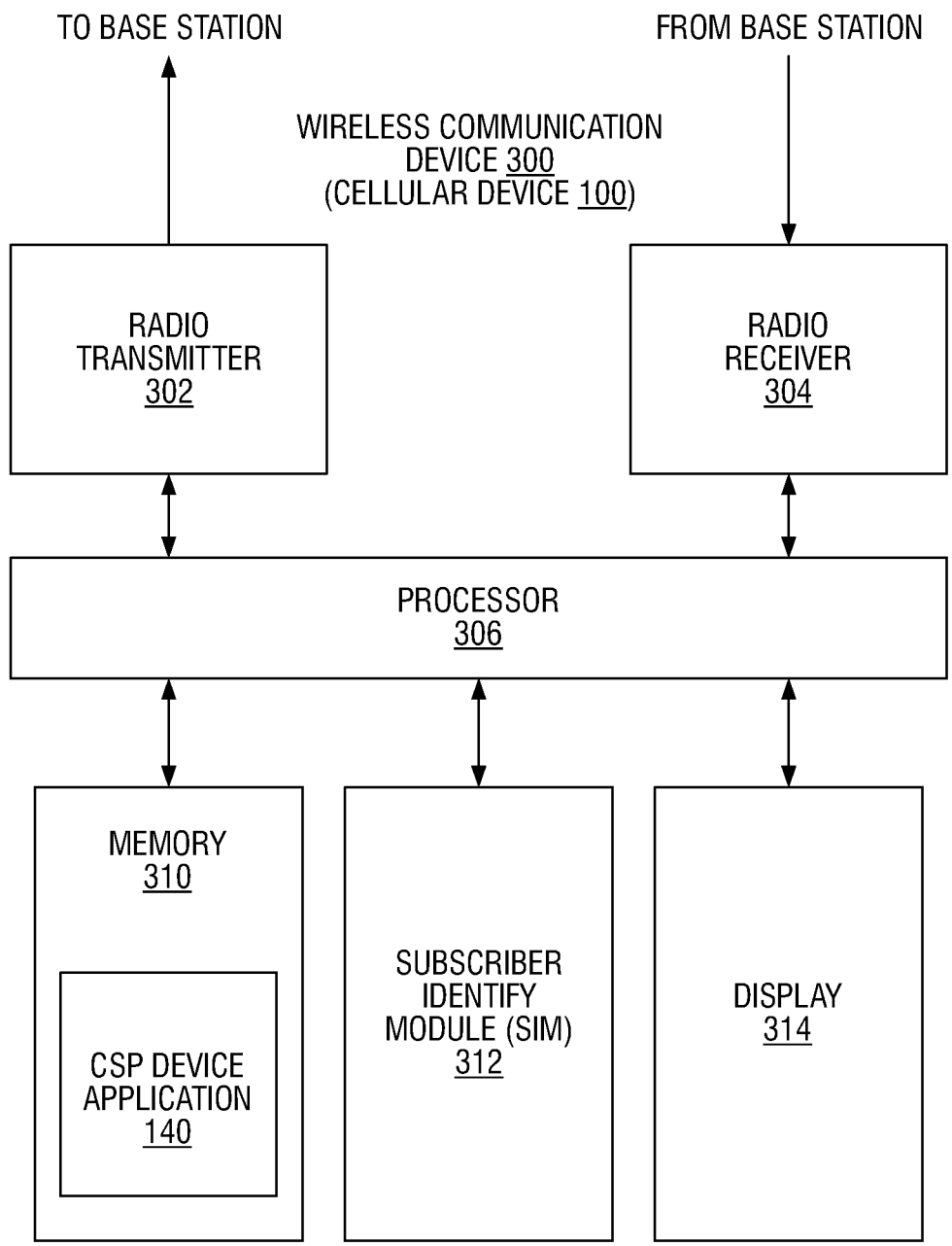
FIG. 3 is a diagram of one embodiment of a mobile communication device.

FIG. 3 is a block diagram illustrating an embodiment of a wireless communication device 300 (e.g., cellular device 100 of FIG. 1). In one embodiment, wireless communication device 300 is a smartphone. In alternative embodiments, wireless communication device 300 can be a cellular telephone, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. In the embodiment shown, wireless communication device 300 includes a radio transmitter 302, a radio receiver 304, a processor 306, memory 310, a subscriber identity module (SIM) 312, and a display 314. In some embodiments, SIM 312 is optional and the inclusion of SIM 312 is dependent on the network technology in use. Radio transmitter 302 and radio receiver 304 communicate with a base station (e.g., base station 102 of FIG. 1) using wireless radio communication protocols. In some embodiments, radio transmitter 302 and/or radio receiver 304 communicate voice signals, data signals, text signals (e.g., SMS), configuration and/or registration signals, or any other appropriate kinds of signals. Processor 306 executes instructions stored in memory 310 to control and perform the operations of wireless communication device 300. In some embodiments, memory 310 includes one or more of the following: read-only memory (ROM), flash memory, dynamic random access memory (DRAM), static memory and data storage device. Memory 310 can act as temporary and/or long-term information storage for processor 306. In one embodiment, memory 310 stores CDA 140. In one embodiment, display 314 can serve as a graphical user interface (GUI) that displays images and data, such as the screen displays of CDA 140. The displayed images and data can be retrieved from memory 310 or other local storage, or can be received through radio receiver 304 from a Web server (e.g., the Web servers in the CSP data centers).

In one embodiment, SIM 312 is a removable module storing an identifying number for wireless communication device 300 to identify the device to the network. In various embodiments, SIM 312 stores an International Mobile Subscriber Identity (IMSI) number, an Integrated Circuit Card Identifier (ICCID) number, a serial number, or any other appropriate identifying number.

Figure 4:
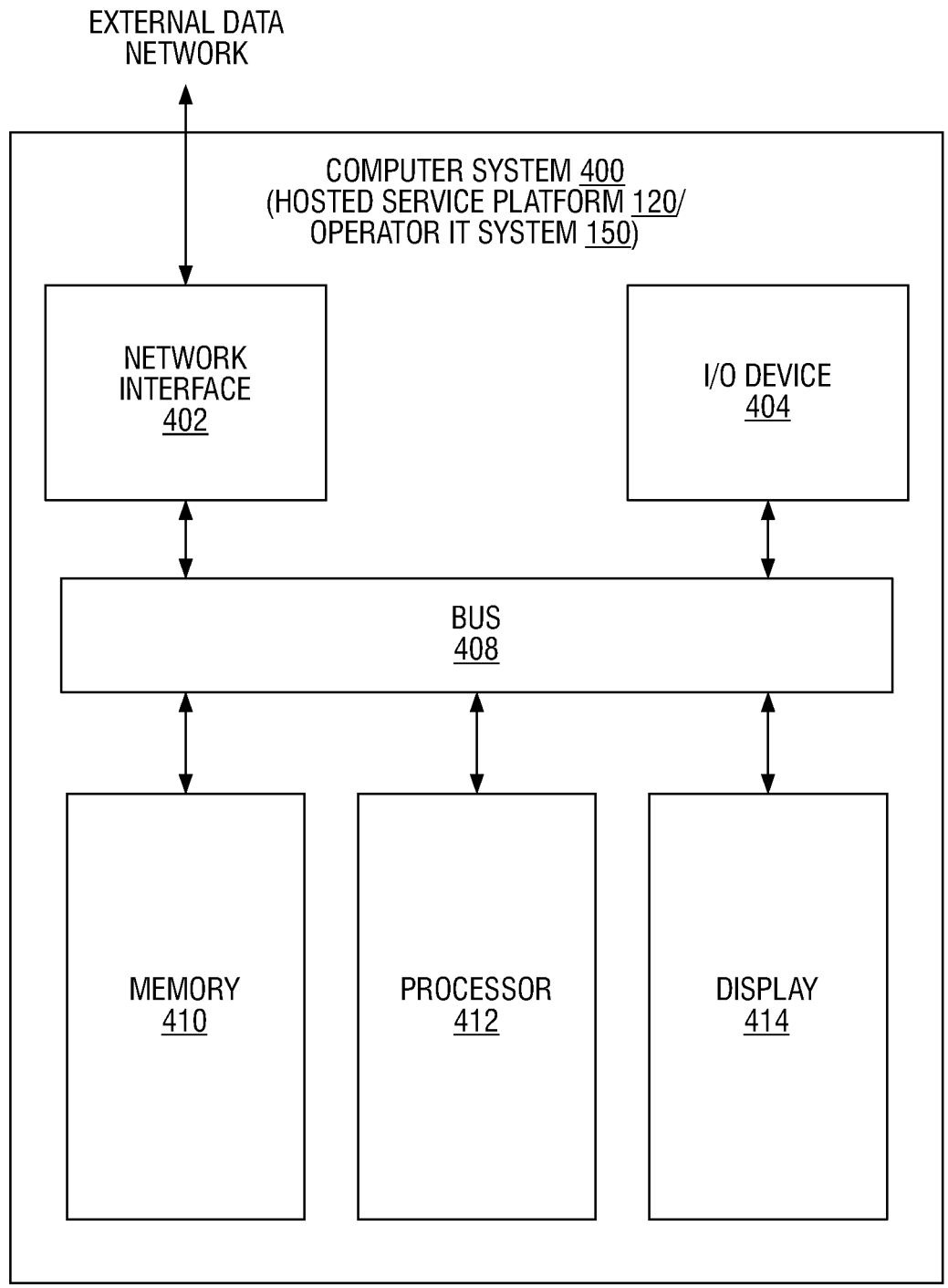
FIG. 4 is a diagram of one embodiment of a computer system.

FIG. 4 is a block diagram illustrating an embodiment of a computer system 400. In one embodiment, computer system 400 can be a server computer within hosted service platform 120 of FIG. 1. In another embodiment, computer system 400 can be a server computer within operator IT system 150 of FIG. 1. It is understood that hosted service platform 120 and operator IT system 150 can include any number of server computers. In the embodiment shown, computer system 400 includes a processor 412, memory 410, an I/O device 404, a network interface 402, a display 414 and a bus 408. In one embodiment, display 414 can serve as a graphical user interface (GUI) that displays graphics and data to an operator. Some of the displayed graphics and data can be retrieved from memory 410 or other local storage, or received through network interface 402 from a Web server. Processor 412 represents one or more general-purpose processing devices. Memory 410 includes one or more of the following: read-only memory (ROM), flash memory, dynamic random access memory (DRAM), static memory and data storage device. Network interface 402 communicates with an external data network. In an embodiment where computer system 400 is a server computer within hosted service platform 120 of FIG. 1, memory 410 stores software implementing one or more of the functions of CSP engines 122, PCRF 173 and/or OCS 174. In another embodiment where computer system 400 is a server computer within operator IT system 150 of FIG. 1, memory 310 stores software implementing one or more of the functions of CSP operator web applications 154.

Figure 5:
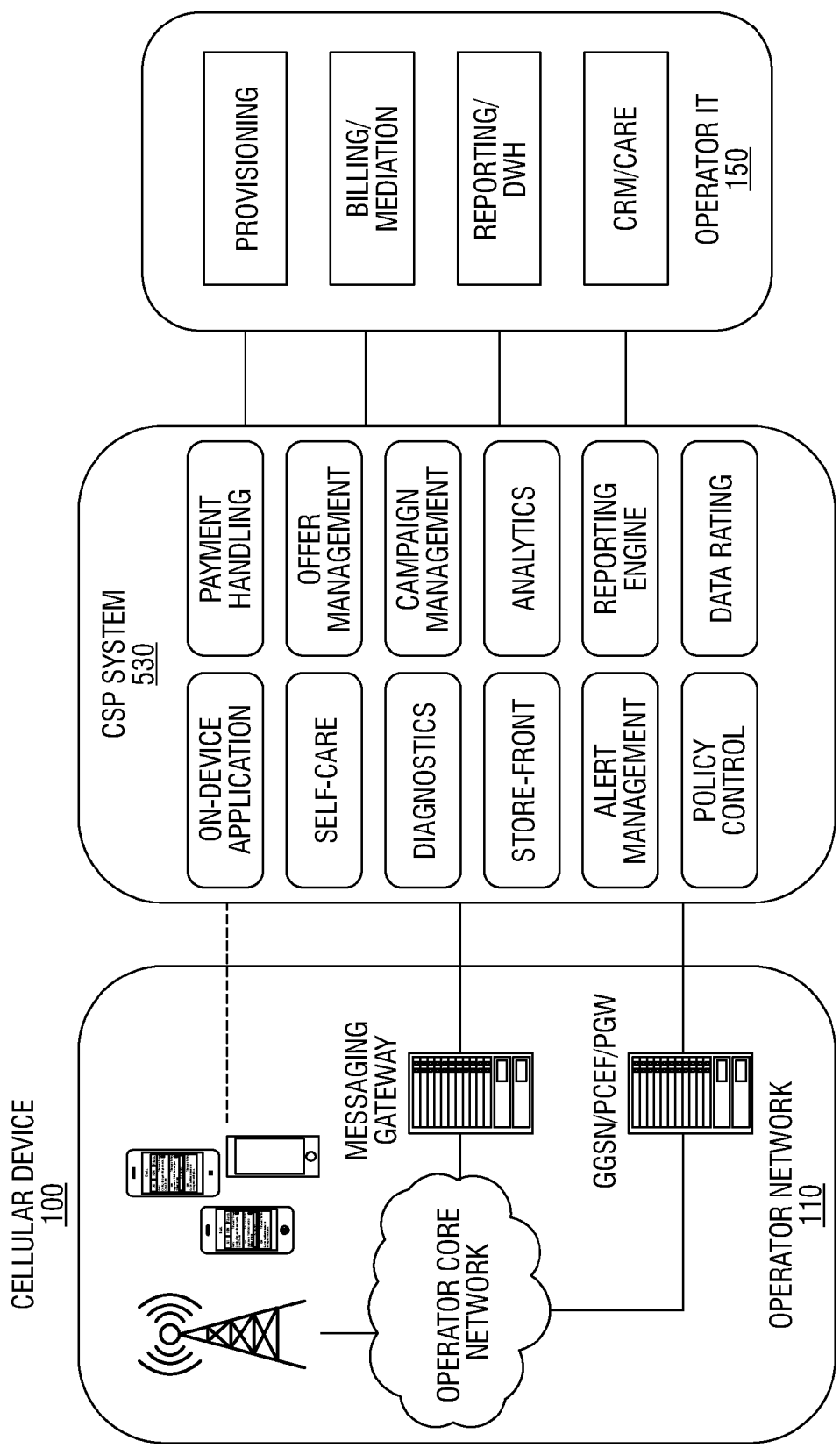
FIG. 5 is an overview of CSP system integration according to one embodiment of the invention.
Figure 6:
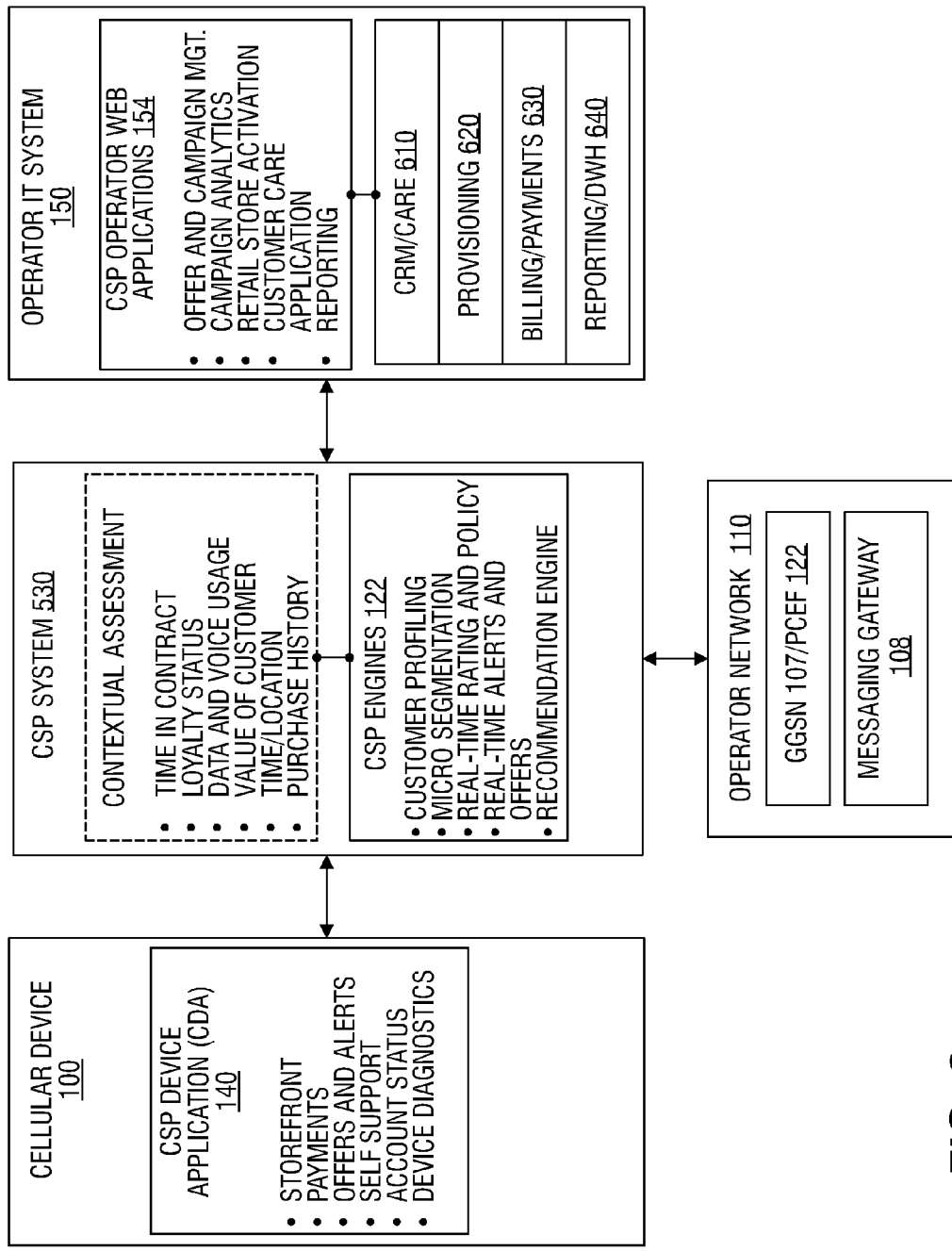
FIG. 6 is an overview with further details of CSP system integration according to one embodiment of the invention.

FIG. 5 is a block diagram illustrating an overview of CSP system integration according to one embodiment of the invention. FIG. 6 illustrates further details of CSP system integration according to one embodiment of the invention. In the following description, the term "CSP system" 530 refers to the software and hardware infrastructure that manages a suite of services provided to network operators and their subscribers. Thus, referring also to the embodiment shown in FIG. 1, CSP system 530 includes hosted service platform 120, CSP network 170, and the software hosted thereon. CSP system 530 interacts with operator network 110, operator IT system 150, and cellular device 100 in real time. In some embodiments, CSP system 530 can also interact with operator network 110, operator IT system 150, and cellular device 100 in batch mode. In one embodiment, CSP system 530 is a smartphone service management platform. Through CDA 140 and CSP operator Web applications 154, CSP system 530 provides or enables the functions of on-device application, self-care, diagnostics, store-front, alert management, policy control, payment handling, offer management, campaign management, analytics, reporting engine, and data rating.

Referring to FIG. 6, CSP system 530 provides customized contextual offers based on contextual assessments of a consumer's current "context." Such "context" includes, but is not limited to, time in contract, loyalty status, data and voice usage, value (or valuation) of customer, time (of a latest data request), location (of a latest data request) and purchase history. The contextual assessments can be made by CSP engines 122, which run on hosted service platform 120 of FIG. 1 and perform the functions that include, but are not limited to, customer profiling, micro-segmentation, real-time rating and policy, real-time alerts and offers, and targeted recommendations for offers and promotions. CSP system 530 is able to not only identify who the consumer is, but also the consumer's current context, in order to make the right offers at the right time. CSP system 530 formulates offers that the consumer is most likely to purchase and that are most valuable to the operator. The consumer can choose one of the offers and make the purchase from his device at the moment he most likely needs it to maintain his usage level. For example, if the consumer is in the middle of downloading a video to his smartphone and his data usage limit or threshold is reached, he can receive an alert on his smartphone with offers to add more megabytes of data to extend his usage limit. In one scenario where the consumer's usage limit or threshold has not been reached, he can also receive an offer to add more megabytes of data to improve the download speed. The consumer can make the purchase from this smartphone and continue the downloading with no or little noticeable interruption. In one embodiment, the offers can include top-up offers or plan changes, which add more megabytes of data or more usage time to a consumer's existing plan for the current billing cycle, or upgrades, which change the consumer's existing plan to a new plan that is not limited to the current billing cycle.

Consumers experience CSP system 530 through CDA 140 on their wireless communication devices. CDA 140 provides consumer-side functions that include, but are not limited to: storefront, payment, offers and alerts, self-support, account status, and device diagnostics. Operators experience CSP system 530 through CSP operator Web applications 154. CSP operator Web applications 154 provide operator-side functions that include, but are not limited to: offer and policy management, campaign and alert management, business and eligibility rules management, product catalog, customer relationship management, merchandising and content management, campaign analytics, retail store activation, customer care application, and reporting. For the operator, this CSP experience translates to the following three main benefits: (1) CSP system 530 provides a retail store on every wireless communication device, thereby increasing Average Revenue per User (ARPU) through real-time contextual selling; (2) CSP system 530 drives support cost towards zero by providing a self-support experience for consumers; and (3) CSP system 530 drives cost of sales towards zero using dedicated on-device channels.

In order to provide these benefits and reduce time to market, CSP system 530 integrates with four functions of operator IT system 150. The four functions are: CRM/care 610, provisioning/order entry 620, billing/payments 630 and reporting/DWH 640. CSP system 530 also integrates with two functions of operator network 110. The two functions are GGSN 107/PCEF 122 (which represents PCEF 122 implemented by GGSN 107) and Messaging Gateway 108.

The integration with operator network 110 will be described below with reference to FIGS. 7-9. The integration with wireless communication devices (e.g., cellular device 100) will be described below with reference to FIGS. 10-15. Finally, the integration with operator IT system 150 will be described below with reference to FIGS. 16-22.

CSP—Network Integration

As shown in the embodiment of FIG. 6, the integration with operator network 110 enables the ability of CSP system 530 to have real-time visibility of usage and take real-time actions. The two network functions with which CSP system 530 integrates are GGSN 107/PCEF 122 and messaging gateway 108.

The network integration enables fast time to market without compromising network integrity or service quality. In one embodiment, the integration is achieved through the use of standard 3GPP interfaces (Gx, Gy) and standard Short Message Peer-to-Peer (SMPP) interface.

Figure 7:
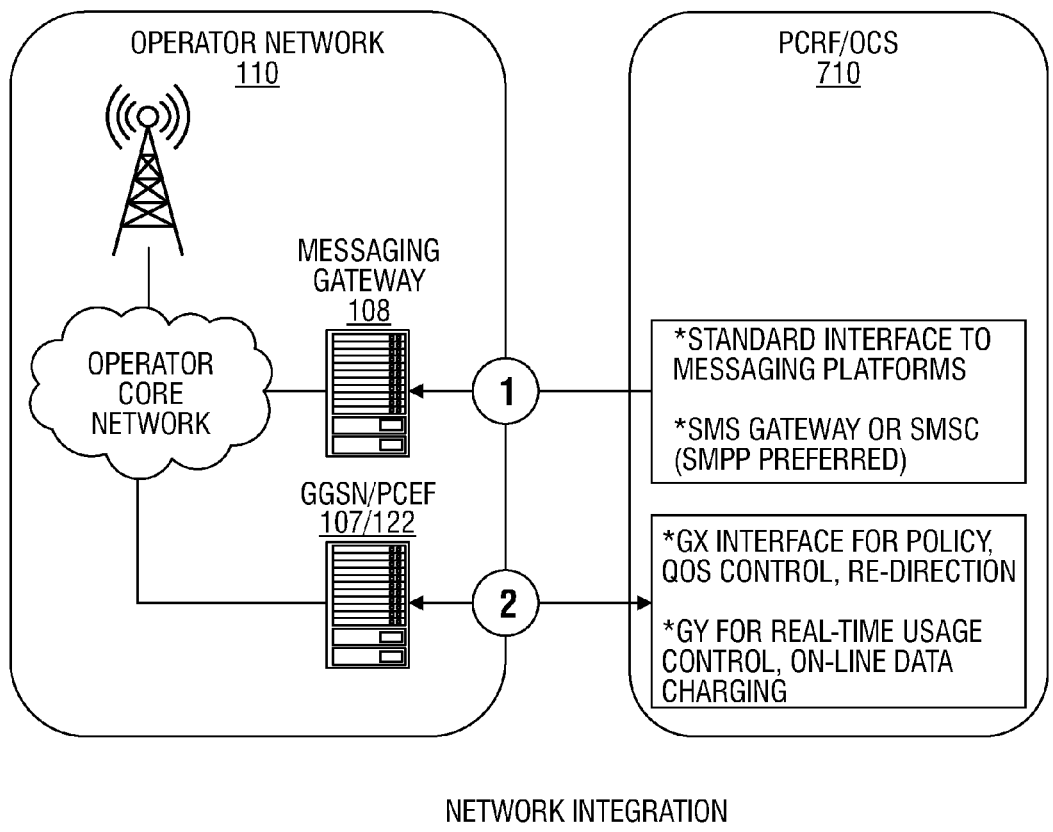
FIG. 7 is an embodiment of integration between a CSP system and an operator network.

FIG. 7 illustrates an embodiment of the interfaces between operator network 110 and PCRF/OCS 710. As described above in connection with FIG. 1, PCRF/OCS 710 may reside within CSP network 170 (e.g., PCRF 173 and OCS 174), within operator network 110 (e.g., PCRF 123 and OCS 124), or both. In the embodiment of FIG. 7, it is shown that PCRF/OCS 710 resides outside of operator network 110 (that is, within CSP network 170). However, if PCRF/OCS 710 resides within operator network 110, CSP network 170 can receive relevant information from operator network 110 in real time or near real time. The CSP functions, as described before in connection with FIGS. 5 and 6, can be embedded within PCRF/OCS 710. Thus, it is understood that the exact location of PCRF/OCS 710 is not germane to the disclosure herein.

Referring to FIG. 7, a standard interface exists between messaging gateway 108 and PCRF/OCS 710. Message gateway 108 can be a SMS gateway or a Short Message Service Center (SMSC). This interface to messaging gateway 108 can be a standard SMPP interface. This interface allows the system to deliver alerts or notifications to CDA 140 of FIG. 6 and user via SMS.

The (Gx, Gy) interfaces are defined in accordance with the Diameter protocol. The (Gx, Gy) interfaces are situated between GGSN 107/PCEF 122 and PCRF/OCS 710. More specifically, the Gx interface is between PCEF 122 and PCRF for policy, QoS control and redirection. The Gy interface is between PCEF 122 and OCS for real-time usage control and online data charging.

The following describes a number of scenarios that illustrate the possible use cases in a network system with integrated operator network and CSP functions. Some of these use cases can be combined.

Case 1: Metering subscriber traffic with no overage allowed and no redirect to portal. In this scenario, a subscriber is assigned a monthly quota of X MB and a threshold is set at Y %. A notification is sent to the subscriber when the subscriber exceeds the usage threshold of Y %. No subsequent session is allowed. Quota is reset at the end of the billing cycle.

Case 2: Metering subscriber traffic with redirect to offer portal. In this scenario, a subscriber is assigned a static monthly quota of X MB and a threshold is set at Y %. A notification is sent to the subscriber when the subscriber exceeds the usage threshold of Y %. When the subscriber reaches 100% of the monthly quota, the subscriber session is redirected to a portal with specific offers. The subscriber selects a top-up offer and is allowed to continue passing traffic.

Case 3: Policy to throttle traffic at the end of usage quota. In one scenario, the subscriber can have unlimited usage at a lower speed with a monthly quota at a higher speed. After the monthly quota is consumed, the subscriber's data traffic is reduced (throttled) to the lower speed. In another scenario, a subscriber is assigned a static monthly quota of X MB and a threshold is set at Y %. A notification is sent to the subscriber when the subscriber exceeds the usage threshold of Y %. When the usage reaches 90% (or any configurable percentage) of the monthly quota, the subscriber's data traffic is reduced (throttled) to an externally specified speed (e.g., a speed specified by the operator of the network). When the subscriber reaches 100% of the monthly quota, the subscriber session is redirected to a portal with specific offers. The subscriber can select a top-up offer and be allowed to continue passing traffic at the original Quality of Service (QoS). The subscriber can also pay for a higher speed (e.g., "throttle up") if the subscriber is accessing a selected service (e.g., an online video) or wants more bandwidth to download a specified song or other type of file.

Case 4: Day pass. In this scenario, a subscriber is assigned a fixed duration pass. The subscriber maintains its session until expiration of the time quota, at which point the subscriber session gets disconnected. The subscriber is subsequently not able to reconnect until a new pass is purchased.

Case 5: Usage control around user data volume. In this scenario, a subscriber is assigned a static monthly quota of X MB and a threshold is set at Y %. The subscriber is also restricted to use no more than Z MB of data in a 30-minute sliding window. The subscriber is redirected to a portal if data volume exceeds this restriction. Redirect in this case is one-time only. If the subscriber declines a top-up offer, then the subscriber is reduced (throttled) to an externally specified speed (e.g., a speed specified by the operator of the network) until the 30-minute sliding window is over. (Note that the QoS restrictions are settable.)

Case 6: Usage restricted to specific Public Land Mobile Networks (PLMNs). This can be combined with other use cases. In this scenario, a subscriber is only allowed to use specific PLMNs. At some point, the subscriber leaves the allowed networks and camps on another network. The subscriber attempts to setup Packet Data Protocol (PDP) context and is blocked by PCRF. Notification is sent to subscriber to offer a targeted roaming package.

Case 7: Changed QoS on Radio Access Technology (RAT) Change. This use case assumes that the subscribers are allowed (whether as part of the plan or by explicit purchase) to have a specific QoS based on how they are connecting to the network. In one scenario, a subscriber has no QoS restrictions on the 3G network. At some point, the subscriber goes into an EDGE network. Subscriber gets reduced QoS while on the EDGE network. The subscriber is provided with unrestricted speed upon returning to the 3G network. This use case may be combined with other use cases.

Case 8: Subscriber has no quota limit within home network but has a 100 MB quota while roaming (redirect at end of roaming quota). In this scenario, a subscriber has no set quota while on the home network. The subscriber has a 100 MB quota for roaming. When the subscriber enters a roaming network, a notification update is sent to the subscriber to advise roaming usage. At some point, the subscriber exceeds roaming usage threshold (e.g. 90% of quota). A notification update is sent to the subscriber indicating that roaming limit has been reached. When the subscriber reaches 100% of the roaming quota, the subscriber session is redirected to a portal for additional roaming top-up offers. This use case can be extended to a scenario in which a local area is covered by a group of cellular sites (cells). When a subscriber moves from one cell to another, he is not roaming (switching between networks) but travelling (going to discrete areas in the same network). In one scenario, the subscriber has no set quota while in the home cell, but has a set quota for travelling to other cells.

Case 9: Detect a subscriber's access to a selected (type of) website or service. In this scenario, through the use of Deep Packet Inspection (DPI), the subscriber's access to a selected (type of) website or service can be detected. The subscriber needs to pay for the access to the selected (type of) website or service. This scenario is similar to another scenario where subscribers would be redirected if they go to a website or location not explicitly allowed and they need to pay for the access.

Integration with GGSN/PCEF.

Figure 8:
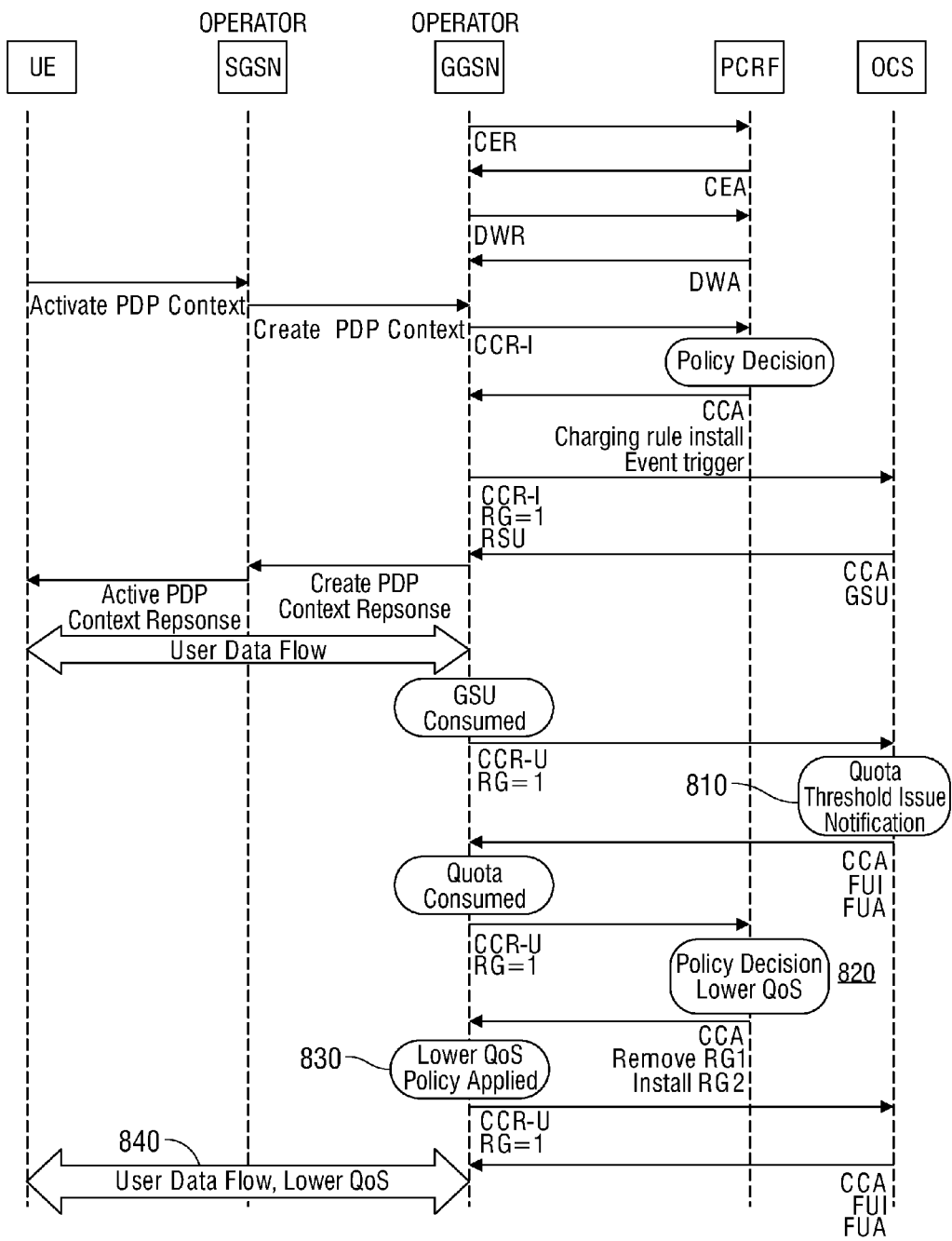
FIG. 8 is an embodiment of network signal flow.

FIG. 8 illustrates an example of a signal flow for a use case in which a subscriber is throttled when his quota has been consumed. The signal flow between the GGSN/PCEF and PCRF, as well as between GGSN/PCEF and OCS (or its equivalent), are in accordance with the Diameter protocol. The Diameter protocol is an authentication, authorization and account protocol. The Diameter protocol defines a number of commands, such as capability exchange request (CER), capability exchange answer (CEA), device watchdog request (DWR), device watchdog answer (DWA), credit control request (CCR), credit control answer (CCA), etc. These commands are exchanged between the GGSN/PCEF and PCRF, as well as between GGSN/PCEF and OCS, to communicate policy decision, consumed quota, threshold limit reached, change of policy decision and change of QoS. FIG. 8 shows that when a threshold quota is reached, the OCS issues a notification (810), and when the quota is consumed, the PCRF makes the policy decision to lower the QoS (820). The GGSN/PCEF applies the policy decision (830), which lowers the QoS of the user data traffic (840). The signal flow of FIG. 8 does not show all of the Diameter parameter details for simplicity of illustration.

Figure 9:
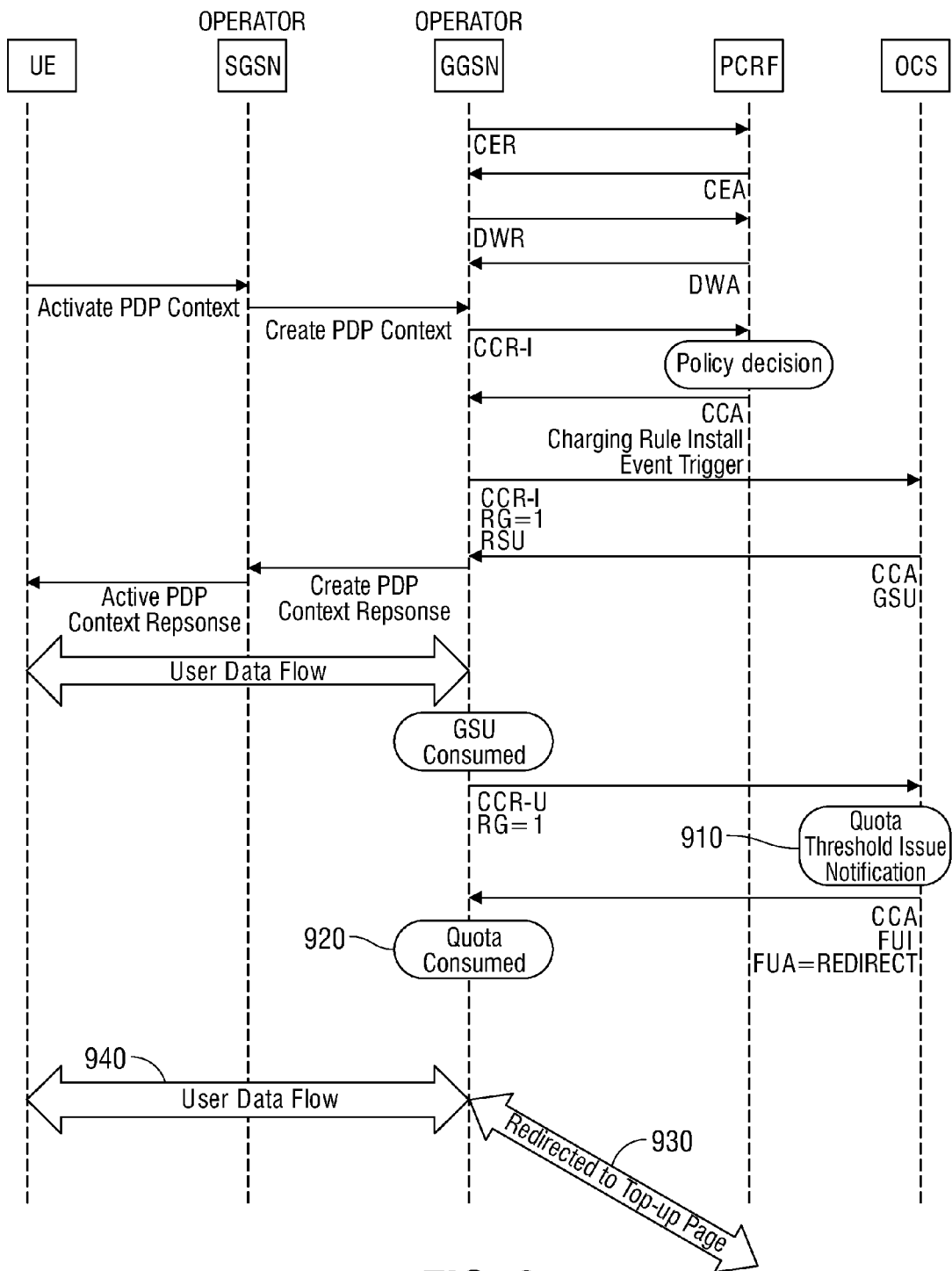
FIG. 9 is another embodiment of network signal flow.

FIG. 9 illustrates an example of a signal flow for a use case in which a subscriber is redirected to a top-up page when his quota has been consumed. FIG. 9 shows that when a threshold quota is reached, the OCS issues a notification (910). When the quota is consumed, the PCRF makes the policy decision to redirect the subscriber to a top-up page (920), and the GGSN/PCEF redirects the subscriber to the top-up page (930), and the user data traffic continues to flow (940). The signal flow of FIG. 9 does not show all of the Diameter parameter details for simplicity of illustration.

Because the various Diameter interfaces above have many options, the integration with one GGSN vendor may not be the same as the integration with another. For each make and model of GGSN and Packet Data Network Gateway (PGW), specific GGSN templates can be used. These specific templates include only the parameters and settings that have been proven against the corresponding make and model of GGSN. In terms of Diameter interfaces, only the Access Point Names (APNs) (i.e., the network addresses used to identify one or more GGSNs) that have been proven for the PCRF/OCS and the particular GGSN are used.

The CSP-integrated PCRF and OCS include an upwards-facing API (also referred to as northbound-facing) and Java Message Service (JMS) queue. These are used for passing usage information and event information to the higher layers of CSP system 530 (FIG. 6) and for issuing instructions from higher layers towards the PCRF and OCS. For example, a PCRF or equivalent instructs the GGSN/PCEF as to the QoS to be applied for a subscriber and the usage to be allowed. When the user has consumed a specific threshold, OCS or equivalent notifies the PCRF or equivalent, which in turn queries the recommendation engine to determine a recommendation to present in a notification and offer to the subscriber. If the user reaches 100% of his allocated quota, then OCS informs the policy and rating engine, which instructs the GGSN/PCEF to change the QoS to throttle the user.

The use of CSP-integrated PCRF and OCS allows for fast time to market and retains the full value proposition of the CSP solution. However, the higher-layer functions of CSP can integrate with any PCRF and OCS (e.g., an operator's own PCRF and OCS) that can provide the required interfaces for notification and control of the PCRF and OCS functions themselves.

As the PCRF and OCS may be tightly integrated with CSP system 530, when a user selects a new plan, that plan can be provisioned through the PCRF and OCS in real time. Thus, the subscriber can be served immediately. It is necessary that the other systems, such as customer care, within the IT infrastructure are aware of the new plan being provisioned. For that reason, as explained later, CSP system 530 interfaces to the operator's provisioning/order entry system. In one embodiment, CSP system 530 may manage the provisioning/order entry of data service upgrades with the CSP-integrated PCRF and OCS.

Integration with Messaging Gateway.

CSP system 530 (FIG. 6) can communicate with CDA 140, as well as other devices if the operator so wishes, via a proprietary or non-proprietary IP-based communication protocol, such as SMS, Unstructured Supplementary Services Data (USSD), Apple® Push Notification Service (APNS) for iOS devices, Android® Cloud Device Messaging (ACDM) for Android® devices, and the like. SMS can be used to wake up CDA 140 when needed. For example, SMS can be sent to a consumer as an alert or notification when data usage limit is reached, payment is overdue, or a promotion relevant to the consumer is available. In one embodiment, the alert and notification can be generated by network elements (such as PCRF/OCS within either operator network 110 or CSP network 170), and delivered to the consumer's CDA 140 by CSP system 530. In a scenario where the operator wishes to recruit existing subscribers to the use of CDA 140, CSP system 530 can use SMS to signal these subscribers' devices with a link to download CDA 140.

In some embodiments, operators have SMSCs to forward text messages to/from external systems. These SMSCs support protocols such as SMPP or UCP. Some operators also use messaging gateways as an interface to the external systems, thereby minimizing direct connections from external systems to the SMSCs. These gateways also support SMPP or UCP, and most also have other APIs that can be made available. In alternative embodiments, the SMSCs may be part of CSP system 530.

In some embodiments, CSP system 530 has built-in SMPP client functionality. CSP system 530 can integrate with the operator's messaging gateway 108 using SMPP. In one embodiment, a specific short code can be assigned to CSP system 530 and that short code is zero-rated. Thus, messages between CSP system 530 and the user device will not be charged to the user's account.

CSP—Application Integration on a Wireless Communication Device

Figure 10:
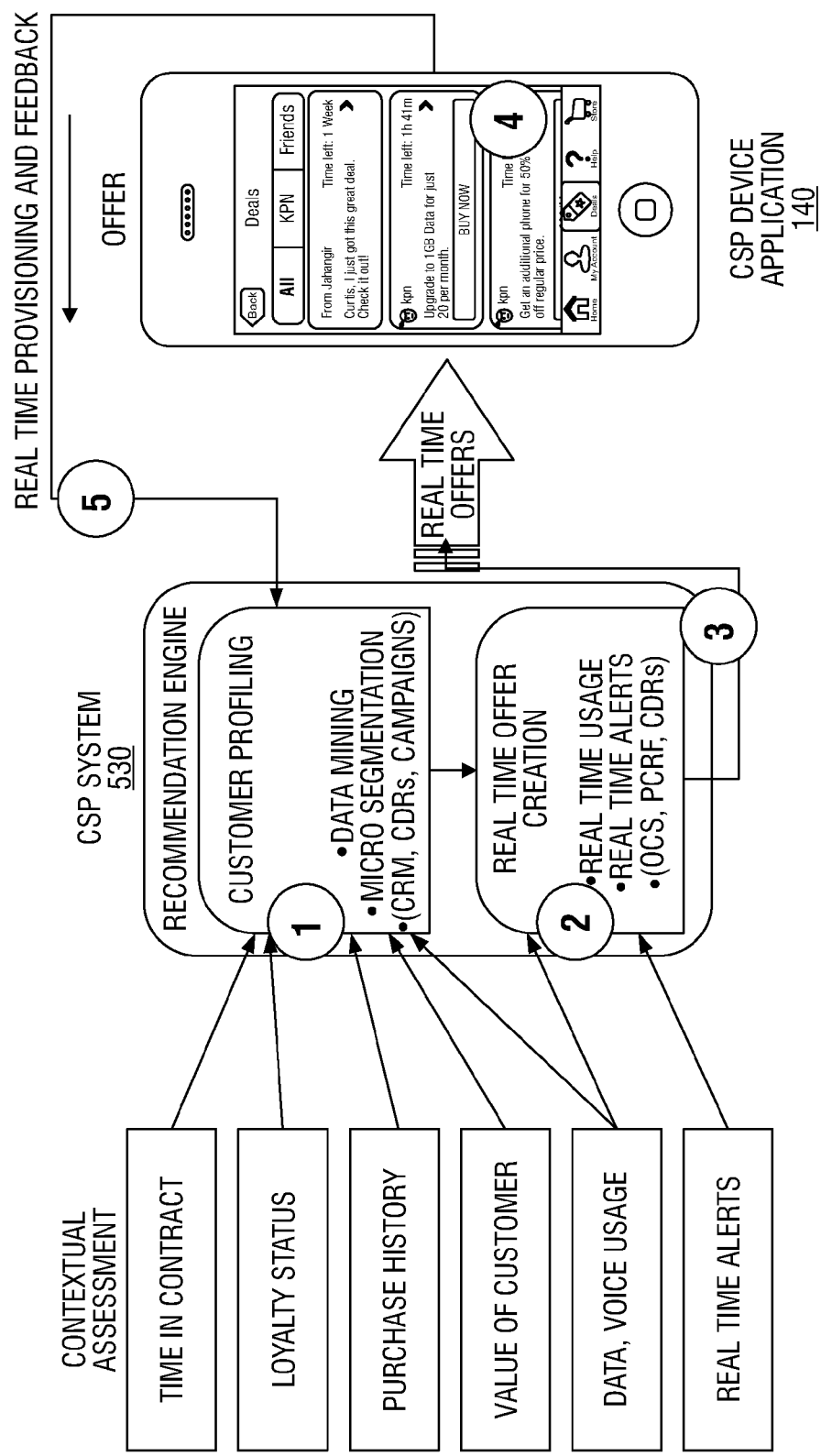
FIG. 10 is an embodiment of integration between a CSP system and a wireless communication device.

FIG. 10 illustrates an example of CSP device application (CDA) 140 when used on a smartphone device. Although a smartphone is shown, it is understood that CDA 140 can be run on cellular device 100 (FIG. 1) such as a cellular telephone, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. CDA 140 serves as an interface between the operator and the customer. CDA 140 receives information from CSP system 530. CSP system 530, in turn, receives the information from operator network 110, operator IT system 150, and CSP network 170 (FIG. 1). CDA 140 can be operator branded and can be built using a combination of multiple programming languages for Web and Mobile technologies, e.g. C++, HTML5, Java, OS-specific native application code, etc., and other mobile Web technologies. CDA 140 is an application (or construct) that is resident and accessed from the device. Customers can be given access to the application in several ways; e.g., by pre-loading on new customer devices at the device OEM, by downloading to existing devices using a link to the appropriate application store, and/or accessed via a mobile Web page sent to the customer.

While CDA 140 is a device-based application, a majority of its data and experience (e.g., displayed layout and content) are generated and served from CSP system 530. This provides the ability to dynamically display and change elements of the experience without pushing application updates to the user device. In one embodiment, CDA 140 communicates with CSP system 530 over Hyper-Text Transfer Protocol Secure (HTTPS), which uses multi-layer authentication architecture to validate CDA 140, handset and user, before allowing access to data and functions such as purchasing upgrades. Alerts and notifications may be delivered to the user device via SMS through the CSP-Messaging integration described above, as well as through Mobile OS-specific notification methods; e.g., APNS for iOS devices and ACDM for Android® devices.

In one embodiment, the recommendation engine (which is one of CSP engines 122 in CSP system 530 shown in FIG. 6) is the CSP's mechanism for creating real-time contextual offers. In the embodiment shown, the recommendation engine analyzes the information collected from CRM, CDRs, campaigns, and the like by data mining and micro-segmentation. The customer micro-segmentation allows an operator to target a certain segment of the subscribers to make offers that are most relevant to those subscribers. The recommendation can be made with respect to a number of factors of contextual assessment, such as time in contract, loyalty status, purchase history, value of customer, and data and time usage. The recommendation engine creates or recommends real-time offers based on results of customer profiling, as well as factors of the contextual assessment and information received from PCRF, OCS and CDRs. Thus, when a consumer's real-time usage reaches a limit and receives a real-time alert, the offers that are created by the recommendation engine and approved by the operator can be delivered to the user device instantly. CDA 140 directly interacts with CSP system 530. Via CDA 140, a consumer can choose one of the offered options that are displayed on his device in a user-friendly format. The chosen option can be provisioned to the user in real time and feedback can be sent back to hosted service platform 120 in real time.

Figure 11:
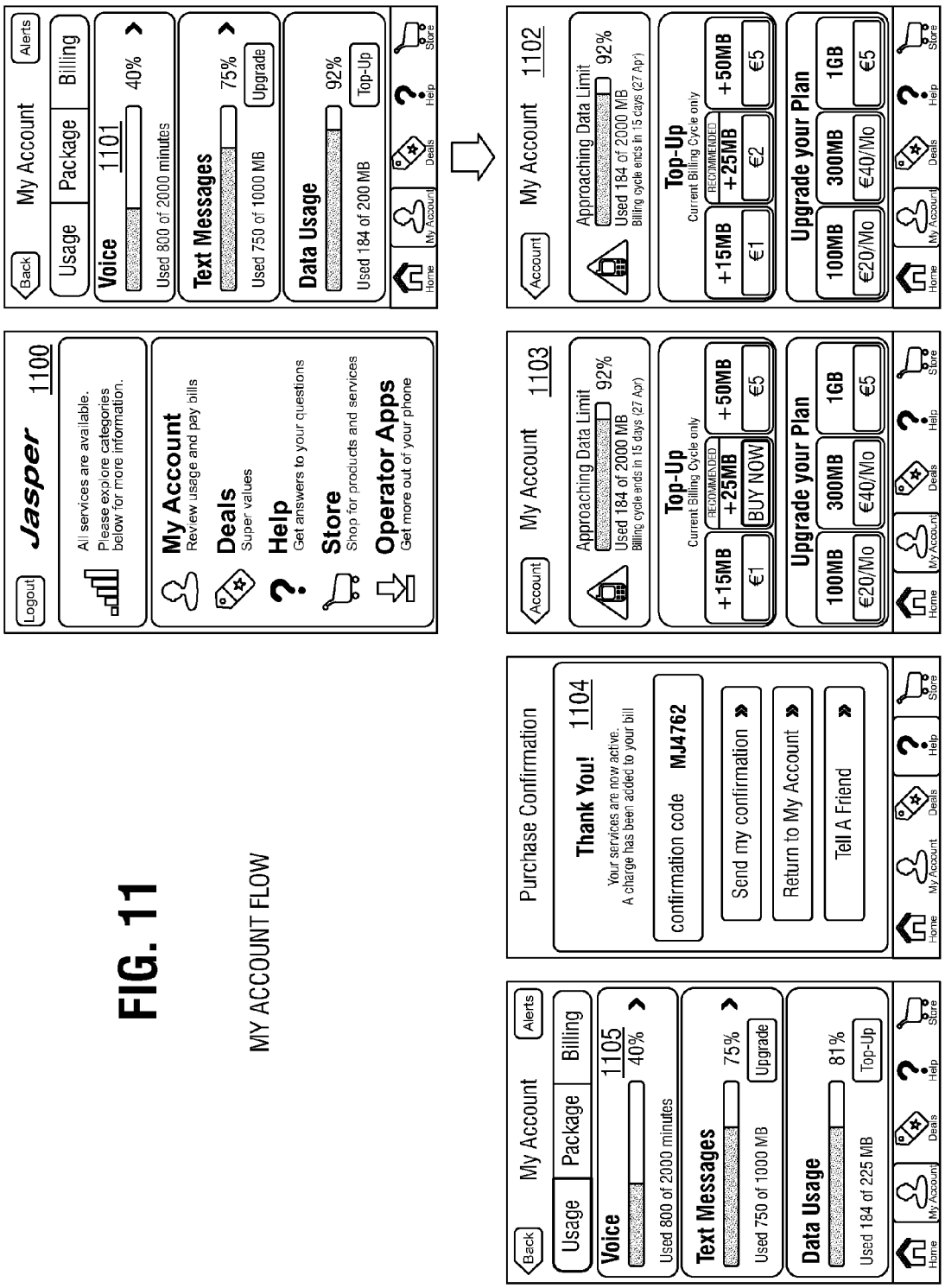
FIG. 11 is an embodiment of a display screen of a CSP device application (CDA) that shows a "My Account" feature.

FIGS. 11-15 illustrate examples of the functions provided by CDA 140 according to embodiments of the invention. Referring to FIG. 11, a series of screen displays of CDA 140 is shown in connection with a top-up offer for data usage. Initially, a home page (1100) provides a number of options, one of which is "My Account." By selecting the usage tab in the My Account page, the user's usage for voice, text message and data is displayed on the user device (1101). The display shows the user's data usage is at 92% of the quota limit. Automatically or by user's selection, a top-up offer page (1102) including multiple options is shown to the user. Each option is an offer created by the recommendation engine based on the contextual assessment described in connection with FIG. 6, and approved by the operator. If the user selects one of the options (1103), a purchase confirmation page (1104) will be shown on the display. At that point, the usage page (1105) shows that the user's quota has been increased and the data usage is now at 81% of the quota limit.

The "My Account" feature allows a user to check his current usage information whenever he wants to. If the user does not take the initiative to check his current usage and limits, he can be notified by alerts of situations that can lower his QoS or disable his network connections. Alerts will be described with reference to FIGS. 15A and 15B.

In one embodiment, the "My Account" feature also allows a user to monitor the billing; e.g., the amount of money he spent on network services before receiving a billing statement. For example, if the user is roaming and incurring roaming charges, he can monitor the amount of roaming charges in his account by clicking on the "billing" tab on the top right corner.

Figure 12:
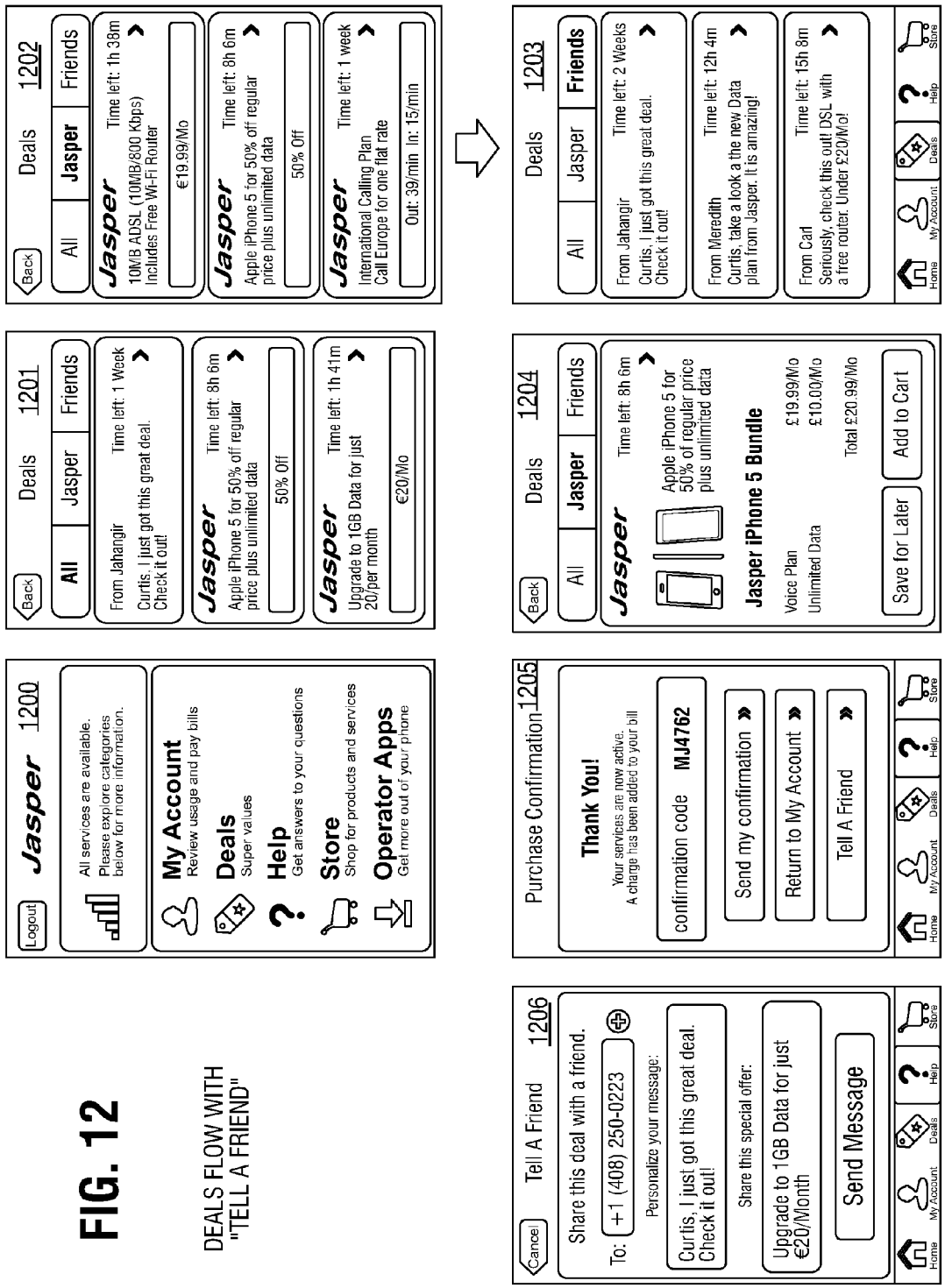
FIG. 12 is an embodiment of a display screen of a CDA that shows a "Tell a Friend" feature.

Referring to FIG. 12, a series of screen displays of CDA 140 is shown in connection with a "Tell-a-Friend" feature. Initially, a home page (1200) provides a number of options, one of which is "Deals." The Deals page (1201) shows all of the currently available deals relating to wireless communication services and devices. A user can select a tab to filter the displayed result; for example, deals offered by a particular provider, vendor or operator (1202). A user can select a "Friends" tab (1203) to show the deals recommended by his friends. By clicking into a particular offer (1204), the user can make a purchase in real time or save the offer for later consideration. A purchase confirmation page (1205) is displayed when the user makes a purchase. The user can share the information about this offer with his friend by clicking a soft button "Send Message" to send a generic or personalized message (1206).

Figure 13:
FIG. 13 is an embodiment of a display screen of a CDA that shows a "Diagnostic Help" feature.

Referring to FIG. 13, a series of screen displays of CDA 140 is shown in connection with a "Help" feature, which performs diagnosis and provides help. In one embodiment, the diagnosis is performed by the user's device, taking into account the information collected by CSP system 530 from many data sources (e.g., PCRF, OCS, CDRs, CRM, etc.). The diagnosis can be performed in the following areas: the user's coverage, subscription, usage, payment, roaming status, and the like. Initially, a home page (1300) shows that all services are currently available. A user can select a number of options, one of which is "Help," to explore more information. Clicking into the help page (1301) automatically activates a diagnostic function. In this example, the diagnostic function finds that the user's payment is overdue. By clicking on the diagnosed problem (payment), the user can go to a page displaying payment options (1302). The user can make payment by credit and debit cards (1303 and 1304). A purchase confirmation is shown after the payment is accepted (1305).

As shown in the example above, the "Help" feature not only discovers a problem, but also provides a resolution to the problem in a user-friendly way. In another scenario, a user may find out from the diagnosis that he does not have coverage. This diagnosed problem (coverage) can re-direct him to one or more proposed solutions, such as moving down the road 10 miles or purchasing an upgrade to the network coverage.

FIG. 14 illustrates an example in which a connection problem is automatically detected without the user proactively running the diagnostic function. In this example, the top panel of the display shows that a connection problem has been detected (1400). The user can click a "Fix Now" soft button and see a list of questions that are relevant to the detected problem (1401). The user can select one of the questions to find more information; e.g., the user's current status that is relevant to the cause of the detected problem (1402). In this scenario, a voice test is recommended. The user can run the voice test to test his/her voice connection (1403 and 1404). For example, the user device can send a message to request a voice network component in the operator network to call the user device. If a problem is found, the user can choose whether to report the problem to the operator (1405). If the user chooses to report the problem, a report confirmation page (1406) is displayed. In other scenarios, the user can run a data connection test or a messaging test to request a data server or a messaging server in the operator network to call the user device. This "Help" feature is another example of a contextual action that provides a clear path towards resolution of an issue that a user current has.

FIG. 15A illustrates an example of a "User Alert" feature. In this example, when a user reaches his quota limit, the top panel of the display shows an alert and a top-up offer (1500). The alert may show that the user has exceeded his usage threshold but is still within the quota limit, or that the user has reached the quota limit. The user can select a top-up offer from the top panel without clicking into deeper levels of the menu (1501), or review more plan upgrade options. After the user selects the top-up offer and makes the purchase, a purchase confirmation page is displayed (1502). As described in connection with FIG. 6, the top-up offer and upgrade options can be created by the recommendation engine based on contextual assessment of the user's unique situation, and approved by the operator.

FIG. 15B illustrates an example of a "Roaming Alert" feature. In this example, a user roams into another network (or another area) but his plan does not support such roaming. The display shows an alert and a number of options (1530). The user can select any of the options to enable the roaming (1531). Each option is an offer created by the recommendation engine based on the contextual assessment described in connection with FIG. 6, and approved by the operator. After the user selects one of the options and makes the purchase, a purchase confirmation page is displayed (1532).

FIG. 15C illustrates an example of a device display screen 1550 that allows a subscriber to enter a code as described before.

CSP—IT Integration

Referring again to FIG. 6, in one embodiment, CSP system 530 integrates with four functions of operator IT system 150 in the areas of CRM/care 610, provisioning/order entry 620, billing/payments 630 and reporting/DWH 640. CSP system 530 integrates with each of the four areas through a corresponding interface. The CRM interface supports rating, policy and offer management, campaign management and customer management and care. The provisioning/order entry interface enables the activation of selected services within the operator systems. The billing interface allows usage information to be shared with CSP system 530. Thus, a user can see his up-to-the-minute usage via CDA 140 without having to contact customer care. The reporting interface makes available the CSP-generated reports to all necessary functions within the operator.

The CSP experience provides both the consumer and the operator a number of self-service tools that can be used anytime and anywhere to manage their services. For the consumer, CSP system 530 offers the ability to see, select and purchase new services, as well as perform account management and self-support activities, such as account balance inquires, payment method changes; all from their smartphones (or another wireless communication device) and all in real time.

For the operator, CSP system 530 provides a suite of tools that enables the creation and management of all of the services and experiences received by the customer. For example, the operator's CRM system 610 can integrate with CSP system 530 to provide details on offers and services that CSP system 530 can recommend to the customer as upsells or standard sales offers, to view current account balances and usage, manage payments and to provide diagnostics to assist the user with self-service resolution of common support issues. CSP system 530 can also integrate with the operator's reporting and data warehouse systems 640 to provide financial, marketing and management reporting.

In one embodiment, integration between CSP system 530 and operator IT system 150 is based upon the availability of interfaces to selected systems and/or groups of systems. As CSP system 530 uses a model that abstracts its interfaces to the operator platform using an adaptation layer, these interfaces can vary from standards-based Web services APIs to secure file transfers.

In one embodiment, the interfaces enable not only the integration of CSP system 530 with operator IT system 150, but also the ability for an operator to manage its marketing campaign, offers, pricing, billing and customer care in an integrated environment. In one embodiment, this integrated environment is presented to the operator via CSP operator Web applications 154. CSP operator Web applications 154 may be run on a computer in the control center of operator IT system 150.

Figure 16:
FIG. 16 is an embodiment of a display screen of CSP operator Web applications.

FIG. 16 illustrates an embodiment of a screen display of CSP operator Web applications (e.g., CSP operator Web applications 154 of FIG. 6). In this embodiment, the screen display includes a top panel that shows alerts and status 1601 and campaign results 1605. Alerts and status 1601 allows an operator (or more specifically, the administrators at the operator side) to communicate with each other with respect to the latest updates and status of operator network 110 and operator IT system 150 (FIG. 6). In one embodiment, the main panel of the display is divided into three regions: Create Offers and Policy 1602, View Customer Activity 1603 and Manage Communications 1604. Each of the three regions includes a number of task modules 1610-1618 that allow the administrators to perform specific tasks. The backend of task modules 1610-1618 is CSP system 530, or more specifically, CSP engines 122 (FIG. 6). When an operator clicks on any of task modules 1610-1618, the operator can be provided with templates and data that are generated by one or more CSP engines 122. CSP engines 122 generate the templates and data based on the information obtained from operator network 110 and operator IT system 150 (FIG. 6). In one embodiment, access to these task modules 1610 can be role-based; that is, an administrator with a marketing role may be able to access only a subset of task modules 1610-1618 while an administrator with a manager role may be able to access all of task modules 1610-1618.

In one embodiment, some of the task modules, such as pricing workstation 1610 and offers workstation 1611, allow the administrators to create offers and set pricing. In one embodiment, CSP system 530 can provide offers and pricing templates for the operator to fill in the details. Through subscriber portal 1612, an operator can design subscriber's on-device experience, also using the templates provided by CSP system 530. These templates allow the operator to set a pricing plan and package the pricing plan into an offer associated with a policy. The pricing, offer and policy are sent to CSP system 530 to allow CSP system 530 to deliver the right offers with the right pricing to the right subscribers at the right time. CSP system 530 can also provide other templates that can be used by the operator with a click on any of task modules 1610-1618.

In one embodiment, an operator can view the details (e.g., activities and history) about subscribers through the task module of subscriber details 1613, and perform operations on their accounts; e.g., activate or deactivate the accounts, change offers, apply promotions and other account administrative tasks. Custom alerts 1614 allow administrators of the operator to configure rules for alert-triggering events. These alerts may be accompanied by automated response to specific events for resolving the condition causing the alerts. The task module of reports 1615 allows the operator to review and analyze subscriber and financial data. For example, the operator can run a report to find out when a particular offer or a particular group of offers have reached a set market share or set usage.

In one embodiment, an operator can design campaigns to send offers and incentives to specific subscribers using campaign center 1616. In one embodiment, the offers and incentives can be delivered to CDA 140 on the user device via CSP system 530 (FIG. 6). In one embodiment, CSP system 530 can provide campaign templates for the operator to determine the specific details of campaigns. For example, the operator can decide on a plan and the recommendation engine of CSP system 530 can recommend a segment of subscribers to whom this plan should be offered. Alternatively, the operator can decide on a segment of subscribers and the recommendation engine can recommend a plan to offer to these subscribers.

In one embodiment, an operator can use customer alerts 1617 to set up an alert for specific subscribers and the rules associated with the alert. The alert can be displayed on the user device to allow a subscriber to take remedial action; e.g., to accept a top-up offer that is delivered with the alert to the subscriber. In one embodiment, the task module of analytics 1618 is backed by the recommendation engine of CSP system 530. Analytics 1618 allows the operator to identify trends and opportunities based on the subscribers' behavior and campaign results. For example, if the subscriber reaches his usage limit for the first time, analytics 1618 can recommend a top-up offer (which is valid only for this current billing cycle). If this is the fifth time within a five-month period that the subscriber has reached the threshold, analytics 1618 can recommend an upgrade offer such that the subscriber can switch to an upgraded plan and receive a higher quota limit every billing cycle.

As mentioned before, the integration of CSP system 530 and operator IT system 150 (FIG. 6) enables the functionality of CSP operator Web applications 154 described above. The following describes this integration with respect to CRM/care 610, provisioning/order entry 620, billing/payments 630 and reporting/DWH 640 (FIG. 6).

CRM Integration.

Figure 17A:
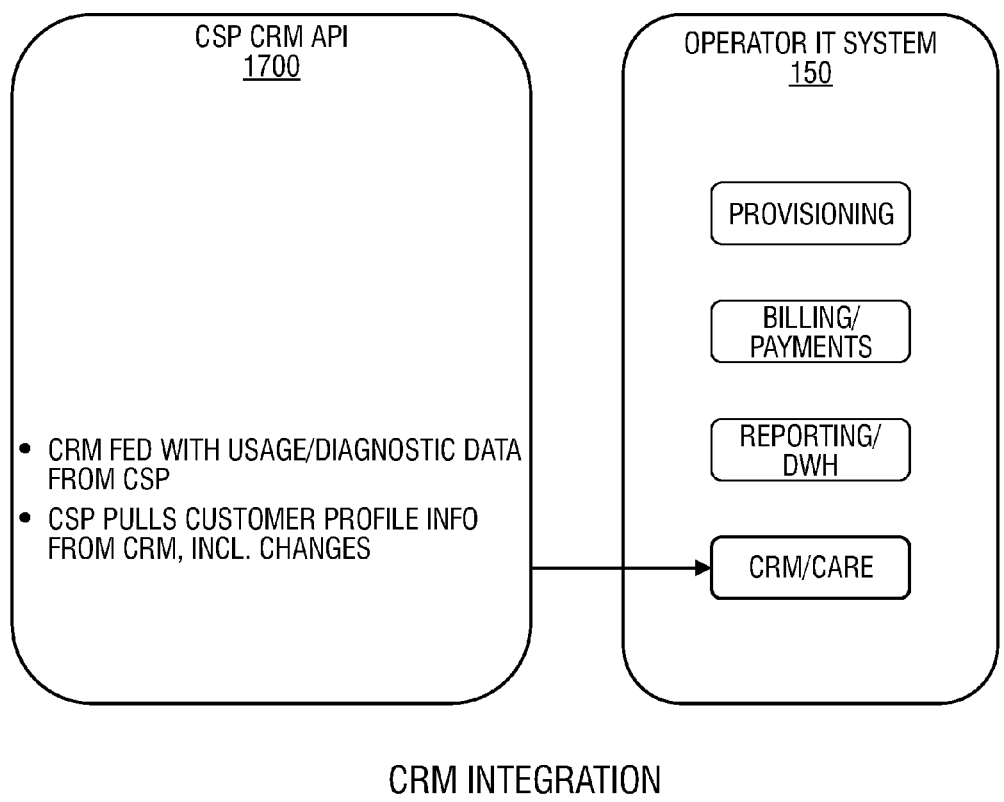
FIG. 17A is an embodiment of Custom Relationship Management (CRM) integration.

FIG. 17A is an overview of CRM integration according to one embodiment of the invention. Referring also to FIG. 6, CSP system 530 includes a CSP CRM API 1700, which interacts with operator IT system 150 to manage or recommend strategies for CRM and care. Through CSP CRM API 1700, the operator's CRM system 610 is fed with usage and diagnostic data from CSP system 530, and CSP system 530 pulls customers profile information and updates from the CRM system 610. In one embodiment, CSP system 530 integrates with the operator's CRM system 610 in the following areas: Rating, Policy and Offer Management; Campaign Management; and Customer Management and Care.

CRM Integration Area (I): Rating, Policy and Offer Management (Product Catalog).

Through the integrated rating, policy and offer management functions, CSP system 530 provides the operator a powerful set of tools to create, edit, approve and manage rate plans and policy actions for consumers. As the front-end interface to an integrated OCS and PCRF facility, CSP's Pricing and Offers engines (e.g., CSP engine 122 of FIG. 6) integrate with the operator's Product and Policy Catalog to pull current offers and create new offers and policy rules.

Depending on the nature of the product deployment, CSP system 530 can replicate offers currently in the operator's product catalog, create and push offers to the operator, or act as the master product catalog for rating. In all of these three cases, CSP CRM API 1700 provides proper synchronization between CSP system 530 and operator IT system 150, as well as ensuring availability of offers and policies. CSP CRM API 1700 allows CSP system 530 to access and pull offers. CSP CRM API 1700 also facilitates a submit/approve/publish method to push offers to the operator.

Through CSP CRM API 1700, CSP system 530 pulls all applicable offers, catalog rules, offer parameters and policy descriptions into an easy-to-use, self-service user interface that the operator's marketing personnel can use to quickly create new offers and promotions. In practice, the process to create and approve an offer touches many internal operator departments and may need some level of internal coordination and process to accomplish. To properly engage with and manage this need, CSP system 530 has an integrated approval workflow to prevent the use of these offers and policies until they are reviewed and approved by the appropriate operator-designated personnel. Once approved, the offers and policies can be pushed to the operator using CSP CRM API 1700 or a similar API.

A sample product catalog/rating/policy template is shown below.

TABLE 1

Sample (Basic Offer) Product Catalog Template

| Catalog Area | Field Name | Description |
|---|---|---|
| Identification | Offer Code | Operator's offer code used to identify the offer to CRM and other systems |
| | Offer Friendly Name | Name of the offer that will be presented in the CDA |
| | Applicable Service Type(s) | Service Type that this offer is applicable to (voice, data, etc.) |
| | Effective/Expiration Date(s) | When offer can be used/stops being offered |
| | Compatible Offer Code(s) | Codes of offers that are compatible (allowed to be purchased) with this offer |
| | Allowed payment types | Payment types (debit, credit card, prepaid) allowed for plan purchase |
| Rates | Primary Rating Type | First rating scheme as applicable to service type (by units of usage, time, destination, etc.) |
| | Rating Amount | Amount charged for rated usage |
| | Secondary Rating Type | Additional rating scheme as applicable to service type (by units of usage, time, destination, etc.) |
| | Rating Amount | Amount charged for rated usage |
| Policy | Policy Conditions | Selected policy conditions, e.g. throttle, redirect, notify |
| | Policy Actions | Parameter and action when policy condition is met |
| | Type of Offer | Standard offer, upsell or both. |

In case an API is not or cannot be made available, a manual synchronization process can be used to perform the actions that would be taken by the API. In this manual approach, the operator uses the CSP Pricing and Offer engines to create and publish the appropriate offers and policies. A key to success in this approach will be the creation of business processes that govern the speed and frequency of updates.

Figure 17B:
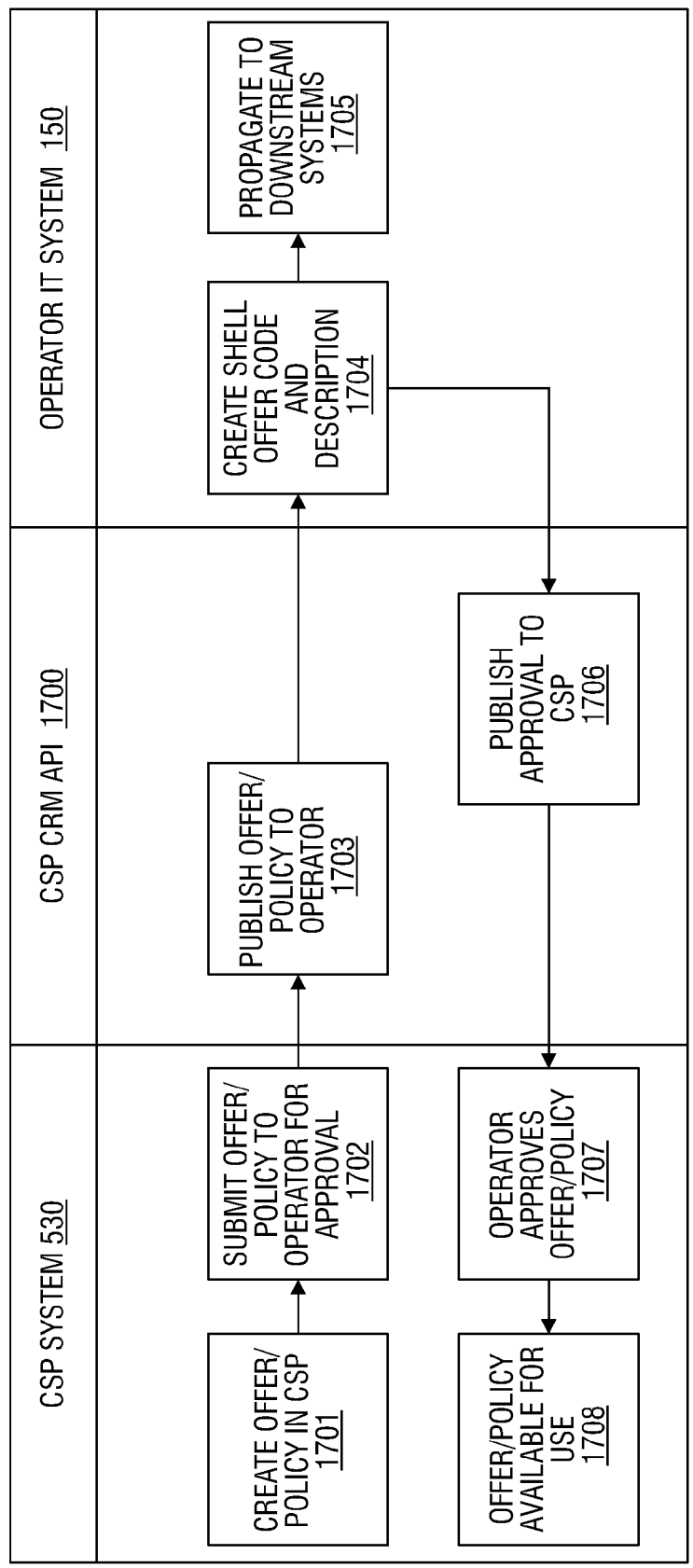
FIG. 17B is an embodiment of a process for publishing offer/policy from a CSP system to an operator.

FIG. 17B illustrates an example of an operation sequence that allows offers created by CSP system 530 to be modeled and managed in the operator's product catalog. In one embodiment, CSP system 530 creates an offer/policy template (or zero-rated offer) (1701). CSP system 530 then submits that offer/policy to the operator for approval (1702). CSP CRM API 1700 publishes the offer/policy to the operator (1703). Upon receipt of the offer/policy, operator IT system 150 creates shell offer code and description (e.g., by associating the parameters of that offer (Offer Code, etc.) to the CSP-created offer) (1704). Operator IT system 150 then propagates the offer/policy to downstream systems (1705). Thus, all downstream systems that are fed from the product catalog (Care, Finance, Reporting, etc.) receive information and updates during the normal course of business. Through CSP CRM API 1700, operator IT system 150 also publishes the approval to CSP system 530 (1706). Upon receipt of the operator's approval (1707), CSP system 530 makes the offer/policy available for use by the customers (1708).

CRM Integration Area (II): Campaign Management.

In one embodiment, CSP system 530 includes Customer Alerts and Campaign engines (e.g., one or more of CSP engines 122 of FIG. 6), which use offers generated by the Pricing and Offer engines (e.g., one or more of CSP engines 122 of FIG. 6) to provide customers with automated and operator-generated upsell offers. The Customer Alerts engine allows the operator personnel to create and set automated alerts that provide customers notification of key lifecycle events, e.g. reaching a usage threshold, approaching a bill cycle date, accessing a non-included service such as roaming. Included in these alerts can be contextually relevant upsell offers that allow the customer to continue using services. The Campaign engine allows the operator's marketing personnel to either use CSP's integrated recommendations engine (one of CSP engines 122 shown in FIG. 6) to identify targeted lists of customers for receiving promotions, or to upload a pre-segmented list.

TABLE 2

Integrations Supporting Campaign Management

| Required Function | Description | Addressed in Integration Area |
|---|---|---|
| Usage data | Provides campaign analytics and recommendation | Network |
| Notifications | Sends SMS messages to customers that have received a campaign | |
| Service offers and upsells | Offers that have been approved for use as campaigns and upsells | Rating and Policy (Product Catalog) |
| Opt-In | Customer's preference to receive alerts, notifications and campaigns from the Operator | Customer Profile |
| Personalization | Information to create a more personal campaign as well as validate that the campaign is sent to the right consumer | |
| Report and Source Data | In the case that the Operator uses their own pre-segmented list of target customers. | Data Warehouse |

CRM Integration Area (III): Customer Management— Customer Profile.

CSP system 530 is designed to address the sensitivity of the operator's customer data and the number of regulatory and legal issues. Integration between CSP system 530 and the operator's CRM customer profile is needed to enable several functions: authentication of CDA 140, personalization of offers and alerts, and knowledge of customer offers for recommendations and account management. In all cases, CSP system 530 looks to the operator's CRM system 610 as the master record for all customer data.

To protect end-customer data, all of the end-customer data is stored within the CSP customer database and managed in a manner that enables it to be secure and auditable at all times. Any changes made to the customer data are tracked using an audit trail that can be made available for reports, audits, etc. In addition, the CSP data centers can be deployed in specific geographical locations to accommodate data security, privacy and location requirements.

The integration that is required to store and update this data inside CSP system 530 can be accomplished using an API (e.g., CSP CRM API 1700 of FIG. 17A) that enables data to be pulled from the operator's CRM system 610 using a commonly used and relatively unchanged key. In one embodiment, the key can be the International Mobile Subscriber Identity (IMSI) followed by the Mobile Station International Subscriber Directory Number (MSISDN). Depending on the nature of the product deployment, customers may be allowed to update their data through the CDA 140, e.g. change billing methods, addresses, etc. In this case, the same approach is recommended to update customer data inside the operator's systems.

Since the customer profile data feeds CSP's customer database and contains all of the customer's current plan information, the CRM integration also enables changes made outside of CSP system 530 to be reflected in the CDA 140 and CSP system 530. Thus, any changes to rating or policy parameters can be properly synchronized between CSP system 530 and the operator. To that end, changes made within the operator's customer care and/or retail ordering systems are pushed (recommended) or pulled periodically from the operator's CRM system 610 to CSP system 530. The CRM integration allows CSP system 530 to be constantly up-to-date with the operator's systems. In one embodiment, the API (e.g., CSP CRM API 1700 of FIG. 17A) allows customer data to be rapidly accessed and updated. This is necessary because customer profile data is used in the display of account management functions, as well as a key input into the CSP recommendations engine.

In one embodiment, CSP system 530 uses the following information in the customer profile for CRM integration:

TABLE 3

Customer Profile Fields and CSP Functions that Use These Fields

| Field Name | Description | Authentication | Recommendation | Account-Mgt |
|---|---|---|---|---|
| IMSI | Customer's IMSI | x | | |
| MSISDN | Customer's phone number | x | | |
| Customer Name | Customer's billing name | x | | x |
| Billing Account Number | the Operator's billing account for customer | x | | x |
| Contract Date (tenure) | Original contract date or tenure of customer | x | x | |
| Current Plan Type | Prepaid or postpaid | | x | x |
| Current Voice Plan | Current plan | | x | x |
| Current Data Plan | | | x | x |
| Current Messaging Plan | | | x | x |
| Current "other" Plan | Current non-mobile or other service plan | | x | x |

TABLE 3-continued

Customer Profile Fields and CSP Functions that Use These Fields

| Field Name | Description | Authentication | Recommendation | Account-Mgt |
|---|---|---|---|---|
| Bill Cycle Date | Postpaid bill cycle date or prepaid expiration date | | x | x |
| Previous Voice Plan | Most recent changed plan | | x | x |
| Previous Data Plan | | | x | x |
| Previous Messaging Plan | | | x | x |
| Previous "other" Plan | | | x | x |
| IMEI/Device Type | Device type identifier or IMEI—the latter is preferred | x | x | |
| Opt-In Status | Customer's election to receive notifications | | x | |
| Campaign Opt-In Status | Customer's election to receive campaigns and promotions | | x | |
| Current campaign | Campaign customer is currently attached to (if any) | | x | |

CRM Integration Area (VI): Customer Management—Customer Care.

CSP system 530 has a number of customer management capabilities that can be useful to the operator's customer care and customer management teams.

In one embodiment, CSP system 530 does not directly push data into the operator's CRM system 610. Rather, it assumes that integrations are already in place within the operator's infrastructure to pass information, for example, from the product catalog, provisioning/ordering and similar systems to the CRM system 610. If a direct push integration to the CRM system is necessary, CSP system 530 can provide information via an API to the CRM system 610 on a per-event or time-basis.

In one embodiment, CSP system 530 can, via an API, allow the operator's CRM system 610 to provide diagnostic, current offer and current usage data. Since CSP system 530 is both the rating and policy management engine, a customer current usage and policy status, e.g. throttled or not throttled can be made available to the CRM system 610. One key component of the CSP system 530 is the ability to push advanced service and network-level diagnostics to the handset and provide the user timely and actionable feedback to solve issues.

While one of the key attributes of the CSP system 530 and CDA is the ability to allow a customer to perform a majority of account management and self-support issues, it may be unavoidable that sometimes the customer will call customer care. When the customer does call customer care, the customer care agent (or a technical support representative) can, via the API, pull diagnostic information into their normal systems and provide assistance to the customer. In the case where the CRM system cannot integrate to an external data source, CSP system 530 can be setup to launch-in-context (LIC) along with the customer care representative's existing tools.

Provisioning/Order Entry Integration.

Prior to the description of provisioning/order entry integration, it is useful to differentiate between order management and provisioning/order entry functions. Order management functions aggregate customer selections for offers, payment methods and any other updates and pass that information to a provisioning/order entry system that allows access to those ordered services on the network.

Since CSP system 530 may be the master rating and policy engine, it can enable access to the selected services and then integrate with the order management system to feed data to downstream systems, e.g. care, reporting and CRM. This integration assumes the existence of interfaces between the order management and related downstream systems (e.g., CRM and reporting) to manage activities such as customer activation, service changes, device changes and updating financial and marketing reports.

Figure 18A:
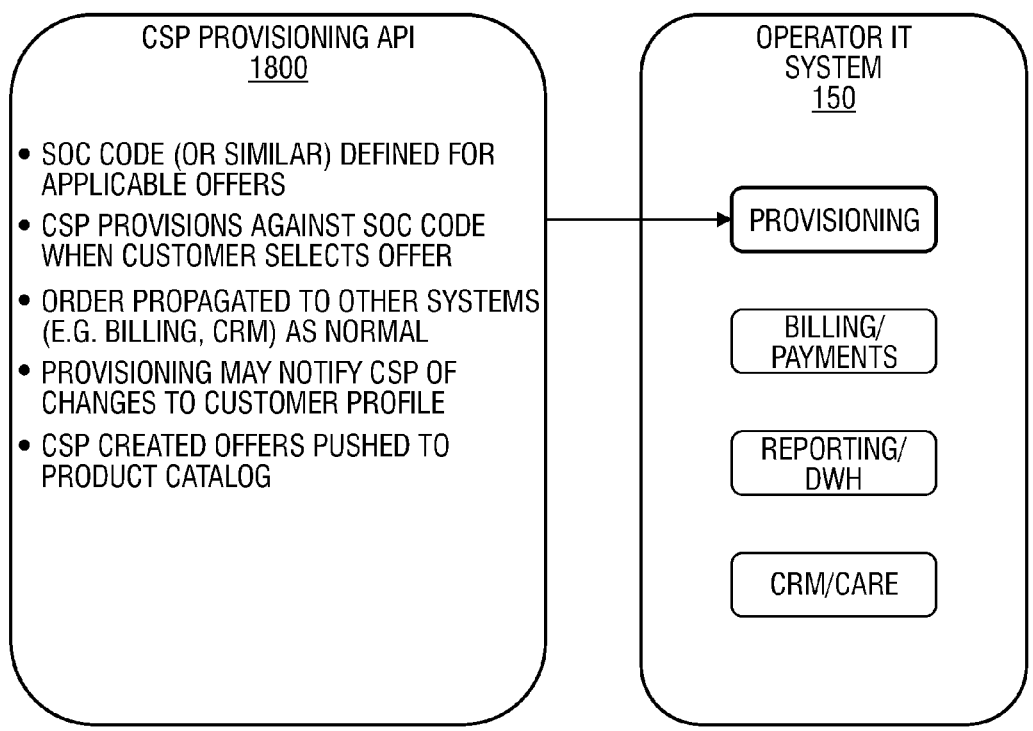
FIG. 18A is an embodiment of provisioning/order entry integration.

FIG. 18A is an overview of provisioning/order entry integration according to one embodiment of the invention. Referring also to FIG. 6, CSP system 530 includes a CSP provisioning/order entry API 1800, which interacts with operator IT system 150 to manage service provisioning/order entry. In one embodiment, CSP provisioning/order entry API 1800 defines service offer codes (SOCs) for offers that are applicable to one or more customers. When the customer selects an offer, CSP system 530 provisions the selected service against the SOC code. The selected offer is then propagated to other systems (e.g., CRM and billing). Through CSP provisioning/order entry API 1800, CSP system 530 can be notified of changes to customer profile, and CSP-created offers can be pushed to the product catalog.

In one embodiment, CSP system 530 is provided with the appropriate identifiers for all available provisioned services. These codes (and associated parameters) are known as service offer codes (SOC) and can be used by CSP system 530 to inform the provisioning/order entry system to allow a customer access to their selected offers. For data services, CSP system 530 can provision service access on its integrated PCRF based upon the customer's selections, and submit, via CSP provisioning/order entry API 1800, the appropriate SOC, any relevant parameters and a customer identifier (IMSI or MSISDN) directly to the provisioning/order entry system for fulfillment. In parallel, CSP system 530 can send the same information via a Web services interface to the operator's order management system for further processing and population of downstream systems. In an alternative embodiment, the operator can choose to provision its PCRF with the same information as CSP system 530.

Figure 18B:
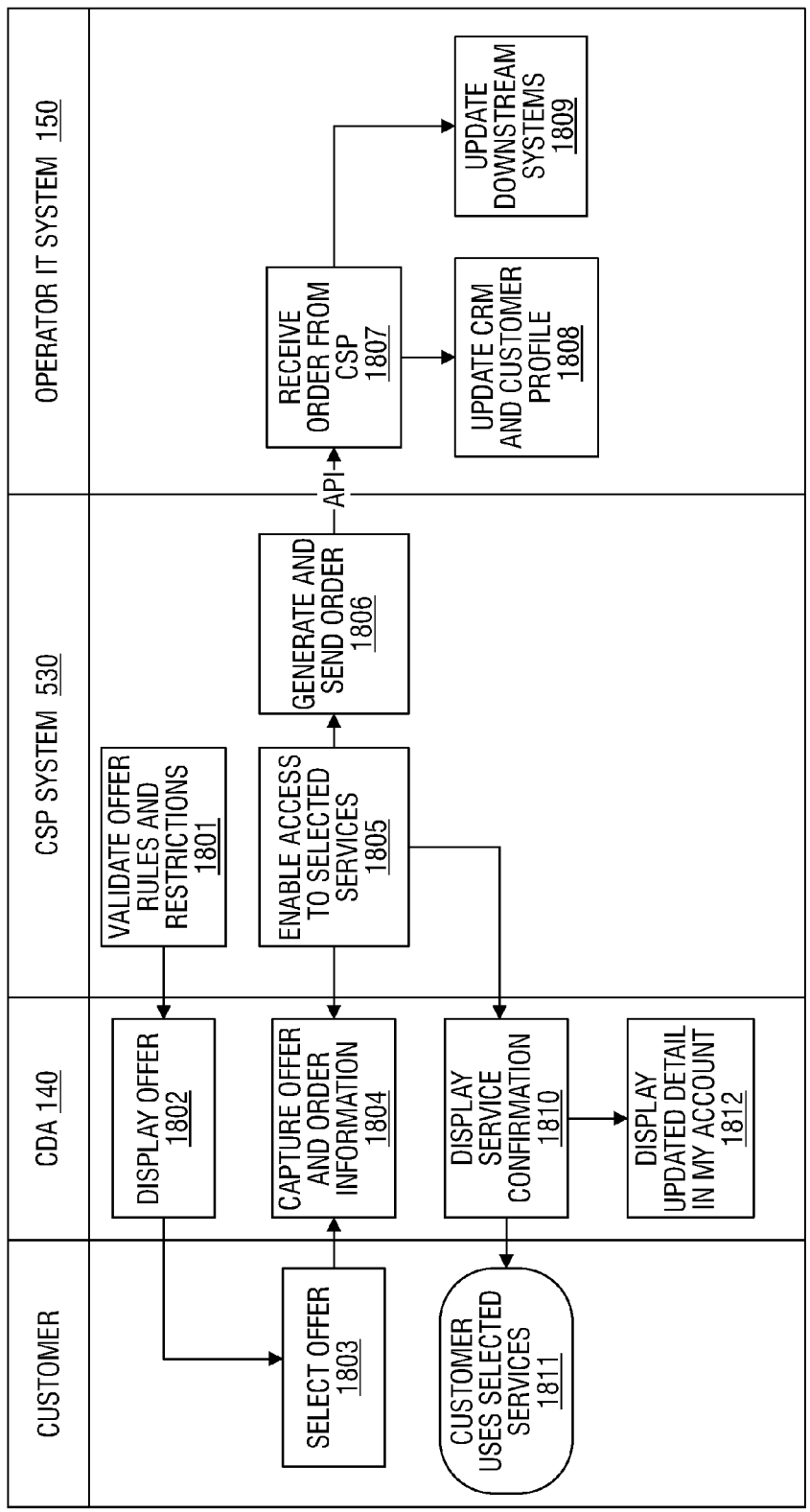
FIG. 18B is an embodiment of a process for provisioning/order entry integration.

FIG. 18B illustrates an example of an operation sequence that provisions the offers selected by customers. In one embodiment, CSP system 530 validates offer rules and restriction (1801), and signals CDA 140 to display offers (1802). When the customer selects an offer (1803), CDA 140 captures the offer and order information (1804). In response, CSP system 530 enables access to selected services (1805). At this point, CSP system 530 generates and sends the order to operator IT system 150 via an API (e.g., CSP provisioning/order entry API 1901) (1806), and in parallel, signals CDA 140 to display service confirmation (1810). When operator IT system 150 receives the order from CSP system 530 (1807), it updates CRM and customer profile (1808) as well as downstream systems (1809). After CDA 140 displays service confirmation (1810), the customer can start using the selected services (1811). CDA 140 can further display updated details in My Account (e.g., the My Account feature shown in FIG. 11).

CSP system 530 also offers the ability to offer and provision other mobile (voice, messaging) and non-mobile services (DSL, insurance) that are not rated by CSP system 530. In this case, CSP system 530 can, using the same mechanisms noted above, provide the provisioning/order entry and ordering systems the appropriate SOC (or equivalent) code, allowing the appropriate network elements (e.g., HLRs) and IT platforms (CRM) to be updated. To that end, all of the products and services offered by the operator need to be provided to CSP system 530, placed in the product catalog and synchronized.

In one embodiment, an offer to a customer may be embodied in a transmission of a promotional code from CSP system 530 to the CDA of the mobile device of the customer. The promotional code would enable the customer to acquire a new mobile device with a new SIM such as, for example, a new or upgraded smart phone. The customer may acquire the new smart phone and SIM via an operator storefront or the operator may choose to send the smart phone with SIM directly to the customer via the mail. Upon acquiring the new smart phone, the customer simply enters the code via the CDA GUI to automatically activate and provision the smart phone with the customer's existing profile.

In the case where the customer is ready to use the new device and SIM, the operator's provisioning system provisions the SIM data against the subscriber record in the subscriber database, and also provisions the device with subscriber-specific settings as needed. Provisioning the device settings may be done through an Over-The-Air Channel to the device. Specific device settings may include devices settings for data access (e.g. APN), specific operator short codes for premium SMS services, voice mail numbers, customer care number, contact address book, subscriber profile for email access, iTunes® profile, customized browser settings, ringtone settings, etc.

Embodiments of the invention allow a given user to use any device and SIM and have that device and SIM combination be provisioned to provide all of that subscriber's services. In one embodiment the device may even be "borrowed" from a second subscriber. The subscriber may enter a specific code to the device, which indicates that the device and its embedded SIM are to be provisioned to provide all of the services that the subscriber has subscribed to. The specific code includes an identifier for the subscriber, such as a telephone number, account number, social security number or other subscriber identifier.

An example of a device display screen 1550 that allows a subscriber to enter a code is shown in FIG. 15C. The specific code may include parameters associated with the usage of the device and SIM by the subscriber. For example, the code may limit the user to the usage of the device and SIM for only a specific period of time, after which the device and SIM revert to their previous provisioned state. In another embodiment, the specific code may limit the usage of the SIM and device to only a specific location or geographic area. For example, a user may be able to use a device and SIM with his own subscription and services only within a Mobile Network Operator retail outlet in a try-before-you buy scenario.

As previously noted, CSP system 530 receives information about a customer's current services and selections from the customer profile database. If a change is made to the customer's plans or services via the Care or Retail system, these changes and their associated provisioning/order entry changes are sent to CSP system 530.

Billing Integration.

In one embodiment, CSP system 530 integrates with the operator's billing system in the following areas: Rating of Data Usage, Self-Service Account Management and Risk Management and Payment.

Figure 19:
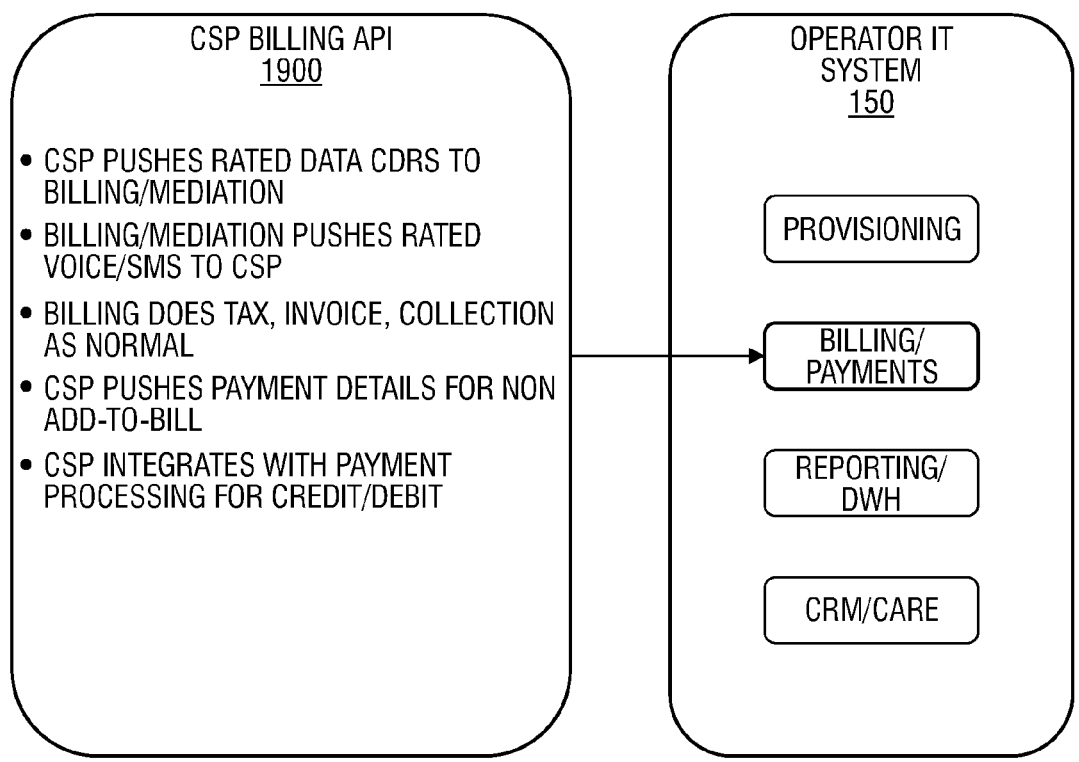
FIG. 19 is an embodiment of billing integration.

FIG. 19 is an overview of billing integration according to one embodiment of the invention. Referring also to FIG. 6, CSP system 530 of FIG. 6 includes a CSP billing API 1900, which interacts with operator IT system 150 to manage billing and payments. In one embodiment, through CSP billing API 1900, CSP system 530 pushes rated data CDRs to billing/mediation system, and billing/mediation system pushes rated voice and SMS to CSP system 530. CSP system 530 is integrated for credit/debit processing. CSP system 530 can push payment details to operator's billing/mediation system. The operator's billing system does tax, invoice and collection.

Billing Integration Area (I): Rating of Data Usage.

In one embodiment, a CSP-integrated OCS can be used to rate data usage for customers that are managed by CSP system 530. The rates and policies used by the OCS can be stored and managed by CSP system 530.

In one embodiment, CSP system 530 can rate usage and calculate charges on a per session basis. Depending on the nature of the product deployment, CSP system 530 can either store, aggregate and format usage into an invoice-ready format, or send rated, per-session usage to the operator's CRM or other system. If the former, CSP system 530 can provide the invoice-ready data feeds to a mutually agreed sFTP site for the operator to pick up and include into its billing process a set number of days prior to the close of the billing cycle.

In the latter option, CSP system 530 can post, on a per-session basis, aggregated usage including the customer identifier (IMSI or MSISDN), plan code and total usage. In one embodiment, this integration will be managed through the use of an API (e.g., CSP billing API 1900) that can directly feed the operator billing system. A known analogue to this type of integration is one where a third party provides a "bill on behalf of" service to an operator. In this case, CSP system 530 will be charging data usage on behalf of the operator and providing that rated usage for use by downstream financial systems (e.g., taxation) as well as CRM and reporting systems. If an API cannot be made available, these data can be posted to a sFTP site.

Billing Integration Area (II): Self Service Account Management.

A key feature of the CDA 140 is the ability for the customer to view, in real time, current service usage. In an embodiment where CSP system 530 is rating data and the operator is rating voice and SMS, it is necessary to integrate with the operator's usage management systems to get rated and/or aggregated usage for those services. Depending on the operator system that sources this data, a push API or sFTP file transfer can be used to get these data. A key factor in determining how to perform this integration is how fast the usage information can be made available via the interface. If there is a delay greater than a pre-defined time period (e.g., 15 minutes between usage completion and CDR delivery), a secondary method may be used to enable the "real-time" nature of the CDA 140 account management function. In this case, the customer profile integration may be a candidate to pull current, aggregated usage.

Billing Integration Area (III): Risk Management and Payment.

Depending on the nature of the product deployment, CSP system 530 can also integrate with the operator's risk management and payment systems. The integration with these services is highly dependent on the service used and where it sits within the operator infrastructure. The ideal integration with CSP system 530 is to use an existing interface, e.g. the customer profile to determine the risk score for a customer and use that along with the catalog rules sourced from the product catalog integration to determine payment risk.

In addition, CSP system 530 can, as part of the order management and provisioning/order entry transaction, send a payment type and payment details. This is necessary if the operator wants to enable prepaid or credit card payments for services purchased via CDA 140. In this case, the integration is also highly dependent on the target system and its location within the operator infrastructure. Typically, CSP system 530 can interface with but does not actually store or process any payments.

Data Warehouse/Business Intelligence Integration.

Figure 20:
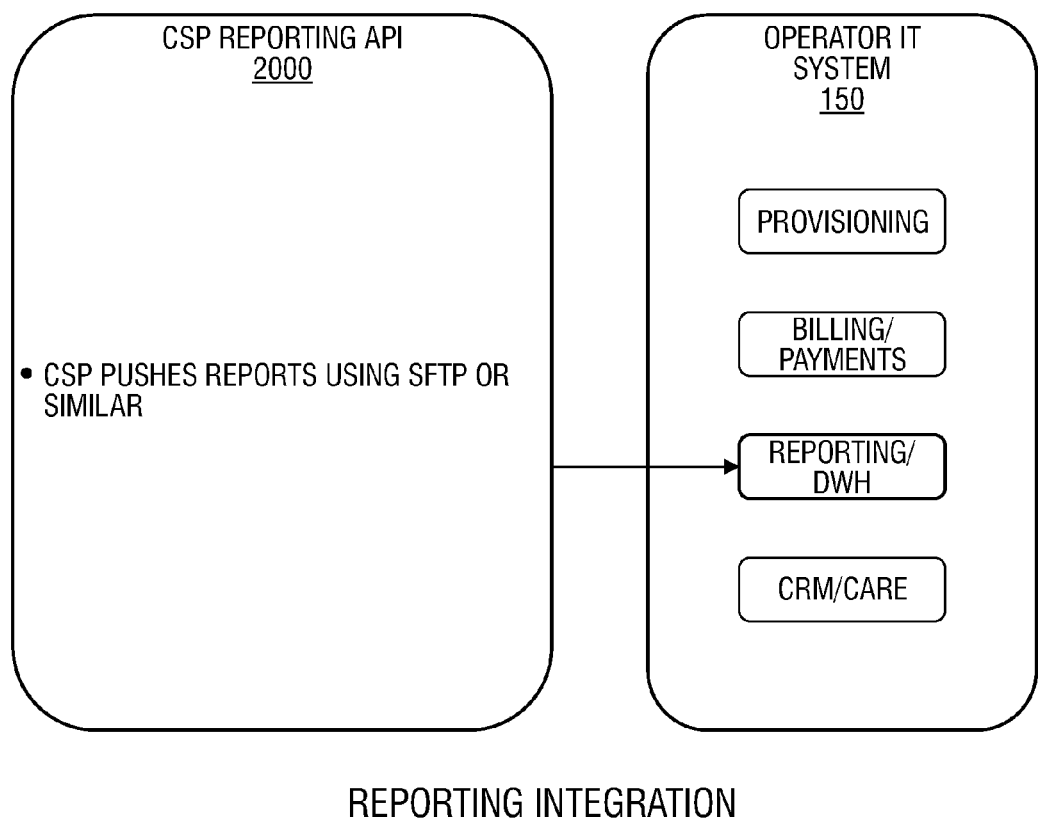
FIG. 20 is an embodiment of reporting integration.

FIG. 20 is an overview of data warehouse integration according to one embodiment of the invention. Referring also to FIG. 6, CSP system 530 of FIG. 6 includes a CSP reporting API 2000, which interacts with operator IT system 150 to manage data warehouse. In one embodiment, through CSP reporting API 2000, CSP system 530 can push reports to operator IT system 150 using a sFTP interface or a similar interface. The sFTP interface can be over the Internet. In some embodiments, a Virtual Private Network (VPN) can be used for additional security.

In some embodiments, CSP system 530 provides over twenty reports for use by an operator, such as daily subscriber report, usage detail reports, reports on charges of all kinds, and the like. Reports can be generated daily and/or monthly, and delivered to the operator.

Thus, a method, system and apparatus for a Core Service Platform (CSP) has been described. It is to be understood that the techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Provisioning of Subscriber Identifications to Wireless Terminals in Wireless Networks A system and method for provisioning a subscriber identification to a wireless terminal in a wireless network is disclosed. A control center (in which one or more control servers are located) receives transmission from a wireless network. The transmission indicates that a wireless terminal is roaming outside its home network. The control center provisions a new subscriber identification to the wireless terminal, where the subscriber identification is selected based at least in part on the identification of the visited wireless network in which the wireless terminal is roaming and a server database that provides prescribed subscriber identification(s) for a given visited network. Using the newly-provisioned subscriber identification, the wireless terminal acquires wireless service from the serving wireless network as a local wireless terminal or as a different visiting wireless terminal based on the server's prescription of subscriber identity for the particular visited network. The wireless terminal can operate as a local wireless terminal for that network, or for a network with which the home network of the new subscriber identity has a preferred relationship. The wireless terminal can acquire telecommunications service as a local or visiting terminal by using a stored set of authentication key-subscriber identification that is specific to the network it is operating in or the home network of the new subscriber identity. In various embodiments, the wireless terminal can operate as a local or visiting terminal by receiving or downloading a specific set of authentication key-subscriber identification, or by receiving or downloading a subscriber identification to pair with an existing authentication key.

Figure 21:
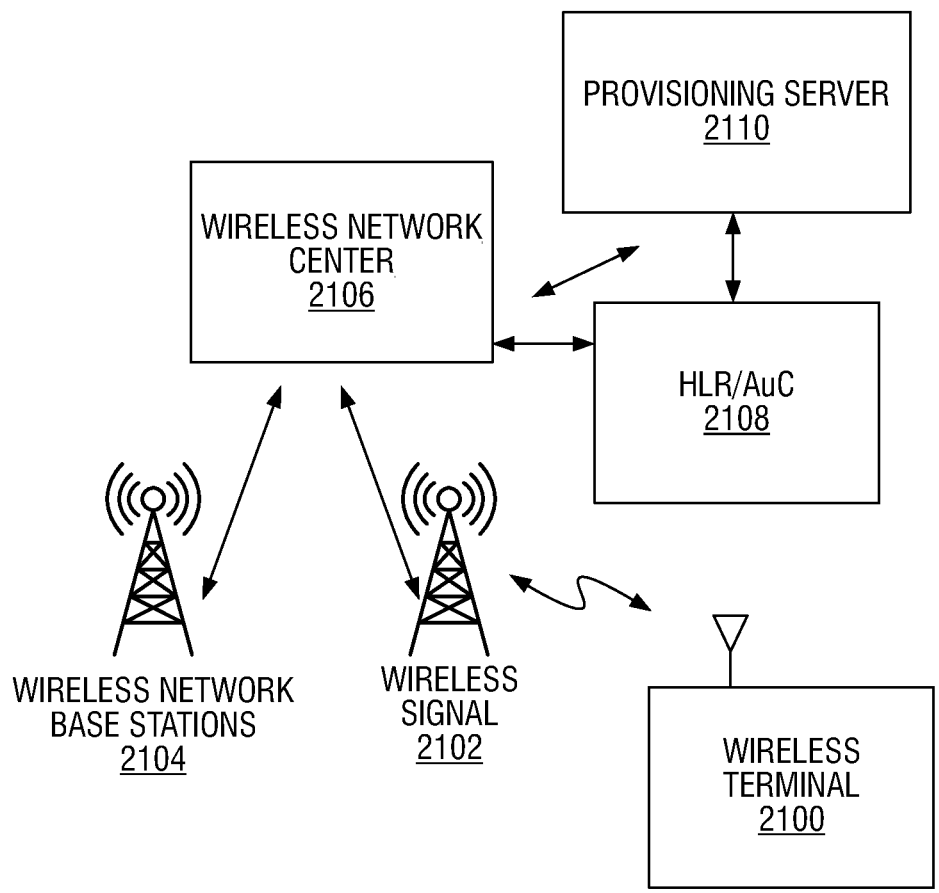
FIG. 21 illustrates an embodiment of a self-provisioning wireless system.

FIG. 21 illustrates an embodiment of a wireless system. In the example shown, the wireless system includes a plurality of wireless terminals, represented in FIG. 21 by wireless terminal 2100, a plurality of wireless network base stations, represented by wireless network base stations 2104, wireless network center 2106, Home Location Register/Authentication Center (HLR/AuC) 2108, and provisioning server 2110 capable of provisioning the wireless terminals. Although only one wireless network center 2106 is shown, it is understood that the wireless system can include multiple wireless network centers 2106. Each wireless network center 2106 includes, or is associated with, a HLR, a Mobile Switching CenterNisitor Location Register (MSC/VLR), a Short Message Service Center (SMSC), and a Serving GPRS Service Node (SGSN), or Packet Data Serving Node (PDSN). In one embodiment, the multiple wireless centers 2106 may be operated by different network carriers, while HLR/AuC 2108 and provisioning server 2110 are operated by a global platform provider i.e., a control center. Wireless terminal 2100 includes a Subscriber Identity Module (SIM) which is either an attachable hardware card with a memory and a processor or a software object embedded in the wireless terminal. Wireless terminal 2100 communicates with wireless network base stations 2104 using wireless signal 2102. As a wireless terminal moves around it communicates with different wireless base stations. Wireless network base stations 2104 communicate with wireless network center 2106.

Communications from a wireless terminal are passed to another wireless terminal over the same wireless network using a local wireless network base station to the other wireless terminal or the communications are carried by a wired network or other wireless network to the destination terminal. Wireless network center 2106 communicates with its associated HLR, where sets of authentication key-subscriber identification are stored, to help in authenticating a wireless terminal that is acquiring wireless network service. One example of a subscriber identification is an international mobile subscriber identifier (IMSI). Wireless network center 106 and its associated HLR communicate with provisioning server 2110 to enable a wireless terminal to acquire a new subscriber identification over the air (OTA) that is paired with an existing authentication key and/or a new set of authentication key-subscriber identification. In some embodiments the transmission of the authentication key or the authentication key-subscriber identification is encrypted. In various embodiments, the authentication key or the authentication key-subscriber identification is/are decrypted at the wireless terminal and/or in the SIM card. The old authentication key-new subscriber identification pair and/or the new set of authentication key-subscriber identification are added in the appropriate manner to the HLR/AuC 108 databases or the HLR databases associated with wireless network centers 2106 so that the wireless terminal can be authenticated and can acquire wireless network service using the new subscriber identification and/or authentication key set. In various embodiments, the wireless network system is a cellular system, a GSM/GPRS wireless system, a CDMA or WCDMA wireless system, or a TDMA wireless system, or any other type of wireless network system.

Figure 22A:
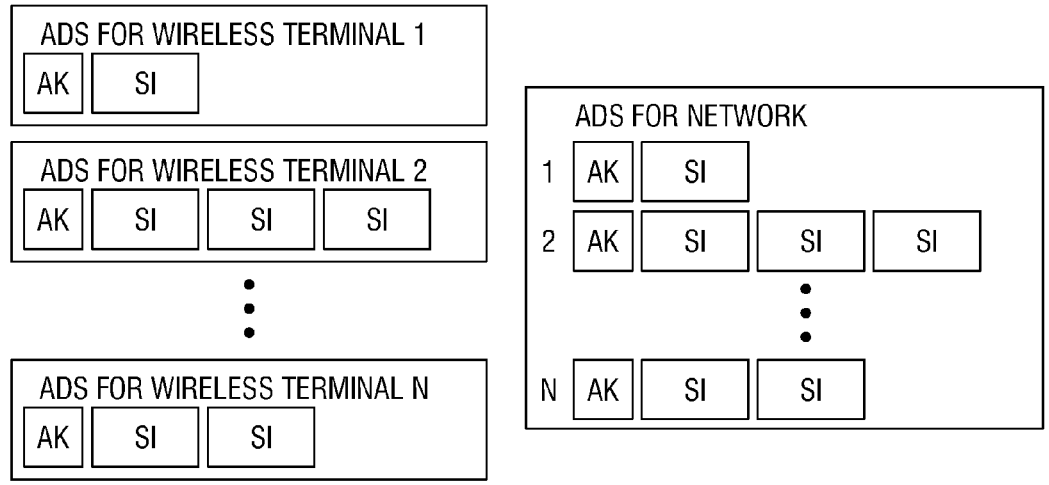
FIG. 22A illustrates an example of authentication data structures in one embodiment.

FIG. 22A illustrates an example of authentication data structures in one embodiment. In some embodiments, the authentication data structure for a wireless terminal is located in the SIM, and for the network in the HLR/AuC such as HLR/Auc 2108 of FIG. 21 or the HLR associated with wireless network centers 2106. An authentication data structure (ADS) for a wireless terminal includes an authentication key (AK) and one or more subscriber identifications (SI) and is used to help authenticate a wireless terminal for a wireless network. In the example shown, the ADS for wireless terminal 1 includes one authentication key and one subscriber identification. The ADS for wireless terminal 2 includes one authentication key and three subscriber identifications. The ADS for wireless terminal N includes one authentication key and two subscriber identifications. The ADS for network includes the authentication key-subscriber identification entries for each of the wireless terminals. Entries for wireless terminal 1, 2, and N are shown. In some embodiments, there are more than one authentication keys where each authentication key has multiple subscriber identifications.

Figure 22B:
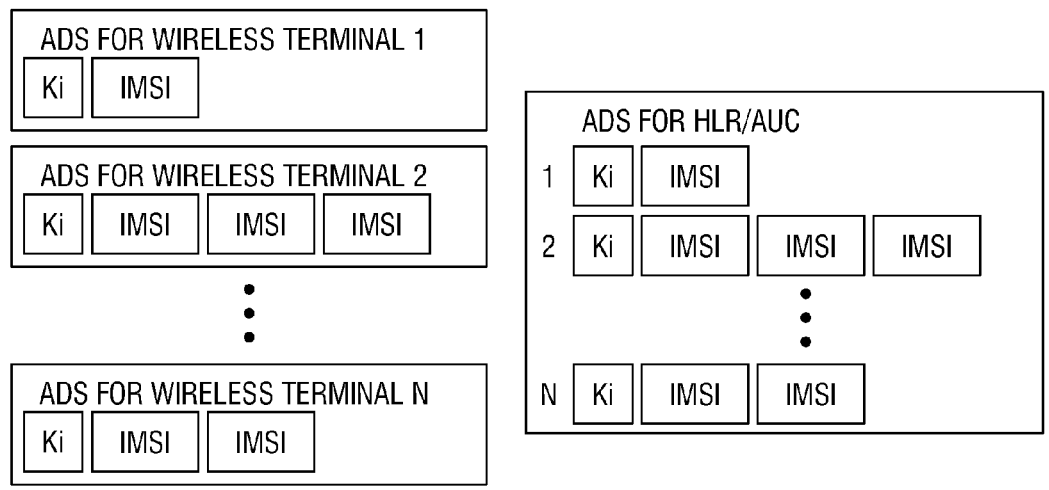
FIG. 22B illustrates an example of authentication data structures in another embodiment.

FIG. 22B illustrates an example of authentication data structures in another embodiment. Authentication data structure (ADS) for a wireless terminal includes a Ki and one or more IMSI's. In the example shown, the ADS for wireless terminal 1 includes one Ki and one IMSI. The ADS for wireless terminal 2 includes one Ki and three IMSI's. The ADS for wireless terminal N includes one Ki and two IMSI's. The ADS for HLR/AuC includes the Ki-IMSI entries for each of the wireless terminals. Entries for wireless terminal 1, 2, and N are shown.

Figure 23:
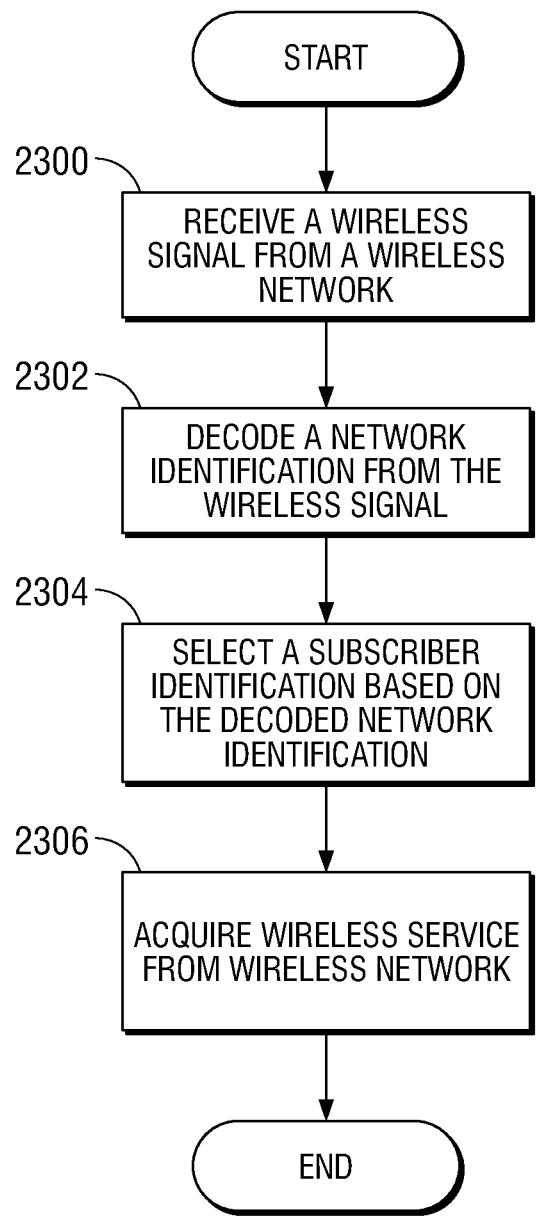
FIG. 23 is a flow diagram illustrating an embodiment of a process for acquiring wireless service from a wireless network.

FIG. 23 is a flow diagram illustrating an embodiment of a process for acquiring wireless service from a wireless network. In some embodiments, the process of FIG. 23 is implemented on a wireless terminal such as wireless terminal 2100 in FIG. 21. In the example shown, in 2300 a wireless signal is received from a wireless network. A wireless terminal receives wireless signals from a nearby network base station. In 2302, a network identification is decoded from the wireless signal. The wireless signal includes a mobile network identification. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. In 2304, a subscriber identification is selected based on the decoded network identification. For example, LAI information can be matched with the subscriber identification of the wireless terminal, which includes a mobile country code, a mobile network code, and a mobile subscriber identification number. In various embodiments, the LAI mobile country code and subscriber identification mobile country code are matched or the LAI mobile network code and the subscriber identification mobile network code are matched. In various embodiments, the selection of a subscriber identification is based at least in part on the pricing of different wireless networks, the billed account for that connection, a billed account for the wireless service, the application that will use the connection, an application using the wireless service (for example, one subscriber identification for data communication and a different subscriber identification for voice communication) or any other appropriate criteria for selecting a subscriber identification. In 306, wireless service is acquired from the wireless network.

Figure 24A:
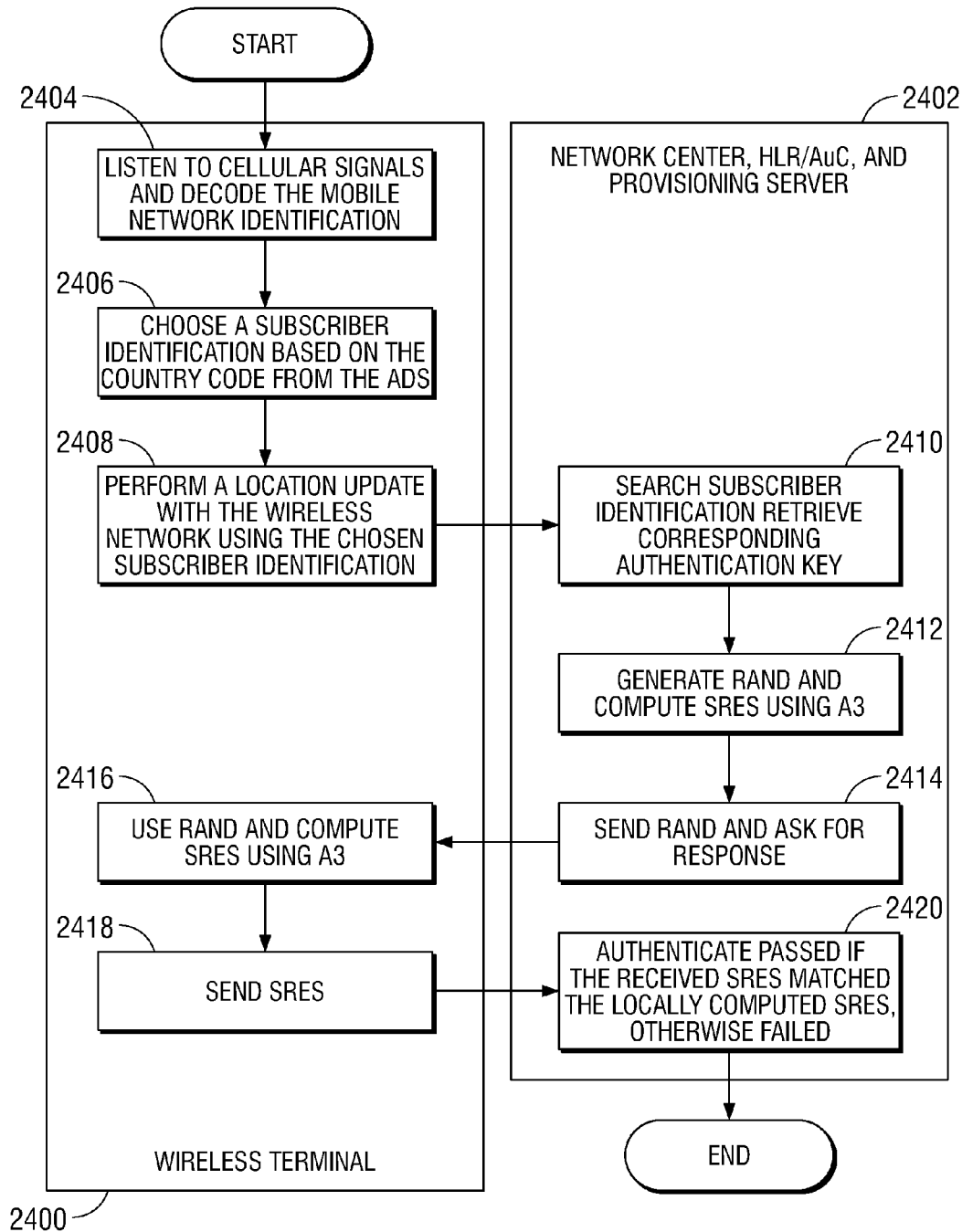
FIG. 24A illustrates an embodiment of a process for provisioning or authentication of a wireless terminal in a network system.
Figure 24B:
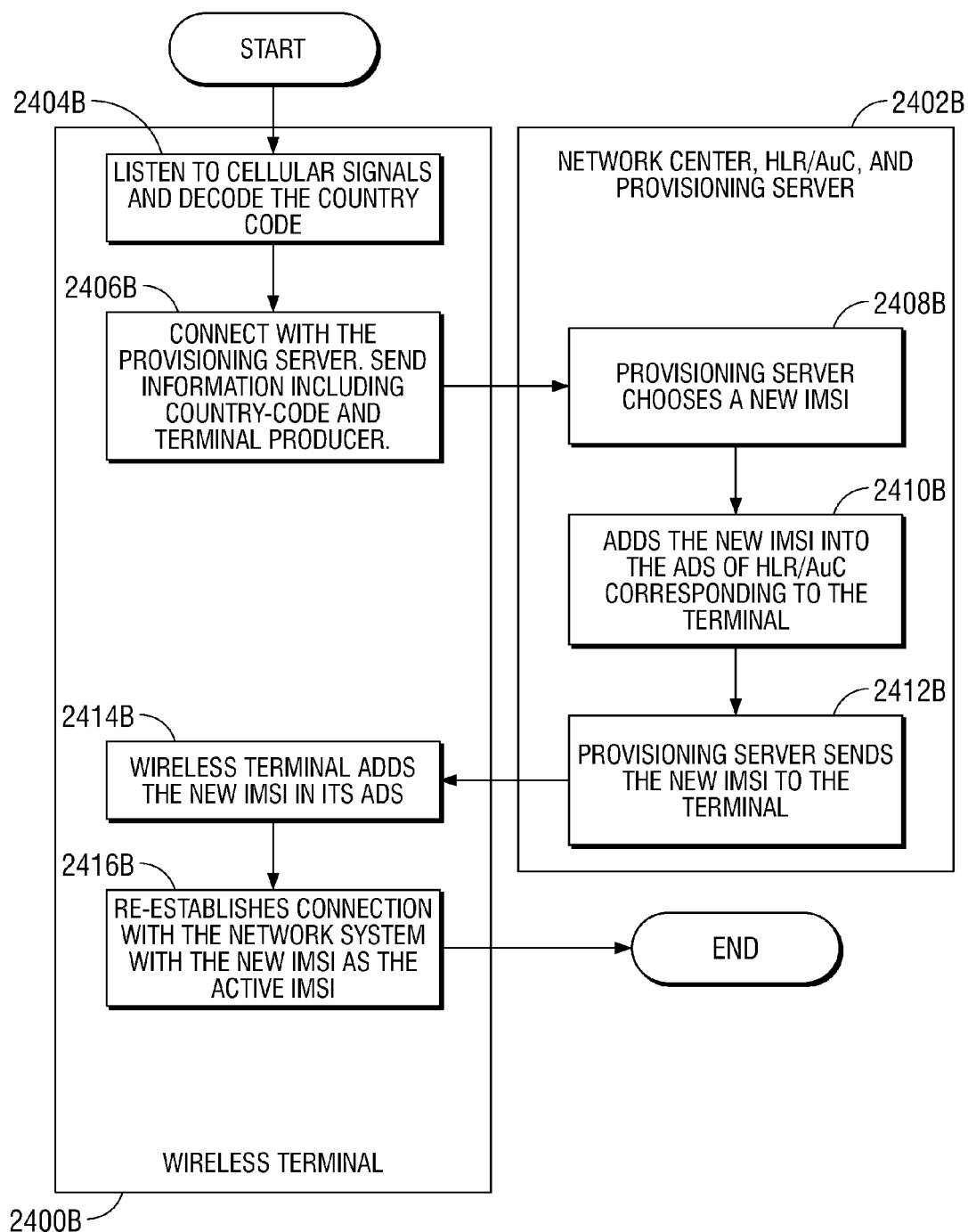
FIG. 24B illustrates another embodiment of a process for provisioning or authentication of a wireless terminal in a network system.

FIG. 24A illustrates an embodiment of a process for provisioning subscriber identification to a wireless terminal in a network system. Referring also to FIG. 21, in the example shown, wireless terminal 2100 receives information from and transmits information to wireless network center 2106 (and its associated HLR), HLR/AuC 2108, and provisioning server 2110 using wireless signals 2102. As shown in FIGS. 24A and 24B, wireless network center 2106 (and its associated HLR), HLR/AuC 2108, and provisioning server 2110 are collectively identified by numeral 2402. In 2404, wireless terminal 2100 listens to wireless signals 2102 transmitted from network base stations 2104 and decodes the mobile network identification from the transmitted information. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. The wireless terminal receives a set of Subscriber Identification from network center, HLR/AuC, and provisioning server 2402 and stores in its ADS. In 2406, the wireless terminal chooses a Subscriber Identification with the same country code from its ADS. For example, the Subscriber Identification is composed of a mobile country code, a mobile network code, and mobile subscriber identification number. The codes in the Subscriber Identification can be used to match a Subscriber Identification to the local network and/or country. The rest of the Subscriber Identifications stored in the wireless terminal's ADS may be made inactive for the duration of the session.

In 2408, the wireless terminal performs a location update with the visited wireless network using the new Subscriber Identification. In 2410, the network center, HLR/AuC, and provisioning server 2402 searches for the Subscriber Identification in its ADS and retrieves the corresponding Authentication Key. In 2412, a challenge is generated (RAND) and with the Authentication Key is used to calculate a Response (SRES) using an authentication algorithm (A3). In 2414, the RAND is sent to the wireless terminal and a response is requested. In 2416, the wireless terminal uses the RAND with the Authentication Key from its ADS to independently calculate a SRES using encryption algorithm (A3) stored in its SIM. In 2418, the SRES is sent to the network center and/or HLR/AuC and/or provisioning server 2402. In 2420, authentication is passed if the received SRES matches the locally computed SRES, otherwise the authentication fails.

FIG. 24B illustrates another embodiment of a process for provisioning subscriber identification to a wireless terminal in a network system. In some cases, the wireless terminal will not contain an IMSI that matches the country code of the local network system. The wireless terminal can connect to the network using an IMSI with another country code and then receiving or downloading a local IMSI (i.e. with a matching country code) or a new visiting IMSI. In the example shown, wireless terminal 2400B receives information from and transmits information to the network center and on to the HLR/AuC of the home network of the currently active IMSI using cellular signals. The home network HLR/AuC transmits the network registration information of the roaming subscriber to the provisioning server 2402B. In 2404B, wireless terminal 2400B listens to cellular signals transmitted from network towers and decodes the country code from the transmitted information. In 2406B, wireless terminal 2400B communicates with the HLR/AuC of the home network of the currently active IMSI and is authenticated. The home network HLR/AuC transmits the network registration information of the roaming subscriber to the provisioning server transmitting information including a visited country/network code and a terminal producer. In 2408B, the provisioning server chooses a new IMSI with a local country/network code or other new country/network code. In 2410B, the new IMSI is added to the ADS of the HLR/AuC (or the HLR associated with the network system) by the provisioning server corresponding to the wireless terminal (i.e. paired with the wireless terminal's Ki). In 2412B, the provisioning server sends the new IMSI to wireless terminal 2400B; OTA e.g., via a SMSC. In 2414B, wireless terminal 2400B adds the new IMSI to its ADS. In 2416B, wireless terminal 2400 reestablishes its connection with the network system with the new IMSI as the active IMSI. In some embodiments, depending on the information transmitted (i.e. IMSI range or type of wireless terminal), communication may be established between the wireless terminal and a specific application server (i.e., a global platform provider's provisioning server or another server). In some embodiments, this communication with a specific application server is encrypted.

Figure 25:
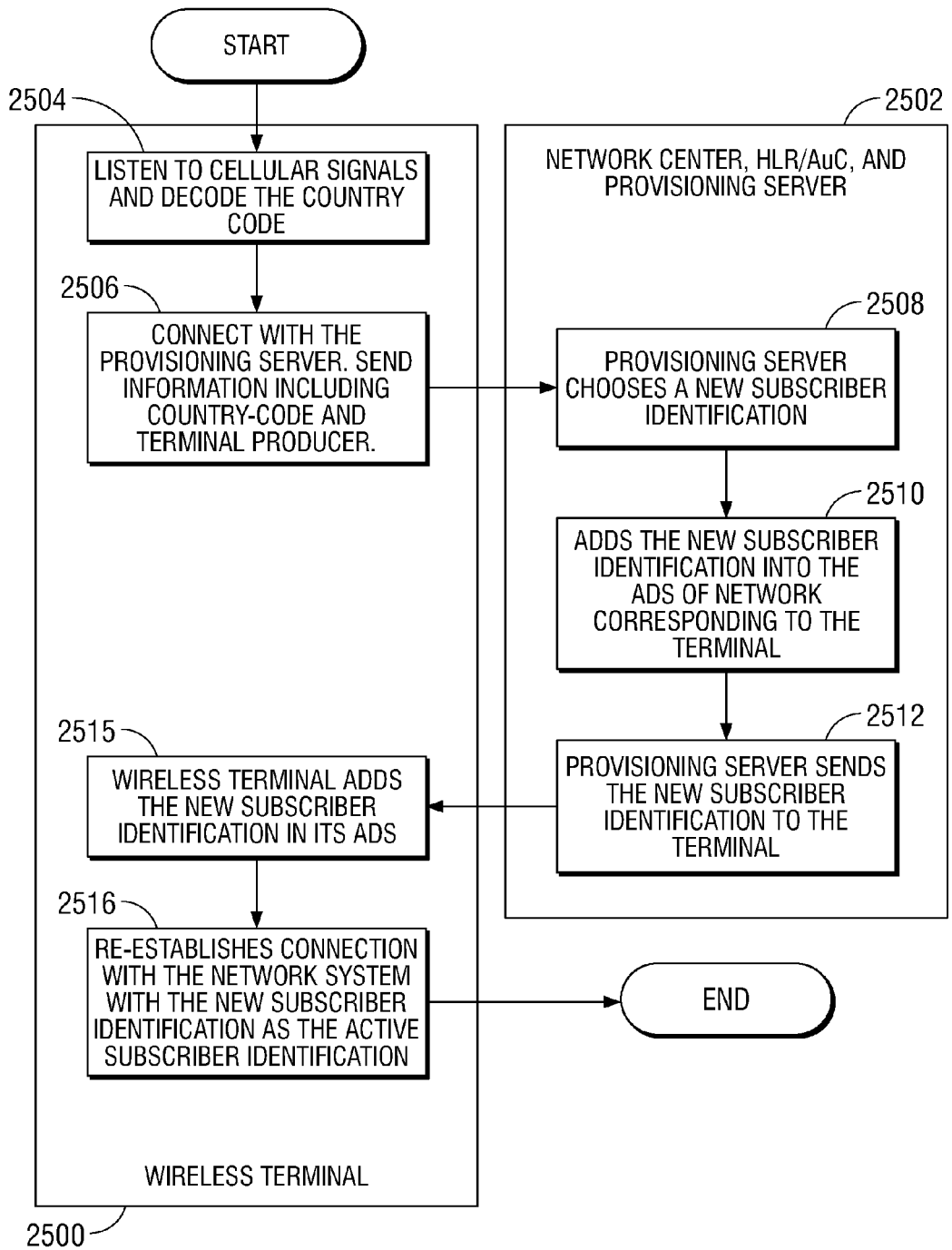
FIG. 25 illustrates an embodiment of a process for self-provisioning or authentication, of a wireless terminal in a network system.

FIG. 25 illustrates an embodiment of a process for provisioning subscriber identification to a wireless terminal in a network system. In some embodiments, the wireless terminal will not contain a Subscriber Identification that matches the network code and/or country code of the local network system. The wireless terminal can connect to the network using a Subscriber Identification with another network/country code and then receiving downloading a local Subscriber Identification (i.e. with a matching country code) or a new visiting Subscriber Identification. Referring also to FIGS. 21 and 24A, in the example shown, wireless terminal 2100 receives information from and transmits information to network center 2106 (and its associated HLR) and on to HLR/AuC 2108 of the home network of the currently active Subscriber Identification. The home network HLR/AuC transmits the network registration information of the roaming subscriber to provisioning server 2110. In 2504, wireless terminal 2100 listens to wireless signals transmitted from network base stations 2104 and decodes the mobile network identification from the transmitted information similar to 2404 of FIG. 24A. In 2506, wireless terminal 2100 communicates with the HLR/AuC of the home network of the currently active Subscriber Identification and is authenticated, using a process similar to 2408-2420 of FIG. 24A, with the provisioning server 2110 transmitting information including a visited country/network code and a terminal producer. In 2508, the provisioning server 2110 chooses a new Subscriber Identification with a local country code and/or network code, or a new visiting Subscriber Identity. In 2510, the new Subscriber Identification is added to the ADS of the HLR/AuC 2108 or the HLR associated with the visited network corresponding to the wireless terminal (i.e. paired with the wireless terminal's Authentication Key). In 2512, the provisioning server 2110 sends the new Subscriber Identification to wireless terminal 2500; OTA e.g., via a SMSC. In 2515, wireless terminal 2100 adds the new Subscriber Identification to its ADS. In 2516, wireless terminal 2100 reestablishes its connection with the network system with the new Subscriber Identification as the active Subscriber Identification. In some embodiments, depending on the information transmitted (e.g., subscriber identification range or type of wireless terminal), communication may be established between the wireless terminal and a specific application server (e.g., a global platform provider's provisioning server or another server). In some embodiments, this communication with a specific application server is encrypted.

Figure 26:
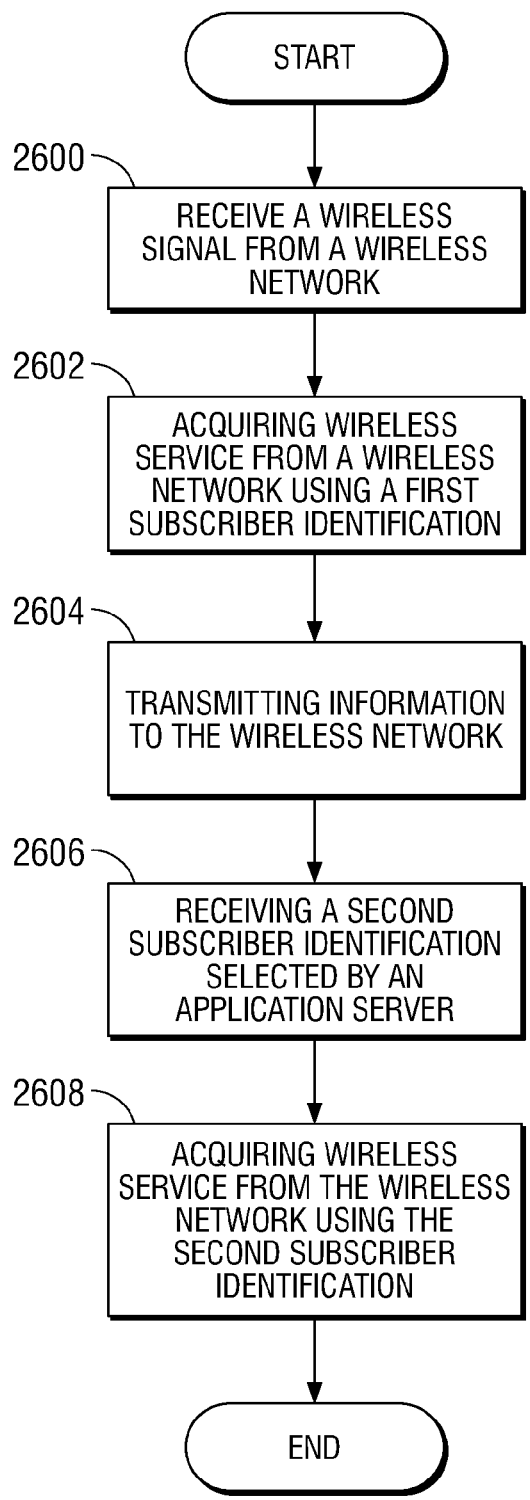
FIG. 26 is a flow diagram illustrating an embodiment of a process for acquiring wireless service from a wireless network.

FIG. 26 is a flow diagram illustrating an embodiment of a process for acquiring wireless service from a wireless network. In the example shown, in 2600 a wireless signal is received from a wireless network. In 2602, wireless service is acquired from the wireless network using a first subscriber identification. In 2604, information is transmitted to the wireless network. In 2606, a second subscriber identification, which is selected by an application server (or provisioning server 2110 of FIG. 21), is received. The second subscriber identification is selected based at least in part on one or more of the following: the wireless network, the wireless network identification, the base station that the wireless terminal is communicating with, the local country associated with the network, or any other appropriate criteria for selecting a subscriber identification. In various embodiments, the first subscriber identification and the second subscriber identification are both paired with a single authentication key or the first subscriber identification is paired with a first authentication key and the second subscriber identification is paired with a second authentication key. In some embodiments, a second authentication key is received. In various embodiments, the subscriber identification and/or the authentication key are received after having been encrypted and need to be decrypted after having been received. In some embodiments, the subscriber identification is encrypted and decrypted using an authentication key. In various embodiments, a subscriber identification and/or a authentication key is encrypted in an application server, in a provisioning server, in a wireless network server, or in a combination of an application/provisioning server and a wireless network server, or in any other appropriate place for the encryption. In various embodiments, a subscriber identification and/or an authentication key is decrypted in a wireless terminal, in a SIM card, or in a combination of the SIM card and the wireless terminal, or in any other appropriate place for the decryption. In some embodiments, authentication information is received—for example, a random number that has been encrypted using an authentication key, a subscriber identification that has been encrypted using an authentication key, or other information that has been encrypted using an authentication key or other appropriate key. In 2608, wireless service is acquired from the wireless network using the second subscriber identification.

Wireless Communication Provisioning Using State Transition or Allocation Rules

Wireless communication provisioning using state transition or allocation rules associated with an identifier is disclosed. A first state associated with one or more identifiers is defined. A second state associated with one or more identifiers is defined. A state transition or allocation rule is defined between the first and second states. In some embodiments, the one or more identifiers are stored in a subscriber identity module (SIM). In some embodiments, the one or more identifiers are IMSIs. In some embodiments, a plurality of states are defined, a plurality of state transition or allocation rules are defined, and a group of states and transition/allocation rules are selected and associated with one or more identifiers. In some embodiments, wireless communications comprise mobile data, mobile cellular communications, or any other appropriate wireless communications.

In some embodiments, a customer organization defines a sequence of states for devices that communicate data with a global platform provider's application server via one or more wireless carrier networks. The provider (e.g., the global platform provider) enables the communication via the wireless carrier networks. The plurality of states enables the activity of provisioning of a customer device or provider device used in the data communication with appropriate billing, access, and/or authorization for each activity especially with regard to testing, activation, deactivation, etc.

Figure 27:
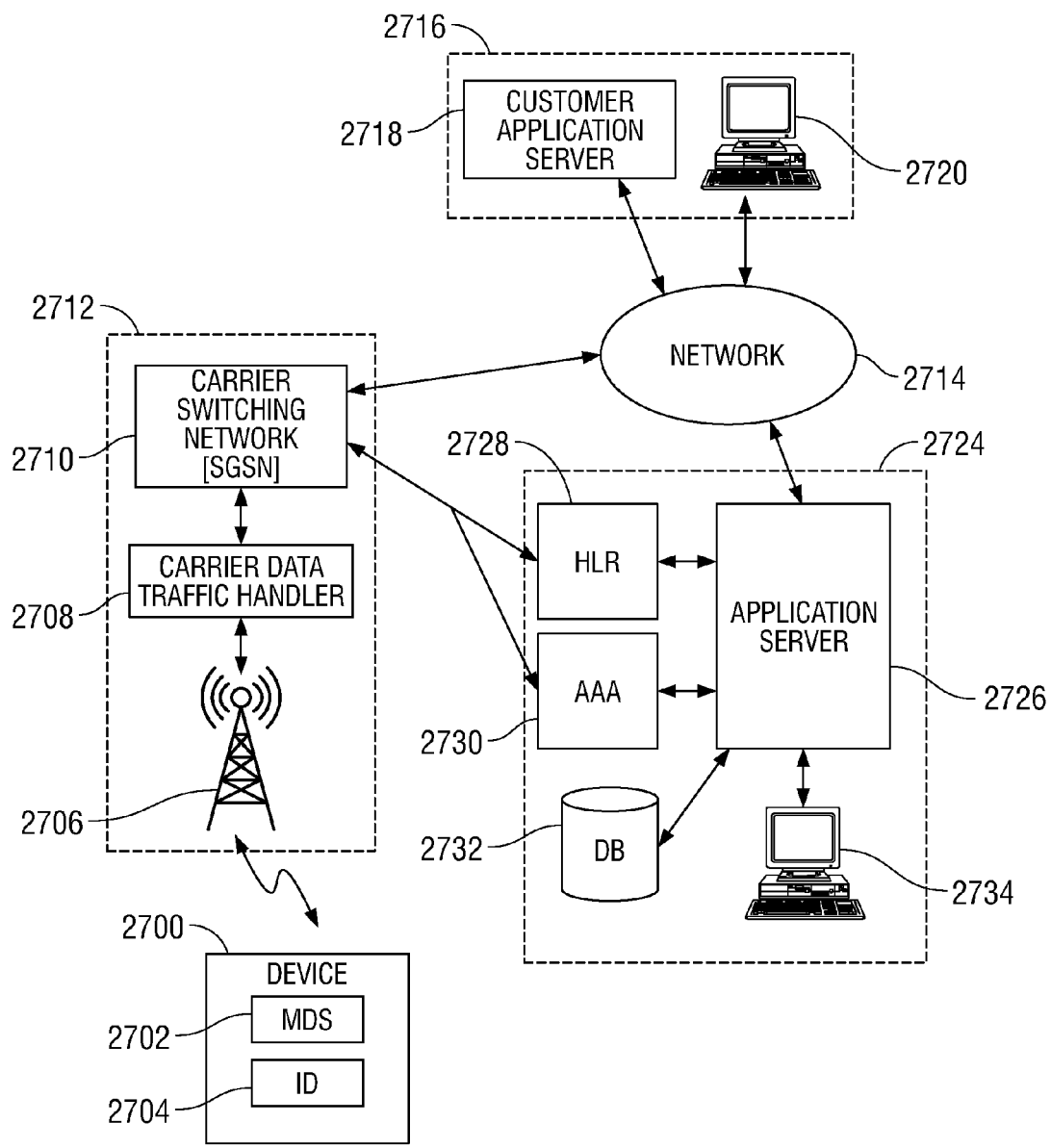
FIG. 27 illustrates a block diagram of an embodiment of a system for mobile data communication provisioning.

FIG. 27 illustrates a block diagram of an embodiment of a system for mobile data communication provisioning. In the example shown, device 2700 comprises a mobile device that communicates data. Device 2700 includes a mobile data service (MDS) 2702—for example, general packet radio service—and an identifier (ID) 2704—for example, a subscriber identifier (such as IMSI). Data can be transmitted and received by device 2700 using MDS 2702. Device 2700 is identified using ID 2704 and associated with a user or customer. Transmissions and receptions of data communicate with carrier network 2712, which is associated with MDS 2702. In various embodiments, the carrier network associated with MDS 2702 comprises a mobile carrier network, a cell phone network, a messaging network, wireless communication network, or any other appropriate network for communicating data to a mobile device.

Carrier network 2712 includes carrier switching network 2710 (e.g., SGSN—serving General Packet Radio Services (GPRS) support node—used in Global System for Mobile Communications (GSM) networks), carrier data traffic handler 2708 (e.g., GRX—a GPRS roaming exchange and/or SS7—signaling system 7 system), and a plurality of carrier towers—represented in FIG. 27 by tower 2706. Communications of data traffic to and from device 2700 are received by carrier network 2712 by a carrier tower, which communicates the data traffic with carrier data traffic handler 2708. Carrier data traffic handler 2708 communicates data traffic with carrier switching network 2710. Carrier switching network 2710 can communicate with network 2714, and Authentication Center/Home Location Register (HLR) 2728 and Authentication, Authorization, and Accounting (AAA) Server (e.g., a Radius server) 2730 of provider system 2724. In one embodiment, provider system 2724 is operated by a global platform provider as a control center.

Network 2714 enables communication with customer system 2716, which includes customer application server 2718 and customer administrator 2720. In some embodiments, network 2714 comprises the internet, a local area network, a wide area network, a wired network, a wireless network, or any other appropriate network or networks for communicating with customer system 2716. Customer application server 2718 receives data from and transmits data to device 2700 regarding the customer's services or products. In various embodiments, the customer's services includes transaction related services, monitoring services, and/or location tracking services. In some embodiments, a state transition rule or allocation defining transition from one provisioning state to another provisioning state associated with device 2700 is implemented on customer application server 2718. In some embodiments, a state transition or allocation rule defining transition from one provisioning state to another provisioning state associated with device 2700 is not known to device 2700.

Provider system 2724 includes HLR 2728, AAA server 2730, application server 2726, database (DB) 2732, administrator 2734. In an embodiment where the provider system 2724 is the control center of a global platform provider, application server 2726 can perform the function of a provisioning server, such as provisioning server 2110 of FIG. 21, in addition to other functions. Provider system 2724 enables customer services by enabling data communication services via the carrier network with device 2700. HLR 2728 enables communication with the provider system by indicating if device 2700 is allowed to have data communication through carrier network 2712 with customer system 2716. AAA server 2730 enables specific permissions that are available regarding data communications between device 2700 and customer system 2716 via carrier network 2712. Application server 2726 enables provisioning and billing for the provider. Provisioning comprises enabling devices such as device 2700 to have mobile data communication services using a mobile carrier network. DB 2732 includes information related to provisioning and billing for the provider. Administrator 2734 administrates provider system. Customer system administrator 2720 communicates with provider application server 2726 to administrate customer system usage, billing, provisioning for data communication service of carrier network 2712 enable by provider 2724. In some embodiments, functionality of HLR 2728 and AAA server 2730 are performed by the same server, are partitioned between two servers but not exactly as described herein, or any other server configuration to achieve the same functionality.

Figure 28:
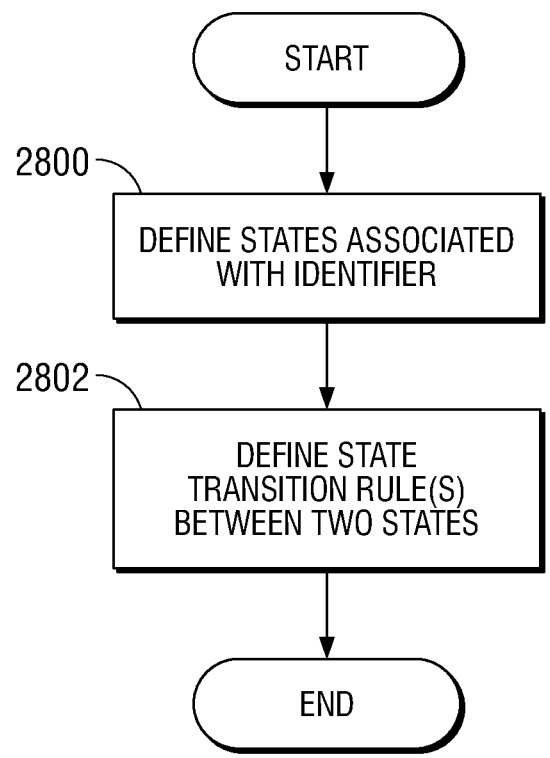
FIG. 28 is a flow diagram illustrating an embodiment of a process for mobile data communication provisioning.

FIG. 28 is a flow diagram illustrating an embodiment of a process for mobile data communication provisioning. In some embodiments, the process of FIG. 28 helps provision device 2700 of FIG. 27 such that mobile data and/or wireless communications is available via carrier network 2712 to customer system 2716. In the example shown, in 2800 states associated with one or more identifiers are defined. States that are associated with one or more identifiers can include test ready, inventory, activation ready, activated, deactivated, retired, return merchandise authorization (RMA), suspend, fraud review, purged, and/or any other appropriate states. In various embodiments, the identifier can be an International Circuit Card Identifier (ICCID), an international mobile subscriber identifier (IMSI), a customer identifier, a user identifier, or a device identifier. In various embodiments, the one or more identifiers comprises an identifier associated with a user, a customer, a company, an organization, etc. or a group of identifiers associated with a user, a customer, a company, an organization, etc.

In some embodiments, one or more states are based on the lifecycle of the service of a wireless communication device.

A test ready state can be used to allow a manufacturer to test a SIM, or a device with a SIM, and its network communication infrastructure before delivering the SIM, or device with a SIM, to an end user, a retail location, or a distributor. A test ready state can be a default state for a SIM that allows authentication and authorization with a global platform provider's HLR and AAA server, but does not have any billing associated with it. A SIM in a test ready state is able to conditionally transact data, voice, and/or Short Message Service (SMS) communications—for example, some limits may be placed on the communications while in this state such as: communication may occur up to a maximum data transmitted/received amount or up to a maximum number of days since the initial data communication. A test ready state may have no prerequisite state, have no limitation to a next state (e.g., all states allowed as next state), have no exclusivity rule, be a required state, and be allowed to have automatic and/or manual transitions.

An inventory state can be used to allow a SIM to be placed in a device and associated with an identifier of the device (e.g., a terminal identifier or a point of sale terminal identifier). An inventory state cannot coexist with an activation ready state. An inventory state cannot connect with the network and requires a manual change in order to change state. An inventory state may have a test ready state as a prerequisite, have no limitation to a next state (e.g., all states allowed as next state), have an exclusivity rule in that it cannot coexist with an activation ready state, not be a required state, and be allowed only to have manual transitions.

An activation ready state can be used to allow a SIM to be ready to be activated. An activation ready state will authenticate and authorize with the HLR and AAA server of the provider system, but no billing will occur. After the first data communication (e.g., first packet data protocol (PDP) context communication), the SIM state may automatically change to an activated state. An activation ready state may have a test ready state or inventory state as a prerequisite, have no limitation to a next state (e.g., all states allowed as next state), have an exclusivity rule in that it cannot coexist with an inventory state, not be a required state, and be allowed to have an automatic transition to an activated state or a manual transition to other states.

An activated state can be used to allow a SIM, or a device with a SIM, to be used by a user. In an activated state the SIM will authenticate and authorize on the HLR and AAA server of the provider system. Billing commences immediately on changing to this state. The provider system may check to make sure that the proper information is contained on the provider system's HLR and AAA server databases as well as the billing databases. In some cases, the checks will include checking the identifiers stored in the SIM (e.g., international mobile subscriber identifier (IMSI), customer identifier, device identifier, etc.). An activated state may have a test ready state, inventory, or activation ready state as a prerequisite, have possible next states of deactivated, purged, or retired, have no exclusivity rule, not be a required state, and be only allowed to have a manual transition to a next state.

A deactivated state can be used to allow a SIM, or a device with a SIM, to be deactivated by the user. In a deactivated state the SIM will not be allowed to authenticate and will not be billed. The AAA server of the provider system and the gateway GPRS support node (GGSN) of carrier networks will be sent a notification (e.g., a packet) informing them that the SIM has been deactivated. A deactivated state may have an activated state as a prerequisite, have possible next states of activated, purged, or retired, have no exclusivity rule, not be a required state, and be only allowed to have a manual transition to a next state.

A retired state can be used to allow a SIM, or a device with a SIM, to be retired by the provider or the user. In a retired state the SIM will not be allowed to authenticate and billing ends. A retired state may have any state as a prerequisite except purged, have any possible next states (i.e., all states possible), have no exclusivity rule, not be a required state, and be only allowed to have a manual transition to a next state.

A purged state can be used to allow a SIM, or a device with a SIM, to be purged by the provider. In a purged state the SIM will not be allowed to authenticate and the subscriber identification is removed from the system (e.g., IMSI permanently removed from the HLR of the provider system). A purged state may have any state as a prerequisite, have no possible next states, have no exclusivity rule, not be a required state, and be not allowed to have any transitions to a next state.

In some embodiments, a state is defined by a customer. In some embodiments, the state is defined using an Internet-based service.

In some embodiments, a state definition does not support communication sessions and a transition to that state will terminate existing open communication sessions.

In some embodiments, a first wireless communication provisioning state allows a communication device to pass traffic without incurring any billing charges, and an associated state transition rule allows an automated transition to a second provisioning state where the second provisioning state incurs billing charges. In some embodiments, a first wireless communication provisioning state allows a communication device to pass traffic without incurring any billing charges, and an associated state transition rule allows an automated transition to the second provisioning state, where the second provisioning state does not allow the communication device to pass traffic.

In 2802, state transition or allocation rule(s) between two states is/are defined. A transition from one state to another may occur automatically on a predetermined condition or manually. If the transition is based on a condition is met (e.g., upon first data communication—packet data protocol context established), the state will automatically change from one to another (e.g., activation ready state to activated state). In various embodiments, the transition condition is based on one or more of the following: a predetermined amount of elapsed time since a prior state transition, an amount of service usage above a predetermined amount of service usage, one or more service signalings, or any other appropriate condition. In various embodiments, the condition is based on an exclusivity rule, a state rule, a communication data transfer, or any other appropriate condition. A manual change from one state to another requires an intervention directly from the provider system—for example, an action through a manager portal, by uploading a file to the SIM or device with the SIM, or an application programming interface (API) call.

In various embodiments, a state transition or allocation rule can be defined for an individual device or a group of devices, or different rules can be defined for different individual devices or different groups of devices, or any other appropriate combination as appropriate for meeting the needs of a supplier of devices.

In some embodiments, a group of states are defined and a group of transition/allocation rules are defined, and then a selection of states and transition/allocation rules are associated with one or more identifiers.

In some embodiments, a customer selects a state transition/allocation rule. In some embodiments, a customer defines a state transition/allocation rule. In various embodiments, the state transition/allocation rule is selected and/or defined using an Internet-based service, using a local program interface, or any other appropriate manner of selecting and defining a state transition rule.

In some embodiments, a state transition/allocation rule when activated terminates existing communication sessions.

FIG. 29 is a block diagram illustrating an embodiment of a state definition. In some embodiments, a state is associated with an identifier—for example, a SIM, a device identifier (e.g., an international mobile equipment identifier), a vendor identifier, or any other appropriate identifier. In the example shown, a state definition includes state name, state description, required state flag, prerequisite state, allowed next state(s), exclusivity rule, and transition mode(s) available that describe conditions allowing transitions between states. For example, a test ready state has: a) a state name of test ready; b) a state description of SIM is able to tested in its operation with the network by a manufacturer in a limited manner without being billed; c) a required state flag indicating that the test ready state is required; d) there is no prerequisite state for the test ready state; e) allowed next states from test ready are inventory, activation ready, activated, retired, or purged; f) there is no exclusivity rule for the test ready state; and g) the transition modes available are automatic to either an inventory state or an activation ready state based on an exclusivity rule or manual change.

FIG. 30 illustrates an embodiment of a state transition/allocation rule definition. In various embodiments, a state transition/allocation rule definition is associated with a state associated with an identifier or an identifier. In the example shown, a state transition/allocation rule definition includes current state, transition condition, state transitioned to, and transition description. For example, a SIM can be manually changed from an inventory state to an activation ready state when the device that the SIM is in is deployed by selling the unit to a retail customer, by having a service provider place the unit in the field, or by any other appropriate manner. For another example, a SIM can be automatically changed from an activation ready state to an active state when a PDP context is established and data is communicated to and from the SIM, or device with the SIM in it.

Figure 31:
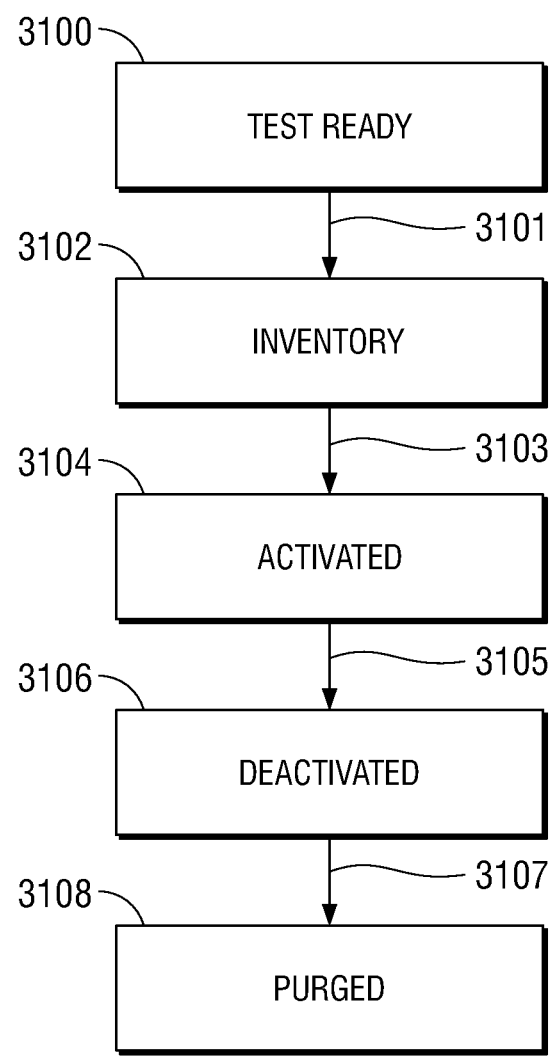
FIG. 31 is a flow diagram illustrating an embodiment of states of a channel sale model for provisioning and the transitions between the states.

FIG. 31 is a flow diagram illustrating an embodiment of states of a channel sale model for provisioning and the transitions between the states. In some embodiments, the starting default state of a SIM is the test ready state. In the example shown, in test ready state 3100 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 3100, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 3101. Transition 3101 from the test ready state is either a manually triggered transition or an automatically triggered based on a condition where the condition is the when the SIM has reached: 1) a maximum number of PDP sessions has occurred—for example, 10; 2) a maximum amount of data has been transmitted/received to and from the SIM/device via the carrier network—for example, 100 Kbytes; or 3) a maximum amount of time has elapsed since the first PDP context in this test ready state—for example, 90 days. When the transition is triggered, then the SIM switches to inventory state 3102.

In inventory state 3102, a device is waiting to be transferred to a user. In this state, no connectivity is enabled, and no billing occurs. The state is maintained until transition 3103. Transition 3103 occurs when the OEM or the customer or its channel service providers manually triggers a state change. When the state change is triggered, the SIM is changed to activated state 3104. In activated state 3104, a device is being used by user. In activated state 3104, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 3105 may be triggered manually or automatically. In various embodiments, transition 3105 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 3105 to a deactivated state 3106.

In deactivated state 3106, a device is finished being used as requested by an end user or by a customer system request by being in a deactivated state. In deactivated state 3106, the SIM is not able to connect and establish a PDP session. While in deactivated state 3106, there is no billing for connectivity. Transition 3107 can be triggered automatically (e.g., after a period of time) or manually (e.g., by the customer). When transition 3107 is triggered, the SIM changes state to purged state 3108. In purged state 3108, the SIM and the device the SIM is in, is removed from the system. In purged state 3108, the SIM is not able to connect and establish a PDP session. There is no billing associated with the trigger or the state. Accounting for the customer may remove the item from inventory or asset lists. Purged state 3108 automatically removes the IMSI and International Circuit Card Identifier (ICCID) from the HLR of the provider system.

Figure 32:
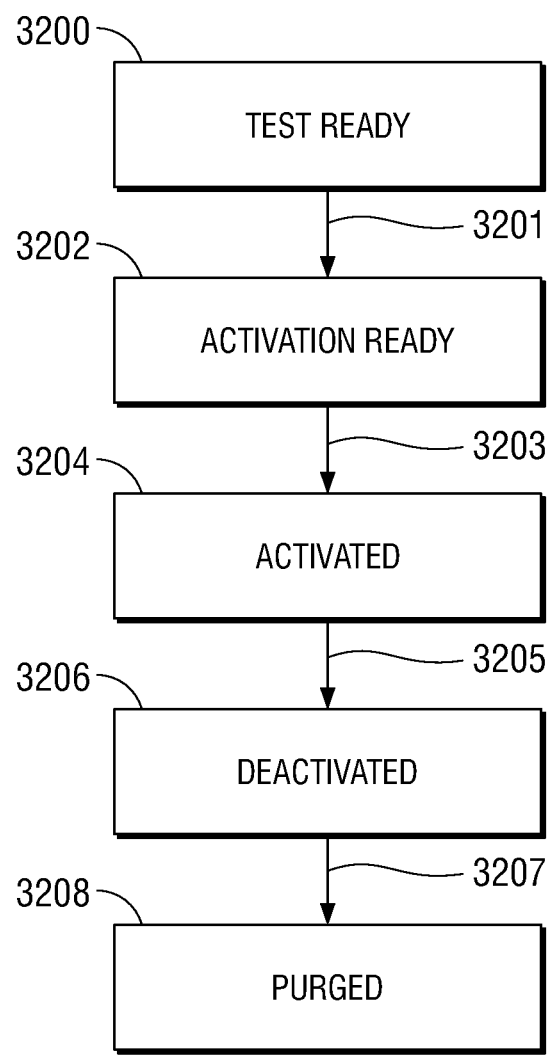
FIG. 32 is a flow diagram illustrating an embodiment of states of a retail sale model for provisioning and the transitions between the states.

FIG. 32 is a flow diagram illustrating an embodiment of states of a retail sale model for provisioning and the transitions between the states. The states and transitions in FIG. 32 are similar to the states and transitions in FIG. 31 except for the activation ready state. In some embodiments, the starting default state of a SIM is the test ready state. In the example shown, in test ready state 3200 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 3200, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 3201. Transition 3201 from the test ready state is either a manually triggered transition or an automatically triggered based on a condition where the condition is the when the SIM has reached: 1) a maximum number of PDP sessions has occurred—for example, 5; 2) a maximum amount of data has been transmitted/received to and from the SIM/device via the carrier network—for example, 1 Mbytes; or 3) a maximum amount of time has elapsed since the first PDP context in this test ready state—for example, 1 year. When the transition is triggered, then the SIM switches to activation ready state 3202.

In activation ready state 3202, a device is waiting to be transferred to a user. In various embodiments, the activation ready state is set after testing by the OEM when the device is being shipped from the OEM to retail locations, distribution partners, directly to end users, or when the SIM, or device with the SIM, is about to be in the end users hands but is not ready to have billing/service fully implemented. In this state, SIM connectivity is enabled, and a PDP session can be established. Upon the first PDP session occurring transition 3203 is triggered. When the state change is triggered, the SIM is changed to activated state 3204. In activated state 3204, a device is being used by user. In activated state 1204, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 3205 may be triggered manually or automatically. In various embodiments, transition 3205 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 3205 to a deactivated state 3206.

In deactivated state 3206, a device is finished being used as requested by an end user or by a customer system request by being in a deactivated state. In deactivated state 3206, the SIM is not able to connect and establish a PDP session. While in deactivated state 3206, there is no billing for connectivity. Transition 3207 can be triggered automatically (e.g., after a period of time) or manually (e.g., by the customer). When transition 3207 is triggered, the SIM changes state to purged state 3208. In purged state 3208, the SIM and the device the SIM is in, is removed from the system. In purged state 3208, the SIM is not able to connect and establish a PDP session. There is no billing associated with the trigger or the state. Accounting for the customer may remove the item from inventory or asset lists. Purged state 3208 automatically removes the IMSI and International Circuit Card Identifier (ICCID) from the HLR of the global platform provider system.

Figure 33:
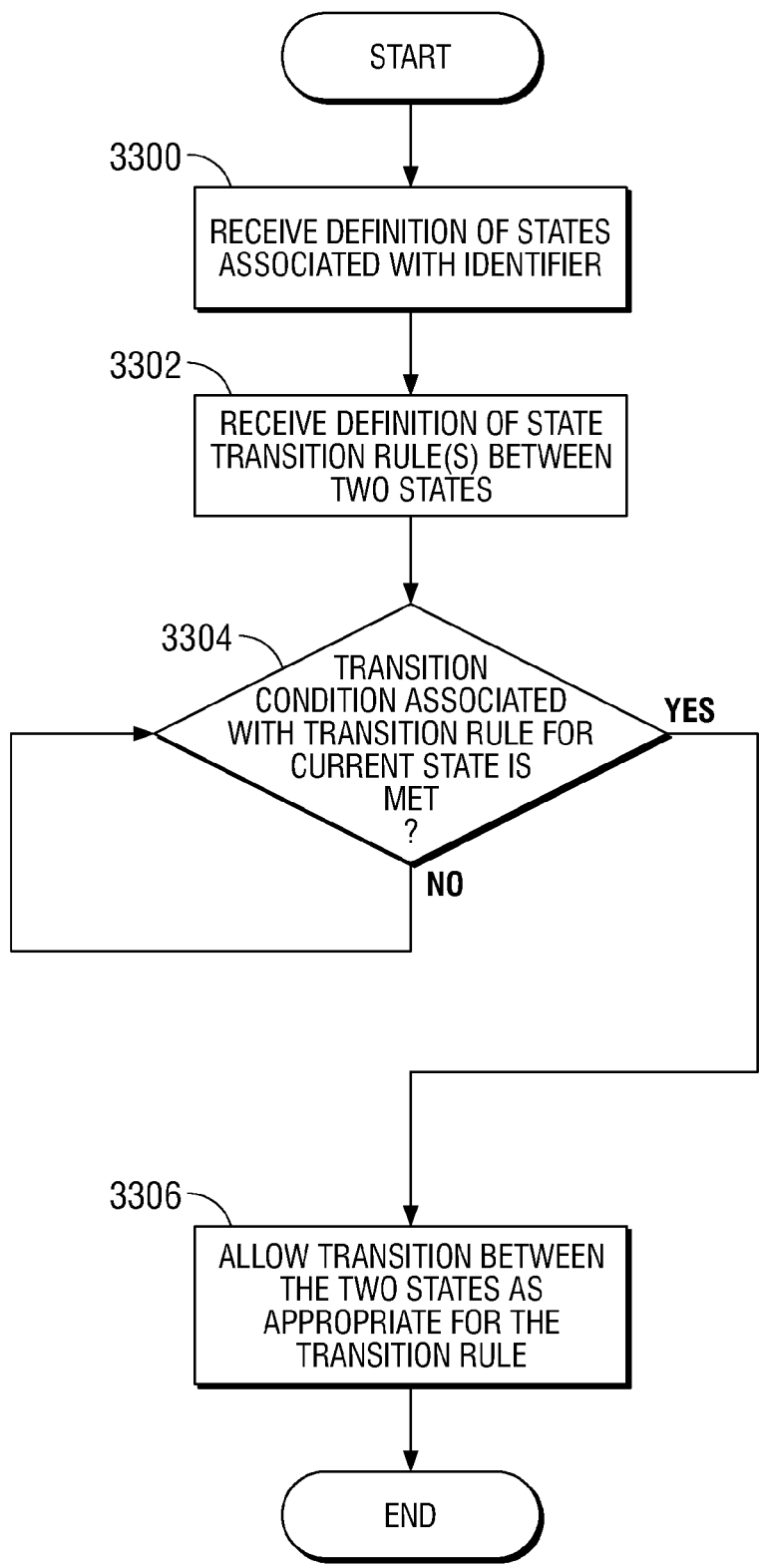
FIG. 33 is a flow diagram illustrating an embodiment of a process for provisioning wireless communication.

FIG. 33 is a flow diagram illustrating an embodiment of a process for provisioning wireless communication. In the example shown, in 3300 definitions for states associated with an identifier are received. In some embodiments, state definitions and/or selections are received using an internet-based application. In various embodiments, state definitions are the same or different for different identifiers. In various embodiments, a state for provisioning (e.g., a device) allows billing, allows communication sessions, allows activation, does not allow billing, does not allow communication sessions, does not allow activation, or any other appropriate action associated with a state. In 3302, definition(s) for state transition rule(s) between two states is/are received. In some embodiments, state transition rule/allocation definitions and/or selections are received using an internet-based application. In various embodiments, the transitions are automatic or manual and are triggered with a transition condition. In various embodiments, the automatic and/or manual transition conditions include an elapsed time from a prior state, prior transition, or prior specific/any communication, an absolute time, an absolute date, after a predetermined amount of traffic, before a predetermined level of traffic is reached, after communication with a specific location, number, device, service center, after sending a service indication, a system message, after receipt of a service message, condition, communication from a specific location, device, server, service center, or any other appropriate transition condition. In 3304, it is determined if a transition condition associated with a transition rule for current state is met. In the event that an appropriate transition condition has not been met, control stays with 3304. In the event that an appropriate transition condition is met, then in 3306 allow transition between the two states as appropriate for the transition rule. In some embodiment, the implementation of provisioning states, state transition rule enforcement, and evaluation of transition conditions takes place on a server that communicates with a wireless network and wireless device. In one embodiment, the server is located in, or otherwise operated by, a global platform provider's control center.

A Global Platform for Managing Subscriber Identity Modules

A global platform for managing subscriber identity modules (SIMs) of wireless devices is described. The global platform provides a business support system (BSS) and operational support system (OSS) for a wide range of network carriers that may be operating in different countries or continents. The global platform allows partner carriers to deliver wireless communication services to the customers in a seamless way to the customers regardless of their geographical locations. Through an alliance agreement that each partner carrier enters with the global platform provider, a mobile device purchased from one partner carrier can freely move to an area (e.g., country or continent) operated by another partner carrier while incurring minimal (if any) performance impacts and roaming charges.

As described herein a mobile device may be a cell phone, an eBook, an automobile with wireless tracking ability, a digital picture frame, a game console, a tablet computer, a laptop computer, or other portable wireless communication devices. Further, the customers described herein may be an end consumer, an organization or an enterprise that has an interest in the global deployment of network-connected devices. In a conventional wireless system, the operation of every network carrier is bound by the country. Thus, a device (e.g., an automobile) purchased in one country cannot be easily shipped to another country without incurring permanent roaming charges in that other country. Further, since the automobile is roaming in the other country, its data traffic will be routed through its home network for both inbound and outbound signals and data transmission. This routing has a negative performance impact on the wireless communication. The global platform described herein allows such deployment to happen with minimal (if any) impact on the performance and roaming charges.

Figure 34A:
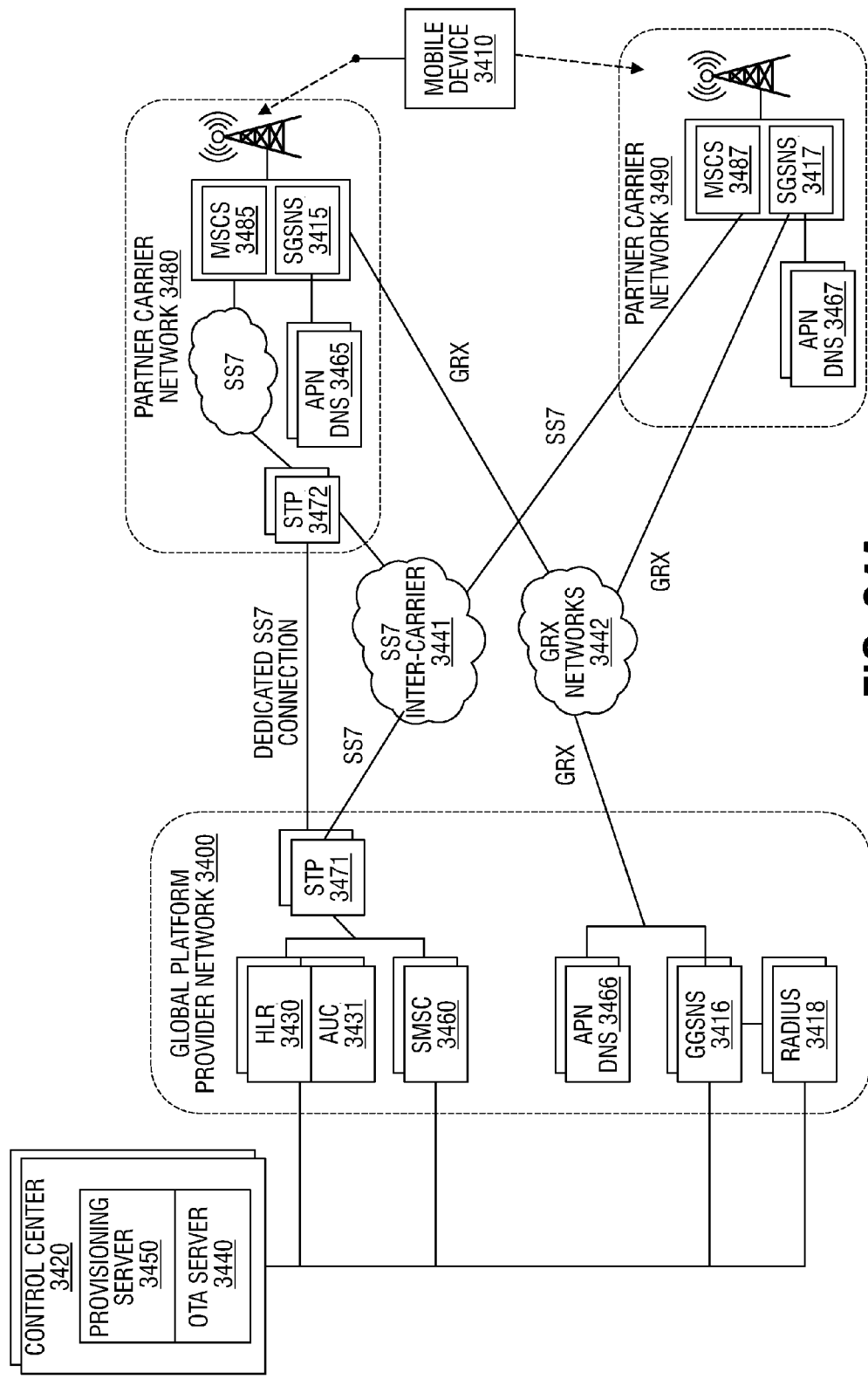
FIG. 34A is an embodiment of a wireless network architecture in which a global platform provider operates.

FIG. 34A is an embodiment of a wireless network architecture in which a global platform provider operates. The global platform provider is allocated with a set of multiple subscriber identifiers, such as the international mobile subscriber identifier (IMSIs). Although IMSI is used in the following description, it is understood that other subscriber identifier types can be used instead of IMSI. Moreover, although the wireless network architecture is described in the context of 2/3G Global System for Mobile Communication (GSM) network technology, it is understood that other network technologies, such as Code Division Multiple Access 2000 (CDMA2000), 4G Long Term Evolution (LTE), LTE Advanced, etc., can be used to support the techniques described herein. It is also understood that embodiments of the invention can be adapted to work with future versions of the network protocols, technologies and standards as these protocols, technologies and standards develop.

A mobile device 3410 having one of these IMSIs programmed in its SIM can avoid or reduce its roaming charges in regions that are operated by network carriers partnered with the global platform provider. The mobile device 3410 may incur temporary roaming charges after leaving its home network and entering a partner carrier network (e.g., partner carrier network 3480 or 3490). However, at some point in time when one or more pre-determined allocation rules are satisfied, the mobile device 3410 can be provisioned with a new IMSI that is local to the partner carrier network or an IMSI that is predetermined by the global platform provider to be preferred for that visited country. With this new IMSI, the mobile device can transmit and receive wireless packets in the partner carrier network without incurring roaming charges and without having the transmissions routed through its home network.

The determination of whether the mobile device 3410 can switch to a local or otherwise preferred IMSI can be made by a control center 3420 based on a set of allocation rules. The control center is coupled to a global platform provider network 3400 and includes at least a provisioning server 3450 and an over-the-air (OTA) server 3440. Both the control center 3420 and the global platform provider network 3400 are operated by the global platform provider. The control center 3420 and the global platform provider network 3400 can include multiple servers, multiple storage devices and multiple network nodes distributed across multiple geographical areas.

In one embodiment, the global platform provider network 3400 includes a Home Location Register (HLR) 3430 that includes one or more servers and databases for managing and storing mobile subscriber information. The mobile subscriber information includes the International Mobile Subscriber Identity (IMSI), the MSISDN, location information (e.g., the identity of the currently serving Visitor Location Register (VLR) to enable the routing of mobile-terminated calls) and service subscription and restrictions. The HLR 3430 is coupled to an authentication center (AuC) 3431 for performing authentication of a mobile device that requests a network connection.

The HLR 3430 is operated and updated by the global platform provider. The HLR 3430 communicates with the partner carrier networks (3480, 3490) via Signaling System 7 (SS7) messages through Signal Transfer Points (STPs) (3471, 3472), or via Internet Protocol (IP) messages through Mobility Management Entities (MMEs). The SS7/IP messages can be sent via dedicated SS7/IP connections and/or SS7/IP inter-carrier networks 3441. In some embodiments, the HLR 3430 shown herein is a logical representation. Physically, the HLR 3430 can be distributed across multiple geographical areas. In some embodiments, the HLR 3430 can include distributed segments of the HLRs owned by multiple partner carriers. Thus, in these embodiments the HLR 3430 can be the sum of multiple HLR segments, with each HLR segment owned by a different partner carrier. For example, a partner carrier may own and operate an HLR, and a segment of the HLR can be read and updated by the global platform provider. The updates performed by the global platform provider can include adding/provisioning and removing/purging IMSIs, and setting and editing subscriber wireless service permissions. The IMSIs that can be added and removed by the global platform provider are within a set of IMSIs that are allocated to the global platform provider. That is, the HLR 3430 stores and manages the IMSIs that belong to the set of IMSIs allocated to the global platform provider. In one embodiment, when a new IMSI is provisioned to a subscriber, the subscriber may also be changed to a new billing account owner. That is, the contractual ownership for the subscriber's wireless service may change with the provision of a new IMSI. After the provision of a new IMSI, the subscriber may receive a billing statement from a new partner carrier in addition to or instead of the original carrier.

In the embodiment of FIG. 34A, each of the partner carrier networks (3480, 3490) includes one or more MSCs (3485, 3487) and one or more SGSNs (3415, 3417). The MSCs (3485, 3487) are responsible for routing circuit-switched voice calls, fax, data and short message service (SMS). The MSCs (3485, 3487) can forward outgoing circuit-switched signals from a mobile device to a circuit-switched network (not shown), and can forward outgoing short messages to an SMS center (SMSC) 3460. The circuit-switched network and the SMSC 3460 then deliver the signals/messages to their intended destinations. In addition, the MSCs (3485, 3487) are responsible for requesting the HLR 3430/AuC 3431 to authenticate a mobile device when the mobile device requests for a network connection.

The SGSNs (3415, 3417) are responsible for routing data packets. Each SGSN (3415, 3417) is identified by an Access Point Name (APN), which can be used in a Domain Name System (DNS) query to resolve the IP address of a GGSN (e.g., GGSN 3416) that serves the SGSN (3415, 3417). The APN resolution function is shown as the APN DNS (3465, 3467). The GGSN 3416 then delivers outgoing data packets from the mobile device 3410 to their destination(s) via a packet-switched network (e.g., the Internet). Before granting access to the packet-switched network, the GGSN 3416 can use Remote Authentication Dial In User Service (RADIUS) protocol to provide Authentication, Authorization, and Accounting (AAA) management (shown as RADIUS 3418). For incoming data packets destined for the mobile device 3410, the GGSN 3416 resolves the IP address of the destination SGSN using the SGSN's APN in a DNS query (shown as the APN DNS 3466). The communication between the SGSN (3415, 3417) and the GGSN 3416 can be provided by a GPRS roaming exchange (GRX) network 3442 for inter-carrier connections. In some embodiments, the communication between the SGSN (3415, 3417) and its associated GGSN can be provided by an intra-carrier connection.

In the embodiment of FIG. 34A, the HLR 3430, the SMSC 3460, the GGSNs 3416 and the RADIUS 3418 are within the global platform provider network 3400. In alternative embodiments, one or more of the HLR 3430, the SMSC 3460, the GGSNs 3416 and the RADIUS 3418 can be located within and operated by one or more of partner carrier networks (3480, 3490). Regardless of their locations and ownership, the control center 3420 has access to each of the HLR 3430, the SMSC 3460, the GGSNs 3416 and the RADIUS 3418 to manage the information of the mobile subscribers, who directly or indirectly (e.g., through a partner carrier, or through a customer organization having a contract with a partner carrier or with the global platform provider) subscribes to the service of the global platform provider.

In some embodiments, the IMSIs allocated to the global platform provider belong to a set of IMSIs that contain one or more contiguous or non-contiguous segments of IMSIs. An IMSI is a unique non-dialable number allocated to each mobile device in the GSM system. The IMSI is stored in the SIM of a mobile device and uniquely identifies a subscriber identity. Generally, an IMSI includes three parts: (1) the mobile country code (MCC) consisting of three digits for identifying a country, (2) the mobile network code (MNC) consisting of two or three digits for identifying a network carrier, and (3) the mobile subscriber identity number (MSIN) consisting of nine to ten digits.

In one embodiment, the IMSIs allocated to the global platform provider can have an MCC and an MNC that identify a country and one of the partner carrier networks, as well as an MSIN that includes one or more digits having one or more pre-designated values. As an example, suppose that the MCC "123" and the MNC "956" identify a country and a partner carrier network "PN" operated within that country, respectively. Further suppose that the partner carrier agrees that among all of the IMSIs identifying the partner carrier network "PN", those IMSIs with the first digit of the MSIN being 9 (or any other pre-designated value) are allocated to the global platform provider. Thus, the IMSI 123-456-9xxxxxxxx indicates a range of IMSIs allocated to the global platform provider, with "x" being any value from 0-9. This range of IMSIs can be provisioned by the control center 3420 to mobile devices that roam into the partner carrier network "PN" and need to be switched to local or otherwise preferred IMSIs. Since the global platform provider can enter into agreements with multiple partner carriers, the IMSIs allocated to the global platform provider can include many disjoint ranges.

The MISN is to be distinguished from the Mobile Station International Subscriber Directory Number (MSISDN). The MSISDN is a dialable number that a caller uses to reach a mobile device. Generally, the HLR stores the IMSI and the MSISDN as a pair for identifying a mobile subscriber's device and for routing calls to the mobile subscriber. A SIM is uniquely associated to an IMSI, while the MSISDN can change in time (e.g. due to portability of phone numbers).

When a network carrier orders mobile devices from its equipment suppliers, the equipment suppliers typically pre-program each SIM in the mobile device with one or more IMSIs. In one embodiment, the pre-programmed SIM includes a bootstrap IMSI, which is one of the IMSIs allocated to the global platform provider. This bootstrap IMSI also identifies a country and a carrier network that is the home to the pre-programmed SIM. When an end user purchases a mobile device through any partner carrier channel, the service representative creates a service order to enter the end user's subscription information, including the MSISDN, using the bootstrap IMSI as a key. This service order with the key is submitted to the control center 3420, which creates a subscription record that uses the bootstrap IMSI as the key, and adds the subscription record to the HLR 3430. The mobile device can then start wireless communications using the bootstrap IMSI within its home network or a partner carrier network.

Figure 34B:
FIGS. 34B and 34C are two examples of IMSI switching when a mobile device roams from a home network to a visited network.
Figure 34C:
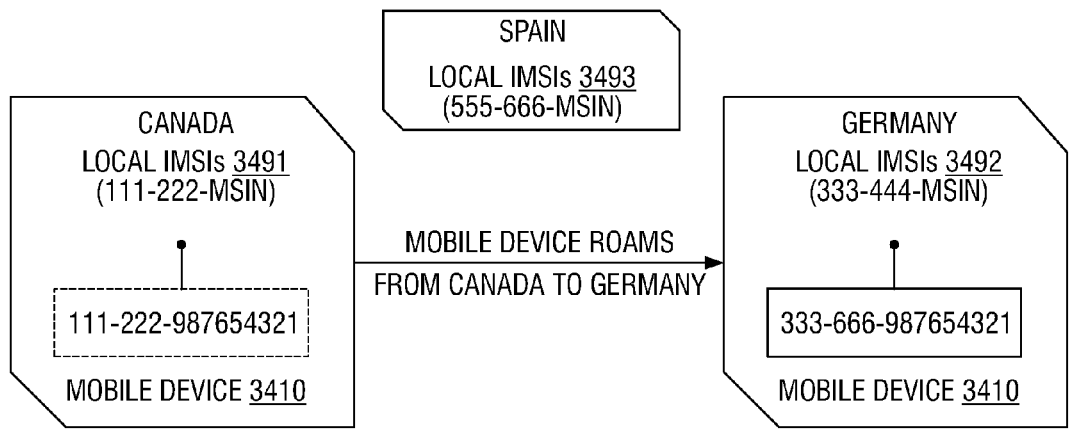

FIGS. 34B and 34C are two examples of IMSI switching according to embodiments of the invention. Referring to FIG. 34B, when the mobile device 3410 roams from its home network (e.g., in Canada) to a visited network (e.g., in Germany), it can be provisioned with a new IMSI by the global platform provider. For example, suppose that local IMSIs 3491 of the home network in Canada are (111-222-MSIN) and local IMSIs 3492 of the visited network in Germany are (333-444-MSIN), where MSIN represents any 9-10 digital number. In one embodiment, when the mobile device 3410 roams from Canada to Germany, the mobile device 3410 can be provisioned with a new IMSI that is one of the local IMSIs 3492 in Germany allocated to the global platform provider. In another embodiment, when the mobile device 3410 roams from Canada to Germany, the mobile device 3410 can be provisioned with a new IMSI that is one of the local IMSIs 3493 in Spain (e.g., 555-666-MSIN) allocated to the global platform provider. This new IMSI (one of the local IMSIs 3493) is herein referred to as a "preferred" IMSI for the visited network. The provision of a preferred IMSI may occur if; e.g., the global platform provider has an agreement with the Spanish network carrier to allocate its IMSIs 3493 to roaming devices in Germany that have subscribed to the service of the global platform provider.

In the example shown in FIGS. 34B and 34C, the MSIN portion of the IMSI before and after roaming is the same (e.g., 987654321) wherein the leading digit "9" indicates that the IMSI is allocated to the global platform provider. However, it is understood that the global platform provider can provision another available MSIN that is different from 987654321 to its roaming devices.

Figure 35:
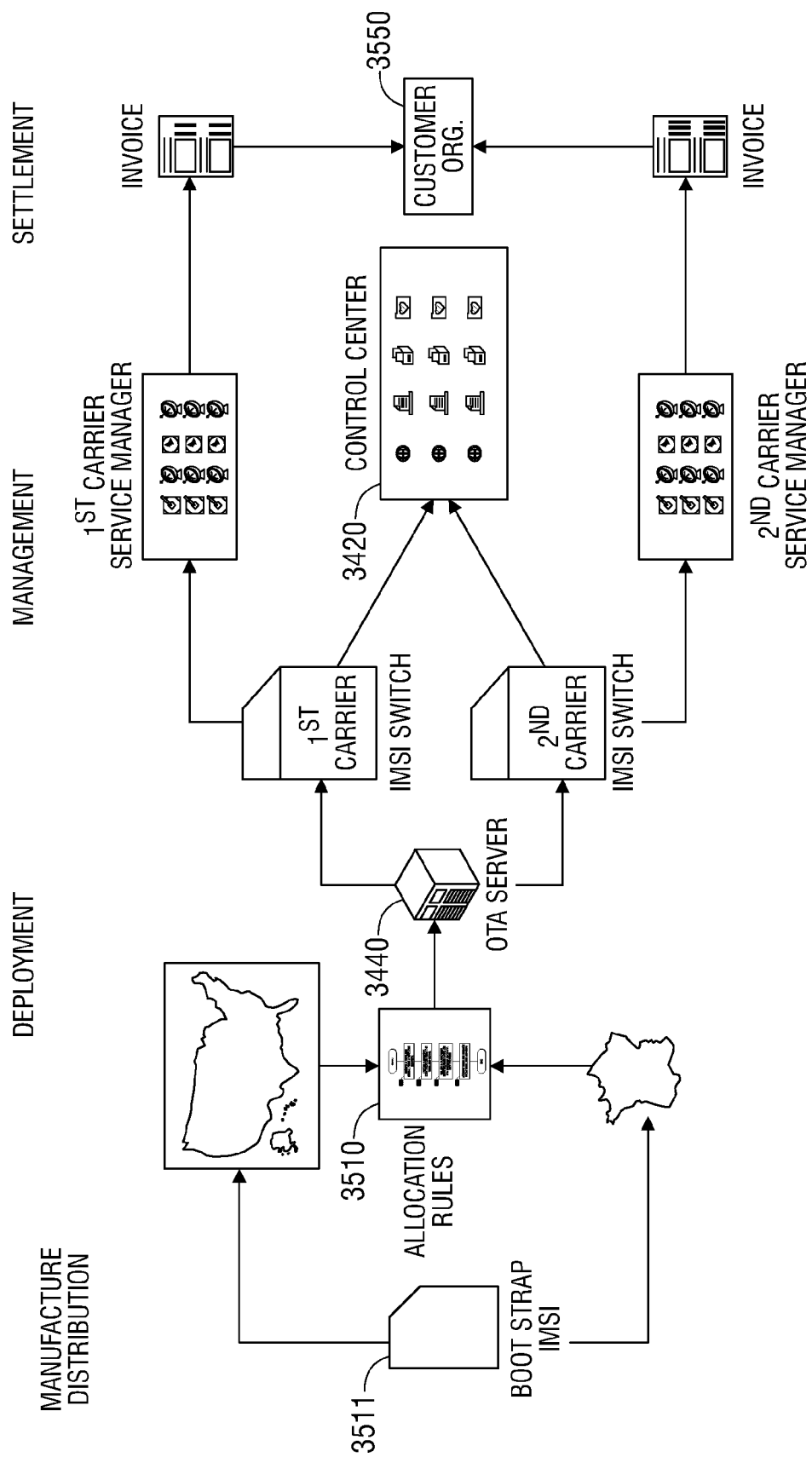
FIG. 35 illustrates an overview of IMSI provisioning and management.

FIG. 35 illustrates an overview of IMSI provisioning and management. Initially, a mobile device with a bootstrap IMSI 3511 is deployed from its home network to a deployed location. The home network is identified by the mobile country code (MCC) and the mobile network code (MNC) of the bootstrap IMSI 3511. The deployed location, which is in a network operated by one of the partner carriers or operated by one of the partner carriers' roaming carrier partners, may be associated with a different MCC and/or MNC from those of the home network. Based on a set of allocation rules 3510, the control center 3420 determines whether the bootstrap IMSI 3511 should be replaced by a new IMSI that is local to or otherwise preferred for the deployed location. Examples of the allocation rules 3510 can include: the amount of mobile usage, the amount of billable mobile usage, the first network registration attempt on a roaming network, the length of time that the mobile device has been roaming, the subscription status (e.g., the level of priority), the number of available IMSIs, the agreement with the network carrier for the deployed location, and the like.

Specific examples of allocation rules 3510 may include that the allocation rule specifies that a new or second one of the IMSIs is selected based on an initial network registration of the first IMSI (e.g. bootstrap IMSI 3511) and/or in an activation ready state or an activated state. A second one of the IMSIs is selected based on a country of an initial network registration and/or in an activated state. A second one of the IMSIs is selected based on a first network registration of the first IMSI with a CDR. A second one of the IMSIs is selected based on a first network registration of the first IMSI with a CDR and/or in an activated state. A second one of the IMSIs is selected based on a first network registration of the first IMSI with a first billable CDR in a first billing cycle. A second one of the IMSIs is selected based on a first network registration of the first IMSI with a last billable CDR in a first billing cycle. A second one of the IMSIs is selected based on a first network registration of the first IMSI with x % billable volume in a first billing cycle.

If an IMSI replacement should be made, the control center 3420 triggers IMSI switching by having the OTA 3440 send the new IMSI to the mobile device, and by adding/provisioning the new IMSI to the HLR 3430 and removing/purging the bootstrap IMSI from the HLR 3430.

With the new IMSI, the mobile device can communicate wirelessly in the deployed location as if it were operating within its home network or as an otherwise preferred roaming network. Incoming and outgoing mobile transmissions may be managed by the local partner carrier network without being re-routed to the home network. In one embodiment, the control center 3420 can monitor the network usage and collect billing information. The billing information can be forwarded to the local partner carrier or preferred home network partner, which generates an invoice for account settlement. The invoice will be sent to the end user or a customer organization 3550 through which the end user subscribes to the mobile communication service. In an alternative embodiment, the control center 3420 can generate the invoice based on the collected billing information.

In the following description with reference to FIGS. 36-40, a number of examples illustrating the process of IMSI switching are described. To avoid obscuring the description, some of the signaling paths and network elements are omitted from FIGS. 36-40. Some of the network elements shown in FIGS. 36-40 refer back to FIG. 34A. However, it is understood that the processes illustrated in FIGS. 36-40 may be implemented by a network architecture different from the embodiment of FIG. 34A. Further, to simplify the discussion, the following examples only describe 2/3G GSM packet-based routing. It is understood that other types of wireless data, such as messaging, voice calls, faxes, and other types of wireless communications can also be supported as well as other wireless technologies such as 4G LTE or LTE Advanced. In the following description, bracketed numerals are associated with actions while un-bracketed numerals are associated with entities or data items (e.g., IMSIs).

Figure 36:
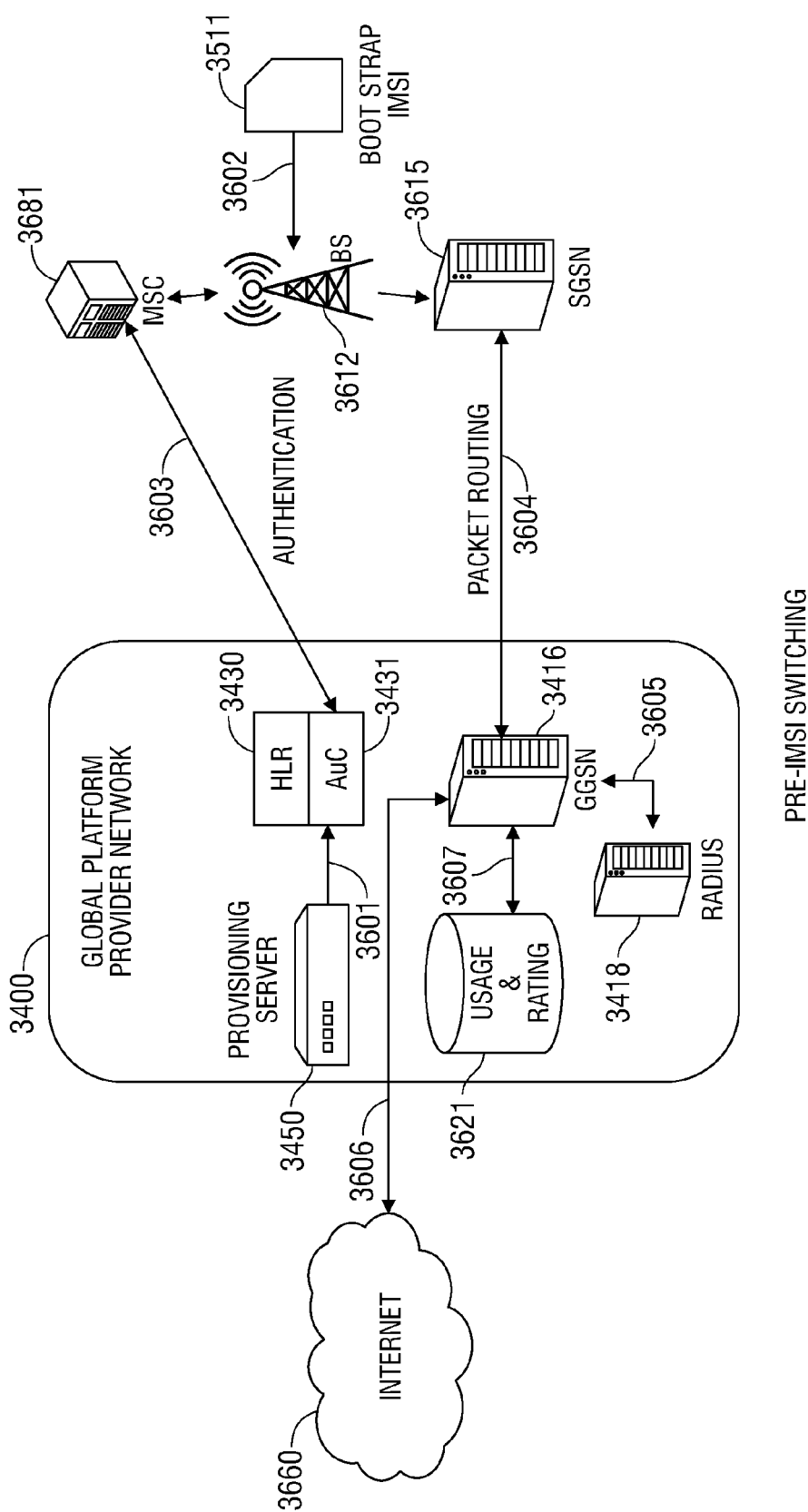
FIG. 36 illustrates an embodiment of a process for activating a mobile device having a bootstrap IMSI.

FIG. 36 illustrates an embodiment of a process for initial network registration of a mobile device having a bootstrap IMSI (e.g., the bootstrap IMSI 3511). Initially, the mobile device is installed with a SIM programmed with the bootstrap IMSI 3511. The bootstrap IMSI 3511 is the key to a subscription record in the HLR 3430 operated, or otherwise accessible, by the global platform provider. As described above, the bootstrap IMSI 3511 can be assigned to the mobile device by an equipment supplier, and is within the range(s) of IMSIs allocated to the global platform provider. Upon receiving a service order, the provisioning server 3450 adds the bootstrap IMSI 3511 into the HLR 3430, as well as other subscription information in a subscription record that uses the bootstrap IMSI 3511 as the key (3601). The HLR 3430 then indicates the IMSI as -activated. When the mobile device sends a request for a wireless network connection, the request is first sent to the nearest base station (BS) tower 3612 operated by the home network carrier (e.g., the carrier identified by the bootstrap IMSI as the home network carrier) (3602) or visited network carrier. The BS tower 3612 forwards the request to a nearest MSC 3681, which sends an authentication request to the HLR 3430/AuC 3431 for the mobile device (3603). The HLR 1330/AuC 3431 then authenticates the bootstrap IMSI 3511. Upon authentication, the BS 3612 routes data packets from the mobile device to an SGSN 3615 operated by the serving network carrier, which forwards the data packets to the GGSN 3416 (3604). Before granting access to the external network (e.g., the Internet 3660), the GGSN 3416 requests authorization and authentication from the Radius 3418 (3605). Upon receipt of authorization and authentication, the GGSN 3416 routes the data packets to the Internet 3660 (3606). The global platform provider then collects network usage information (e.g., call detail records (CDRs)) from the GGSN 3416 or Radius 3418 and stores in a usage and rating database 3621.

Figure 37:
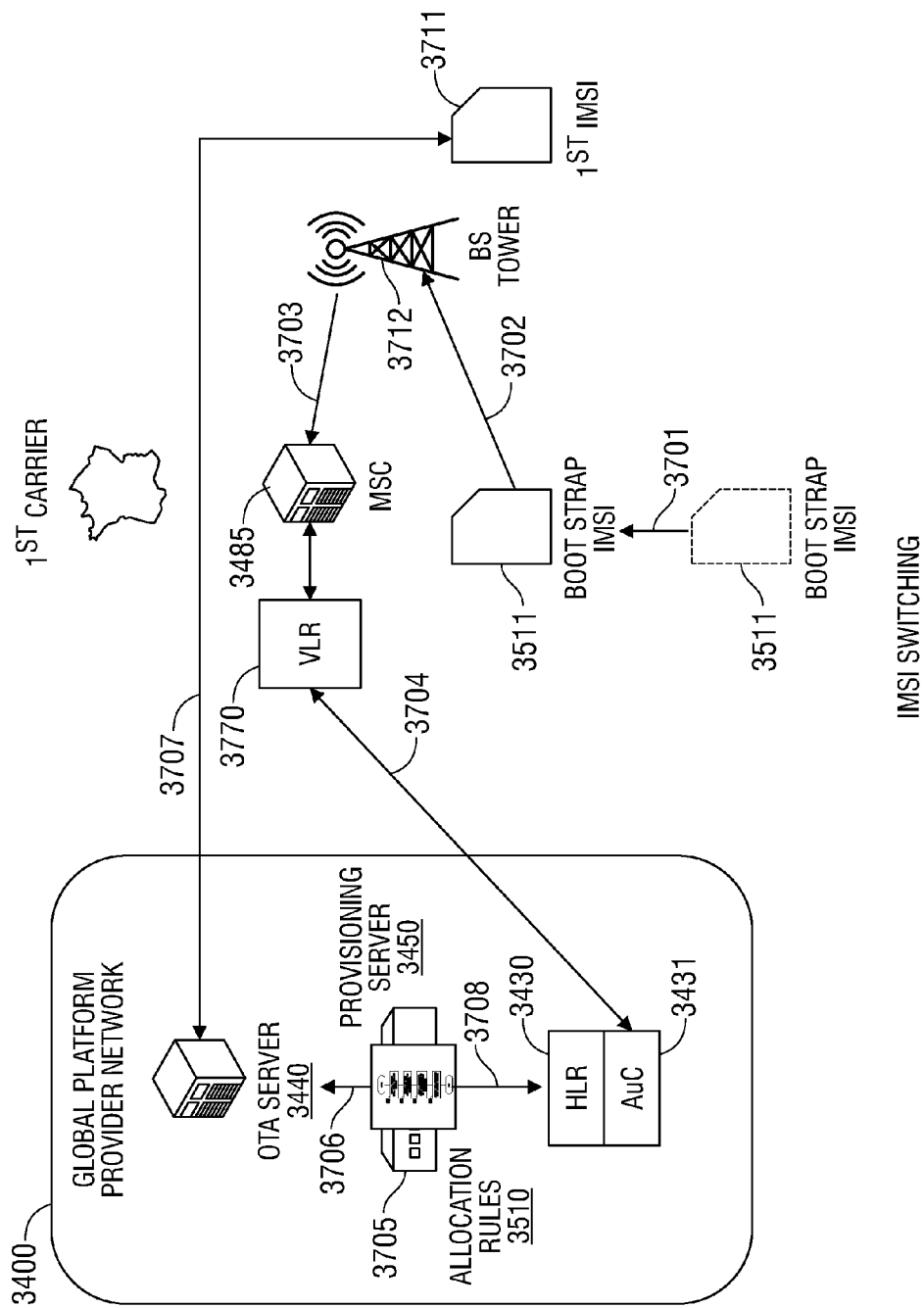
FIG. 37 illustrates a process for performing IMSI switching.

FIG. 37 illustrates a process for performing IMSI switching. In this case, the mobile device with a bootstrap IMSI 3511 is deployed to a country/network that is foreign to the bootstrap IMSI 3511 (i.e., the SIM is roaming) (3701). In one embodiment, the first carrier can be a partner carrier operating the partner carrier network 3480 of FIG. 34A. At this point, the bootstrap IMSI 3511 remains actively provisioned in the HLR 3430. The mobile device sends a registration request to the nearest BS tower 3712 (3702), which forwards the request to the MSC 3485 and a VLR 3770 associated with the MSC 3485 (3703). Both the MSC 3485 and the VLR 3770 are operated by the first carrier. The VLR 3770 informs the HLR 3430 that the mobile device has roamed away from its home network, and obtains subscription information of the mobile device from the HLR 3430 (3704). The mobile device then registers in the newly deployed location via roaming.

The notification from the VLR 3770 triggers the provisioning server 3450 to check allocation rules 3510 to determine whether the mobile device should be switched to a local or otherwise preferred new IMSI (e.g., a first IMSI 3711 local to the first carrier network) (3605). This local IMSI 3711 is also within a range of IMSIs allocated to the global platform provider. By using the first IMSI 3711 in the deployed location, the mobile device can communicate wirelessly without being treated as a roaming device. Additionally, as the first IMSI 3711 is allocated to the global platform provider, the global platform provider can monitor the signaling or usage of the mobile device to determine whether there is a need to perform further IMSI switching.

If the provisioning server 3450 determines that an IMSI switching should be performed based on the allocation rules 3510, the provisioning server 3450 directs the OTA server 3440 to send the first IMSI 3711 to the mobile device (3706). The first IMSI 3711 can be sent by encrypted transmission (e.g., an encrypted SMS) (3707). Upon receipt of the first IMSI 3711, the mobile device changes its profile in the SIM and returns a receipt to the OTA server 3440. The provisioning server 3450 also updates the HLR 3430 by adding/provisioning and activating the first IMSI 3711 to the mobile device's subscription record. When the mobile device re-registers on the first carrier's network with the new IMSI 3711 via the HLR 3430, the HLR 3430 will send a message to the provisioning server 3450 that the mobile device has successfully registered with the new IMSI 3711. At this point, the provisioning server 3450 will remove the bootstrap IMSI 3511 from the HLR 3430 (3708).

Figure 38:
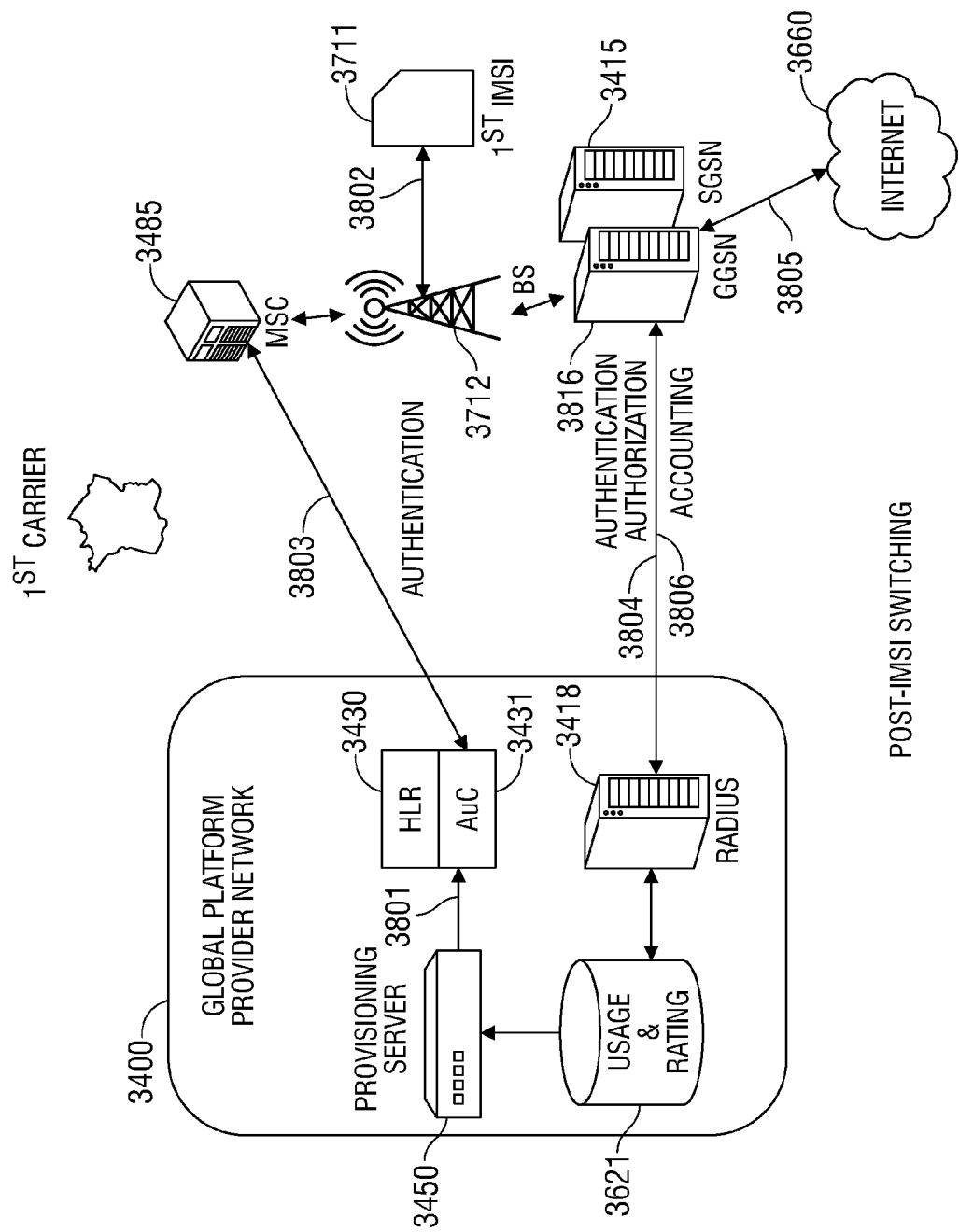
FIG. 38 illustrates an embodiment of a process for operating the mobile device after IMSI switching.

FIG. 38 illustrates an embodiment of a process for operating the mobile device after the IMSI switching described in FIG. 37. As described in FIG. 37, the HLR 3430 adds and activates the first IMSI 3711 and removes the bootstrap IMSI 3511 as directed by the provisioning server 3450 (3801). When the mobile device sends a request for a network connection to the nearest BS tower 3712 (3802), the BS tower 3712 forwards the request to the MSC 3485 operated by the first carrier. The MSC 3485 recognizes that the request is associated with the first IMSI 3711, which is a local IMSI to the first carrier network. The MSC 3485 then sends an authentication request to the HLR 1330 (3803). In response, the HLR 3430 authenticates the first IMSI 3711. Upon authentication, the BS tower 3712 routes data packets from the mobile device to the SGSN 3415 operated by the first carrier, which forwards the data packets to a GGSN 3816 associated with the SGSN 3415. Before granting access to an external network (e.g., the Internet 3660), the GGSN 3816 requests authorization and authentication from the Radius 3418 (3804). Upon receipt of authorization and authentication, the GGSN 3816 routes the data packets from the mobile device to the Internet 3660 (3805). In this example, as the GGSN 3816 is operated by the first carrier, it is the first carrier that provides the CDRs and accounting to the usage and rating database 3621 operated by the global platform provider (3807). In other embodiments, the Radius server 3418 may provide the CDRs and accounting to the usage and rating database 3621.

Figure 39:
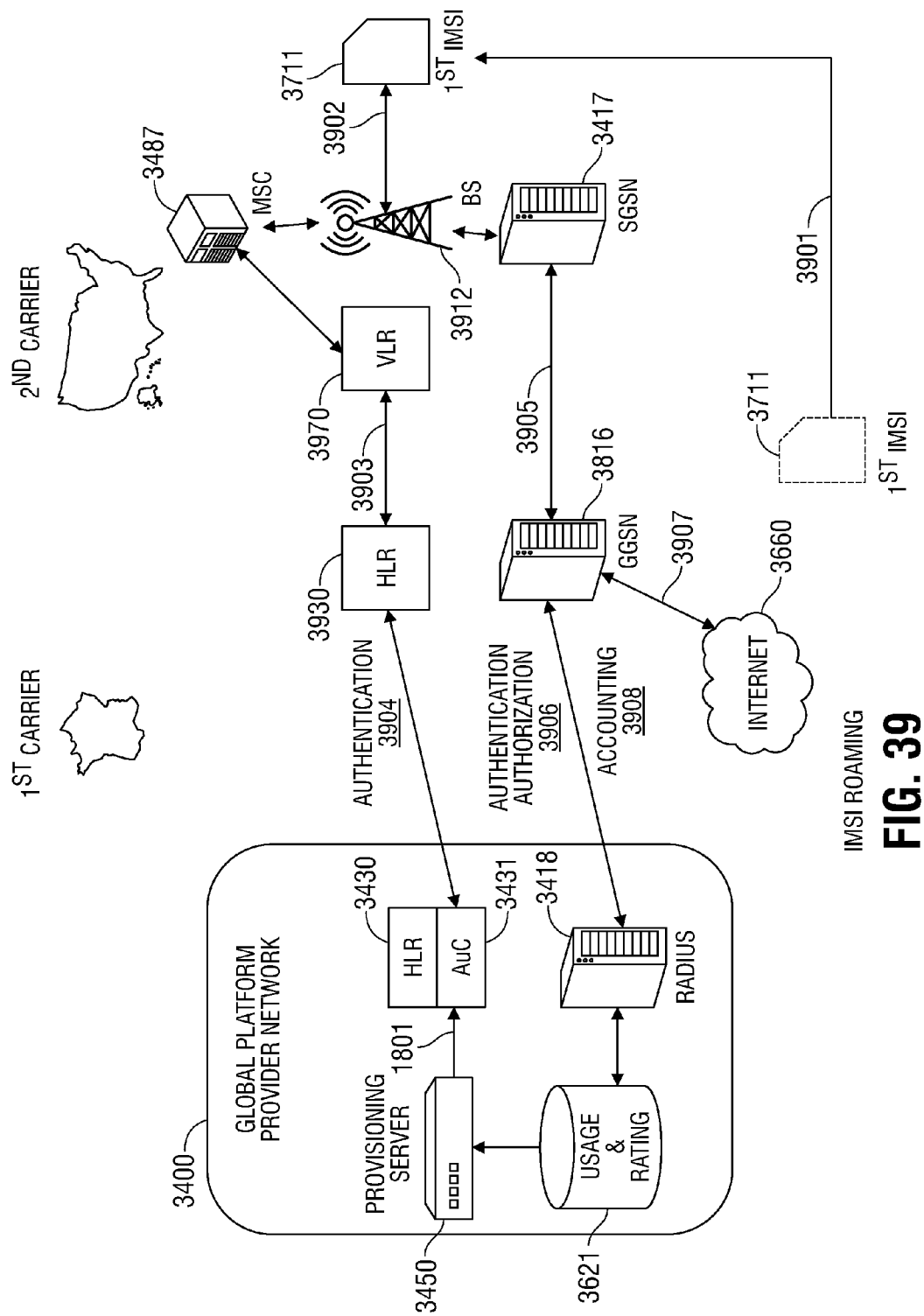
FIG. 39 illustrates an embodiment of a process for operating the mobile device as a roaming device after IMSI switching.

FIG. 39 illustrates an embodiment of a process for operating the mobile device as a roaming device after the IMSI switching described in FIG. 37. After the mobile device is successfully switched to the first IMSI 3711 and operating in the first carrier network as a local mobile device, the mobile device roams to another location serviced by a second carrier (3901). In one embodiment, the second carrier can be a partner carrier operating the partner carrier network 3490 of FIG. 34A. At this point, the first IMSI 3711 remains in the HLR 3430. The mobile device sends a registration request to the nearest BS tower 3912 (3902), which forwards the request to the MSC 3487 and a VLR 3970 associated with the MSC 3487. Both the MSC 3487 and the VLR 3970 are operated by the second carrier. The VLR 3870 informs a HLR 3930 of the first carrier network that the mobile device has enters the second carrier network, and request authentication of the mobile device (3903). The HLR 3930 forwards the authentication request to the HLR 3430 of the global platform provider network 3400, and the HLR 3430 authenticate the mobile device (3904). The mobile device then registers and activates in the new location via roaming. In some embodiments, the VLR 3970 will send the authentication request directly to the HLR 3430 of the global platform Upon authentication, the BS tower 3912 routes data packets from the mobile device to the SGSN 3417 operated by the second carrier. The SGSN 3417 forwards the data packets to the GGSN 3816 operated by the first carrier (3905). Before granting access to an external network (e.g., the Internet 3660), the GGSN 3816 requests authorization and authentication from the Radius 3418 (3906). Upon receipt of authorization and authentication, the GGSN 3816 routes the data packets to the Internet 3660 (3907). In this example, as the GGSN 3816 is operated by the first carrier, it is the first carrier that provides the CDRs and accounting to the usage and rating database 3621 operated by the global platform provider (3908). In other embodiments, the Radius server 3418 may provide the CDRs and accounting to the usage and rating database 3621.

Figure 40:
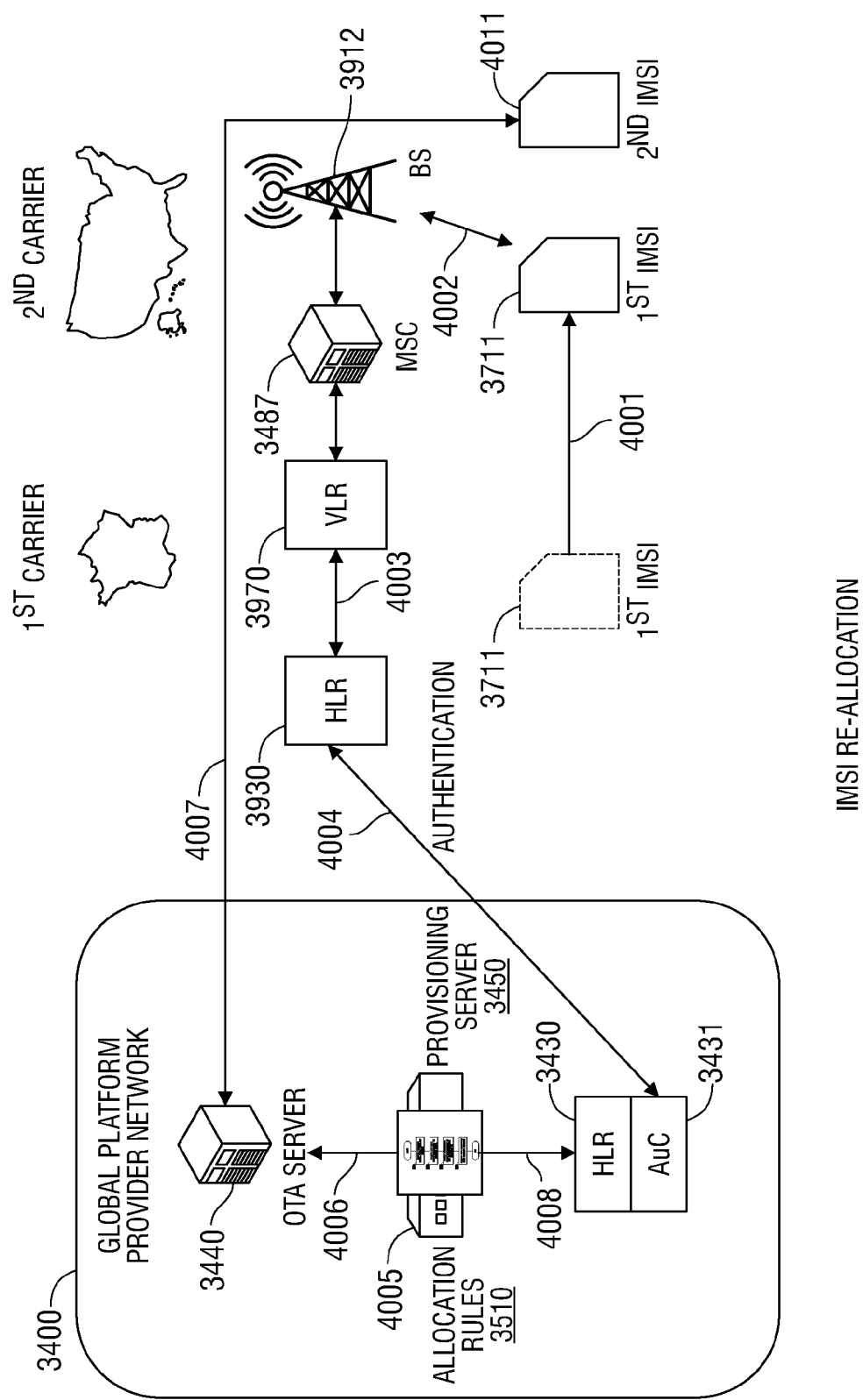
FIG. 40 illustrates an embodiment of a process for performing another IMSI switching.

FIG. 40 illustrates an embodiment of a process for performing another IMSI switching. The process of 4001-4004 of FIG. 40 is similar to 3901-3904 of FIG. 39, and is therefore not repeated. In response to the authentication request from the first carrier's HLR 3930, the provisioning server 3450 checks allocation rules 3510 to determine whether the mobile device should be switched to a local IMSI (that is, a second IMSI 4011 local to the second carrier network) (4005). Further, the second IMSI 4011 is within a range of IMSIs allocated to the global platform provider. By using the second IMSI 4011 in the deployed location, the mobile device can communicate wirelessly without being treated as a roaming device. Additionally, as the second IMSI 4011 is allocated to the global platform provider, the global platform provider can monitor the usage of the mobile device to determine whether there is a need to perform further IMSI switching.

If the provisioning server 3450 determines that an IMSI switching should be performed based on the allocation rules 3510, the provisioning server 3450 directs the OTA server 3440 to send the second IMSI 3911 to the mobile device (4006). The second IMSI 2011 can be sent by encrypted transmission (e.g., an encrypted SMS) (4007). Upon receipt of the second IMSI 4011, the mobile device changes its profile in the SIM and returns a receipt to the OTA server 3440. The provisioning server 3450 also updates the HLR 3430 by adding/provisioning and activating the second IMSI 4011 to the subscription record of the mobile device and by removing/purging the first IMSI 3711 from the HLR 3430 (4008).

Figure 41:
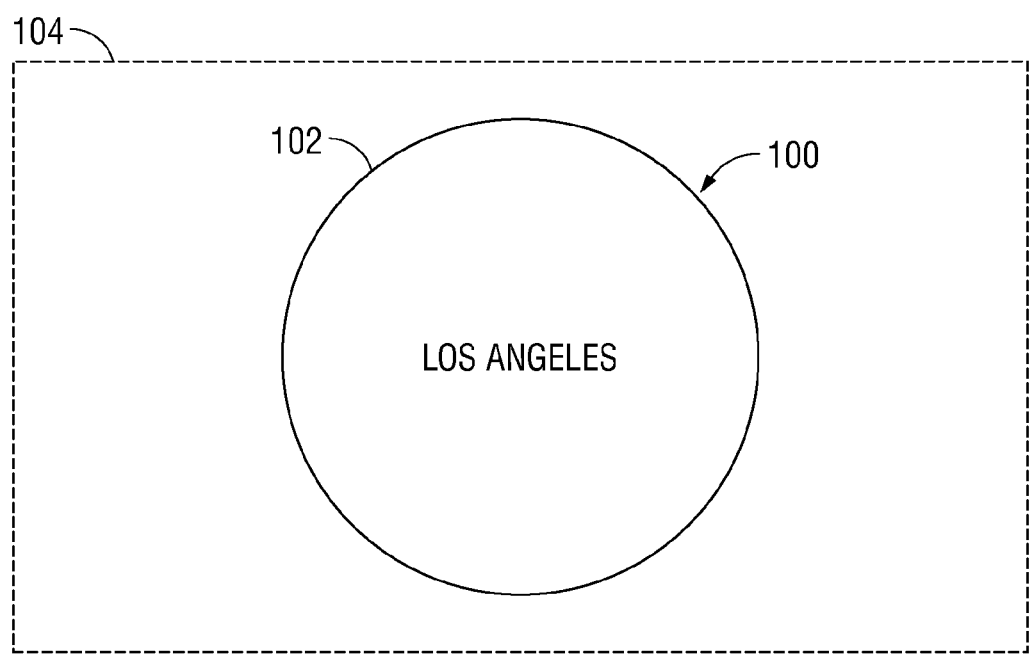
FIG. 41 illustrates an embodiment for implementation of a Geo-Fence.

One embodiment of the invention describes the creation and implementation of a cellular service defined by a preferred geographical area enclosed by a boundary referred to as Geo-Fence which defines an offer for a certain set of features and prices within the bounded area. Referring to FIG. 41, for simplicity the geographical area 102 enclosed by the Geo-Fence 100 may be depicted as a circular area of a configurable radius. For example, the geographical area 102 may be designated as the city of "Los Angeles". The geographical area 104 located outside of the geographical area 102 enclosed by the Geo-Fence 100 represents an area with non-preferred or non-discounted services. A circular area is shown for illustrative purposes and it is understood that other geographical determinations/boundaries may be implemented as well.

Within the geographical area 102 enclosed by the Geo-Fence 100, voice and/or data services and any other additional mobile services may be offered for at a discounted plan and price range (tier 1) while services outside of the Geo-Fence 100 may be offered at a higher price range (tier 2). Various embodiments would allow for multiple combinations of mobile services and prices within the geographical area 102 enclosed by the Geo-Fence 100 and the outlying area 104. Voice and/or data services and any additional mobile services may be offered and provisioned in real time.

To implement the Geo-Fence 100, a processor and software module residing within the mobile device works in conjunction with a Control Center (CC) based processor to implement at least two methods of determining the geo-location of the mobile device, referred to hereinafter as course and fine detection. The course detection refers to an immediate "cellular network based" coarse fence, wherein the CC processor monitors network based events such as a mobile device location update. The fine detection refers to a mobile device determined GPS location. The course detection may potentially occur before the mobile device reports a device determined GPS based location or vice versa.

The mobile device may be implemented by a cellular device 100 as illustrated in FIG. 1 or a wireless communication device 300 as illustrated in the block diagram shown in FIG. 3. Cellular device 100 stores and runs CSP device application (CDA) 140. CDA 140 displays alerts and notifications to consumers in response to the consumers' current usage and condition, provides customized contextual offers in real time, and allows consumers to select and purchase wireless products and services from their devices. Moreover, using CDA 140, consumers can diagnose and solve their own service questions and problems directly from their wireless device. The functionality of CDA 140 is described in further detail with reference to FIGS. 10-15.

The Control Center (CC) may be implemented by the hosted service platform 120 included in the Core Service Platform CSP system 530 illustrated in FIGS. 5 and 6.

Various embodiments of the invention may be implemented by a CSP system 530. FIG. 5 is a block diagram illustrating an overview of CSP system integration according to one embodiment of the invention. FIG. 6 illustrates further details of CSP system integration according to one embodiment of the invention. In the following description, the term "CSP system" 530 refers to the software and hardware infrastructure that manages a suite of services provided to network operators and their subscribers. Thus, referring also to the embodiment shown in FIG. 1, CSP system 530 includes hosted service platform 120, CSP network 170, and the software hosted thereon. CSP system 530 interacts with operator network 110, operator IT system 150, and cellular device 100 in real time. In one embodiment, CSP system 530 is a smartphone service management platform. Through CDA 140 and CSP operator Web applications 154, CSP system 530 provides or enables the functions of on-device application, self-care, diagnostics, store-front, alert management, policy control, payment handling, offer management, campaign management, analytics, reporting engine, and data rating.

Consumers experience CSP system 530 through CDA 140 on their wireless communication devices. CDA 140 provides consumer-side functions that include, but are not limited to: storefront, payment, offers and alerts, self-support, account status, and device diagnostics. Operators experience CSP system 530 through CSP operator Web applications 154. CSP operator Web applications 154 provide operator-side functions that include, but are not limited to: offer and campaign management, campaign analytics, retail store activation, customer care application, and reporting.

A mobile device user interface such as a Graphical User Interface (GUI), an Icon, or a badge may indicate to the user when the device is within the preferred Geo-Fence 100 boundary to receive the preferred pricing plan. The CC processor makes this determination based on the location update and signals the mobile device to display the Geo-Fence use by way of an icon or badge, for example a "blue star". For example, the CC signal may be by way of SMS message to the mobile device.

A CC processor may utilize a "business rule" engine to implement the Geo-Fence wherein a "sales marketer" may create multiple pricing plan options that can be programmed into the rules engine and wherein the rules engine selects from the multiple plans based on customer based factors such as time in contract, previous usage, previous sales, etc. The Geo-Fence implementation may include a rules engine based determination of a pricing plan, service options, geographical coverage (e.g. radius of Geo-Fence), etc. In one embodiment, Hosted service platform 120 includes a number of CSP engines 122, i.e. rules engines, which provide a suite of functions to automate both the sales and support processes towards wireless users.

The Geo-Fence 100 course and fine detection will now be described. The course detection or "cellular network based" coarse fence may be determined based upon a standard GSM location update wherein the mobile device may send/receive a wireless signal to/from a wireless network. For example, the mobile device sends/receives wireless signals to/from a nearby network base station and a network identification is decoded from the wireless signal. The wireless signal may include a mobile network identification. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. At the same time, a Control Center (CC) server may monitor network based signals from network nodes such as BSC's, MSC's, VLR's and HLR's and is aware of the location update of the mobile device based on a received LAI.

A GSM network or UMTS network, like all cellular networks are a radio network of individual cells, known as base stations. Each base station covers a small geographical area which is part of a uniquely identified location area. By integrating the coverage of each of these base stations, a cellular network provides a radio coverage over a much wider area. A group of base stations is named a location area of a routing area.

A location area is a set of base stations that are grouped together to optimize signaling. Typically, tens or even hundreds of base stations share a single Base Station Controller (BSC) in GSM, or a Radio Network Controller (RNC) in UMTS, the intelligence behind the base stations. The BSC handles allocation of radio channels, receives measurements from the mobile phones, and controls handovers from base station to base station.

To each location area, a unique number called a location area code LAC is assigned. The LAC is broadcast by each base station, known as a base transceiver station BTS in GSM, or a Node B in UMTS, at regular intervals.

The location update procedure allows a mobile device to inform the cellular network, whenever it moves from one location area to the next. Mobile devices are responsible for detecting location area codes. When a mobile device finds that the location area code is different from its last update, it performs another update by sending to the network, a location update request, together with its previous location, and it's Temporary Mobile Subscriber Identity TMSI.

There are several reasons why a mobile device may provide updated location information to the network. Whenever a mobile device is switched on or off, the network may require it to perform an IMSI attach or IMSI detach location update procedure. Also, each mobile device is required to regularly report its location at a set time interval using a periodic location update procedure. Whenever a mobile device moves from one location area to the next while not on a call, a random location update is required. This is also required of a stationary mobile that reselects coverage from a cell in a different location area, because of signal fade. Thus a subscriber has reliable access to the network and may be reached with a call, while enjoying the freedom of mobility within the whole coverage area.

When a subscriber is paged in an attempt to deliver a call or SMS and the subscriber does not reply to that page then the subscriber is marked as absent in both the Mobile Switching Center (MSC)/Visitor Location Register (MSC/VLR) and the Home Location Register (HLR) (Mobile not reachable flag MNRF is set). The next time the mobile performs a location update the HLR is updated and the mobile not reachable flag is cleared.

A fine location detection may implement Global Positioning System (GPS) technology on the mobile device. A GPS navigation device is any device that receives GPS signals for the purpose of determining the device's current location on Earth. GPS devices provide latitude and longitude information, and some may also calculate altitude, although this is not considered sufficiently accurate or continuously available enough (due to the possibility of signal blockage and other factors) to rely on exclusively to pilot aircraft.

Due in part to regulations encouraging mobile phone tracking, including for example enhanced 911 (E911), the majority of GPS receivers are built into mobile telephones, with varying degrees of coverage and user accessibility. Commercial navigation software is available for most smartphones as well as some Java-enabled phones that allow them to use an internal or external GPS receiver (in the latter case, connecting via serial or Bluetooth). Some phones with GPS capability work by assisted GPS (A-GPS) only, and do not function when out of range of their carrier's cell towers. Others can navigate worldwide with satellite GPS signals as a dedicated portable GPS receiver does, upgrading their operation to A-GPS mode when in range. Still others have a hybrid positioning system that can use other signals when GPS signals are inadequate.

Various embodiments of the software module residing within the mobile device may utilize multiple technologies to implement the GPS functionality including, for example, "bespoke" solutions, i.e. a high degree of "customization" and involvement of the end-user, that exist for smartphones with built-in GPS capabilities. Some such phones can use tethering to double as a wireless modem for a laptop or pad, while allowing GPS-navigation/localization as well. For example, VZ Navigator is marketed by Verizon Wireless and uses GPS which is one technology to determine the location, and then uses the mobile phone's data connection to download maps and calculate navigational routes. Other products including iPhone are used to provide similar services. Nokia provide Ovi Maps free on its smartphones and maps can be preloaded. GPS navigation applications for mobile phones include Waze and Google Maps Navigation. Google Maps Navigation included with Android means most smartphone users only need their phone to have a personal navigation assistant.

Between the course detection and the fine detection a location cross-check is implemented to prevent hacked or fraudulent activity on the mobile device. For example, if the network based course detection determines that the device is in New York but the device based fine GPS location detection indicates the device is in Los Angeles, the Control Center server can determine that the network based detection is more accurate and rate the device usage at a higher rate as being outside the Los Angeles Geo-Fence. The assumption being that the device has been fraudulently hacked to give a false Los Angeles GPS location.

One issue that may be handled by the mobile device and the CC relates to "bring your own device" BYOD smartphones that impose a customer's explicit agreement or "opt-in" to utilize the device's GPS location functionality. In one embodiment, the CC can send an SMS message to request the user to "opt-in" in order for the CC to receive the GPS fine detection location. Other types of signaling between CC and the mobile device may be used as well. However, as a default, the course network based location detection can be used should the user "opt-out".

An additional embodiment deals with roaming outside the tier 1 and tier 2 areas, i.e. well beyond the Geo-Fence boundaries in essence into "tier 3". For example, assume a user wishes to use his mobile device when he leaves Los Angeles and crosses the border into Mexico and he has no international roaming agreement. The MSC or BSC in Mexico would determine that the mobile device belongs to a U.S. based network based on IMSI, mobile country code (MCC) and mobile network code (MNC). This may be equivalent to course detection. Additionally, fine GPS detection may take place as well. The voice and or data traffic would be directed back to the HLR associated with CC (or CSP system 530). The CC would identify the device as roaming and communicate with the CDA 140 via, for example, SMS, and the CDA 140 would present an offer to purchase a "day pass" or pay as you go roaming plan. The services may then be provisioned in real time by CC (or CSP system 530).

Another closely related embodiment describes the application of the CSP, Global Platform, and Geo-Fence technology described in detail above to "Machine-to-Machine" (hereinafter "M2M") devices. Unlike mobile phones, the primary purpose of a connected M2M device is not wireless communications per se. Rather, wireless communication enhances the M2M devices. For example, connected navigation devices are firstly navigation devices, but are enhanced by being connected; a security system is not designed primarily for wireless communications, but is greatly enhanced by wireless connectivity, etc.

M2M rate plans and pricing models differ significantly from their mobile phone counterparts. M2M devices may transmit data infrequently perhaps remaining silent for days, months, or even years. When a M2M does transmit, the data size maybe very small (1 Mbyte) or very large (10 Gbytes). On the other hand, very small data transmissions carried out by millions of M2M devices can amount to a significant amount of total data usage. Thus, structuring and implementing rate plans and pricing models can be a challenge for the multitude of M2M applications. Various factors to be considered when structuring price/rate plans include the number of deployed M2M devices, the amount and frequency of data usage, and the geographical area of use.

M2M devices are deployed in application-specific telemetry systems to collect data using sensors and transmit the data to a destination such as a server accessible over the Internet (or other data network). In the past, telemetry systems were the exclusive domain of very large well financed organizations. For example, large oil and gas companies and electric utilities, through the use of custom-built, proprietary data networks, were some of the first private organizations to use telemetry. In recent years, however, the cost of access to public wireless data networks has dropped, opening the door for new, cost effective M2M applications including, for example, fleet management, point-of-sale transactions, consumer electronics, healthcare monitoring, security, and surveillance, to name a few.

An example of M2M mobile technology that would benefit from Control Center/CSP/Global platform based Geo-Fence technology is the vehicle telemetry system referred to as "OnStar". OnStar Corporation is a subsidiary of General Motors that provides subscription-based communications, in-vehicle security, hands free calling, turn-by-turn navigation, and remote diagnostics systems throughout the United States, Canada and China. Some additional features of an OEM system are Automatic Crash Response, Stolen Vehicle Tracking, Turn-by-Turn Navigation, and Roadside Assistance. The OnStar service relies on mobile phone voice and data communication, as well as location information using GPS technology. Drivers and passengers can use its audio interface to contact OnStar representatives for emergency services, vehicle diagnostics and directions.

The OnStar service allows users to contact OnStar call centers during an emergency. In the event of a collision, detected by airbag deployment or other sensors, Advanced Automatic Collision Notification features can automatically send information about the vehicle's condition and GPS location to OnStar call centers.

In the case of an embedded OnStar M2M device, in the absence of potentially dangerous events such as a road hazard, an OnStar M2M device may be silent for long stretches of time with little to no data transmission. However, certain other logistical factors tend to complicate the structuring of price/rate plans for data service. For example, OnStar M2M devices require firmware updates on a regular basis. In addition, embedded OnStar devices frequently cross geographical boundaries and in essence become "roaming devices" subjected to costly "roaming charges". Thus, structuring price/rate plans must include factors such as the number of deployed M2M devices, the amount, frequency, urgency, and time of data usage per device, and the geographical areas of use. Different geographical zones have different pricing. Preferred zones such as home networks have preferential pricing versus non-preferred zones such as roaming networks.

For example, a firmware update can be graded on a sliding scale from 1-10, one being non-urgent and ten being urgent/critical. The size or amount of data in the firmware download may also be a determinative factor. The additional factors to consider for price/rate plans could be the location of the vehicle, i.e., whether in a home network area versus a roaming network. Location determination being either GPS based or wireless network based. The time of day, i.e., the evening being preferable for non-urgent upgrades and daytime only if urgent/critical. A wild card factor could be the accessibility of a WiFi network wherein WiFi accessible trumps all other factors because of a low cost and a high speed download.

Another potential use case could be that of multi-media application data use such as real time streaming of audio and/or video content. All of the same factors discussed above may apply, e.g., the amount, frequency, urgency, and time of data usage per device, and the geographical areas of use. A wild card factor could be the accessibility of a WiFi network wherein WiFi accessible trumps all other factors. Another wild card could be whether an end user/consumer pays for the data usage or whether a third party pays for the data usage wherein end user/consumer paying trumps $3^{rd}$ party.

For example assuming that, absent an end user/consumer paying, OnStar may provide six months of free multi-media data usage with the caveat that the audio and video content be pre-selectable and placed in a "shopping cart" and that data downloading be selectively scheduled based on a set of optimum circumstances/factors such as restricted to evening download after 11 PM on weekdays only and WiFi based downloading being unrestricted at any time.

The key to successfully implementing a Control Center/CSP/Global Platform based Geo-Fence technology is the use of CSP system technology as discussed above [00085] to [00190]. Real-time contextual assessments are provided by CSP recommendation engines. The CSP recommendation engine performs wireless network profiling and creates real time solutions to be pushed to customers such as GM OnStar. The CSP system monitors the wireless environment including monitoring all network elements, determining preferred networks, and determining the location and availability of WiFi hotspots.

The CSP recommendation engine makes a recommendation regarding a specific rate/pricing plan for data usage based upon a number of factors that drive a contextual assessment, such as the amount, frequency, urgency, and time of data usage per device, and the geographical areas of use, operator(s) rate plans for data usage, operator alliances (i.e., business and roaming agreements), and data and time usage.

In one embodiment, the recommendation engine (which is one of CSP engines 122 in CSP system 530 shown in FIG. 6) is the CSP's mechanism for creating real-time contextual solutions. CSP system 530 provides customized contextual solutions based on contextual assessments of a costumer's current "context." Such "context" includes, but is not limited to, type of contract, time in contract, applicable business rules, operator alliances (i.e., business and roaming agreements), regional laws, past current and projected network usage/demand/capacity, loyalty status, data and voice usage, value (or valuation) of customer, time (of a latest data request), location (of a latest data request) and prior history. The contextual assessments can be made by CSP engines 122, which run on hosted service platform 120 of FIG. 1 and perform the functions that include, but are not limited to, customer profiling, micro-segmentation, real-time rating and policy, real-time alerts and offers, and targeted recommendations for offers and promotions.

In the embodiment shown, the CSP recommendation engine analyzes the information collected from multiple network nodes, including HLR's, MSC's, VLR's, SMSC's, SGSN's, GGSN's, RADIUS, etc., and the like by data mining and micro-segmentation. The CSP recommendation engine makes a recommendation regarding a specific rate/pricing plan for data usage based upon a number of factors that drive a contextual assessment, such as the amount, frequency, urgency, and time of data usage per device, and the geographical areas of use, operator(s) rate plans for data usage, operator alliances (i.e., business and roaming agreements), and data and time usage. The recommendation engine creates or recommends real-time solutions based on results of customer profiling, as well as factors of the contextual assessment and information received from PCRF, OCS and CDRs. The recommendation engine allows the operator personnel to create and set automated alerts that provide customers notification of key lifecycle events, e.g. firmware upgrades, device roaming, reaching a usage threshold, approaching a bill cycle date, accessing a non-included service such as roaming. Thus, when a M2M device's real-time usage or expected usage reaches a limit or threshold, expects to reach a limit or threshold and triggers a real-time alert, the solutions that are created by the recommendation engine can be automated and delivered to key network elements and the M2M device instantly.

Key network elements such as the PCRF and OCS may be tightly integrated with CSP system 530 so that when a CSP recommendation engine selects a new plan, that plan can be provisioned through the PCRF and OCS in real time. Thus, the customer or subscriber can be served immediately. It may be necessary that the other systems, such as customer care, within an IT infrastructure are aware of the new plan being provisioned. For that reason, as explained later, CSP system 530 interfaces to the operator's provisioning/order entry system. In one embodiment, CSP system 530 may manage the provisioning/order entry of data service upgrades with the CSP-integrated PCRF and OCS.

Another embodiment that may be considered a subset of geographical determination and automated cost management involves the capability of a Control Center based Global Platform solution including location updating in conjunction with re-IMSI to local or preferred IMSIs to avoid costly or excessive roaming charges. The Global Platform for managing SIMs is discussed above in [00235] to (00264]. The Global Platform utilizes a rules engine driven by business rules to automatically determine when, where, and how to re-IMSI a mobile device to mitigate or reduce the costs associated with roaming devices. The re-IMSI technology and principles apply equally well to the case of M2M mobile devices.

As described herein, the processes performed by the provisioning server 3450, the OTA server 3440, the HLR 3430 and other network elements shown in FIGS. 34-41 may be implemented by specific configurations of hardware such as application specific integrated circuits (ASICs) configured to perform certain operations or having a predetermined functionality, or electronic devices executing software instructions stored in memory embodied in a non-transitory computer readable storage medium. Examples of non-transitory computer-readable storage media include: magnetic disks; optical disks; random access memory; read only memory; flash memory devices; phase-change memory, and the like. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
a server platform operative to communicate with a wireless communication network; and
data storage coupled to the server platform to store a plurality of business rules, wherein the server platform is operative to:
generate a provision instruction to provision a Policy and Charging Rules Function (PCRF) with a rule set associated with a set of business rules for wireless usage incurred by a mobile terminal operating in the wireless communication network;
provide an authentication page to be displayed on a graphical user interface (GUI) of the mobile terminal to allow a user to enter an authentication code to enable the user to incur wireless data usage;
receive the authentication code;
determine a first data type and a second data type at a packet gateway that inspects packet data communicated to or from the mobile terminal;
generate a first billing instruction based on the first data type and the set of business rules wherein the first billing instruction indicates that the user is to be billed based on the authentication code and at a first billing rate for the wireless data usage of the mobile terminal; and
generate a second billing instruction based on the set of business rules and the second data type, wherein the second billing instruction indicates a second party to be billed and a second billing rate for the wireless usage of the mobile terminal.

2. The system of claim 1, wherein the first data type and the second data type are determined based on, at least in part, at least one Access Point Name (APN).

3. The system of claim 1, wherein the first data type is determined based on, at least in part, a first Access Point Name (APN) and the second data type is determined based on, at least in part, a second Access Point Name (APN).

4. The system of claim 3, wherein the first APN and the second APN are determined from communications from a serving GPRS support node (SGSN) or serving gateway (SGW) to the packet gateway.

5. The system of claim 1, wherein the packet gateway comprises a gateway GPRS support node (GGSN) or a LTE packet gateway.

6. The system of claim 5, wherein the GGSN or LTE packet gateway inspects packet data communicated to or from the mobile terminal to determine the first data type or the second data type.

7. The system of claim 6, wherein the GGSN or LTE packet gateway performs Deep Packet Inspection (DPI) to determine the first data type or the second data type.

8. The system of claim 1, wherein the first data type of the wireless usage is billed at a retail billing rate and the second data type of the wireless usage is billed at a wholesale billing rate.

9. The system of claim 1, wherein the user is an end consumer and the second party is a vehicle telemetry service provider.

10. The system of claim 1, wherein the second data type includes at least one of infotainment data type, telemetry data type and firmware update data type.

11. The system of claim 1, wherein the first data type includes at least one of infotainment data type and Wi-Fi hotspot data type.

12. The system of claim 1, wherein the server platform further generates a first instruction to provision an HLR to allow or disallow services comprising least one of roaming, SMS, Voice, or Data associated with a specific APN for the mobile terminal.

13. The system of claim 12, wherein the server platform, in response to detection of a transition condition, further generates a second instruction to provision the HLR to allow or disallow services comprising least one of roaming, SMS, Voice, or Data associated with a specific APN for the mobile terminal.

14. The system of claim 1, wherein the mobile terminal is a vehicle.

15. The system of claim 1, further comprising a gateway GPRS support node (GGSN) or a LTE packet gateway.

16. The system of claim 15, further comprising the Policy and Charging Rules Function (PCRF).

17. A method performed by a server platform operative to communicate with a wireless communication network for providing wireless service to a mobile terminal operating in the wireless communication network, comprising:
    generating a provision instruction to provision a Policy and Charging Rules Function (PCRF) with a rule set associated with a set of business rules for wireless usage incurred by the mobile terminal operating in the wireless communication network;
    providing an authentication page to be displayed on a graphical user interface (GUI) of the mobile terminal to allow a user to enter an authentication code to enable the user to incur wireless data usage;
    receiving the authentication code;
    determining a first data type and a second data type at a packet gateway that inspects packet data communicated to or from the mobile terminal;
    generating a first billing instruction based on the first data type and the set of business rules wherein the first billing instruction indicates that the user is to be billed based on the authentication code and at a first billing rate for the wireless data usage of the mobile terminal; and
    generating a second billing instruction based on the set of business rules and the second data type, wherein the second billing instruction indicates a second party to be billed and a second billing rate for the wireless usage of the mobile terminal.

* * * * *